United States Patent
Dixon et al.

(10) Patent No.: US 10,884,617 B2
(45) Date of Patent: Jan. 5, 2021

(54) HANDWRITING KEYBOARD FOR SCREENS

(71) Applicant: Apple Inc., Cupertino, CA (US)

(72) Inventors: Ryan S. Dixon, Mountain View, CA (US); Imran Chaudhri, San Francisco, CA (US); Bradley W. Griffin, Berkeley, CA (US); Tiffany S. Jon, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/663,070

(22) Filed: Oct. 24, 2019

(65) Prior Publication Data

US 2020/0057556 A1 Feb. 20, 2020

Related U.S. Application Data

(63) Continuation of application No. 16/265,676, filed on Feb. 1, 2019, now Pat. No. 10,466,895, which is a
(Continued)

(51) Int. Cl.
*G06F 3/0488* (2013.01)
*G06F 3/023* (2006.01)
(Continued)

(52) U.S. Cl.
CPC ........ *G06F 3/04883* (2013.01); *G06F 3/0237* (2013.01); *G06F 3/0481* (2013.01);
(Continued)

(58) Field of Classification Search
CPC .. G06F 3/04883; G06F 3/0237; G06F 3/0481; G06F 3/04886; G06F 17/276; G06K 9/00402
See application file for complete search history.

(56) References Cited

U.S. PATENT DOCUMENTS

| 4,317,109 A | 2/1982 | Odaka et al. |
| 4,685,142 A | 8/1987 | Ooi et al. |

(Continued)

FOREIGN PATENT DOCUMENTS

| CN | 101676838 A | 3/2010 |
| CN | 101893987 A | 11/2010 |

(Continued)

OTHER PUBLICATIONS

Advisory Action received for U.S. Appl. No. 14/292,138, dated Aug. 30, 2018, 6 pages.
(Continued)

*Primary Examiner* — Mia M Thomas
(74) *Attorney, Agent, or Firm* — Dentons US LLP

(57) ABSTRACT

The present disclosure generally relates to handwriting on touch sensitive surfaces. In some examples, text suggestions strokes entered on a touch sensitive surface are viewed and selected in response to a rotatable input mechanism. In some examples, text determined from a set of strokes on the touch sensitive surface is revised based on a subsequently entered stroke on the touch sensitive surface. In some examples, a determination is made whether to include a stroke in a set of strokes based a time between the stroke and the previous stroke. In some examples, determining text based on a set of stroke is interrupted to determined revised text based on the set of strokes and a second stroke.

27 Claims, 33 Drawing Sheets

Related U.S. Application Data continuation of application No. 15/614,276, filed on Jun. 5, 2017, now Pat. No. 10,228,846.

(60) Provisional application No. 62/349,111, filed on Jun. 12, 2016.

(51) Int. Cl.
*G06K 9/00* (2006.01)
*G06F 40/274* (2020.01)
*G06F 3/0481* (2013.01)

(52) U.S. Cl.
CPC ........ *G06F 3/04886* (2013.01); *G06F 40/274* (2020.01); *G06K 9/00402* (2013.01)

(56) References Cited

U.S. PATENT DOCUMENTS

| | | |
|---|---|---|
| 5,313,528 A | 5/1994 | Nishida |
| 5,438,631 A | 8/1995 | Dai |
| 5,491,758 A | 2/1996 | Bellegarda et al. |
| 5,500,937 A | 3/1996 | Thompson-Rohrlich |
| 5,526,440 A | 6/1996 | Sakano et al. |
| 5,539,839 A | 7/1996 | Bellegarda et al. |
| 5,544,257 A | 8/1996 | Bellegarda et al. |
| 5,544,264 A | 8/1996 | Bellegarda et al. |
| 5,687,254 A | 11/1997 | Poon et al. |
| 5,710,831 A | 1/1998 | Beernink et al. |
| 5,751,851 A | 5/1998 | Guzik et al. |
| 5,781,662 A | 7/1998 | Mori et al. |
| 5,796,867 A | 8/1998 | Chen et al. |
| 5,812,697 A | 9/1998 | Sakai et al. |
| 5,828,999 A | 10/1998 | Bellegarda et al. |
| 5,850,477 A | 12/1998 | Takada |
| 5,864,636 A | 1/1999 | Chisaka |
| 5,903,666 A | 5/1999 | Guzik et al. |
| 5,926,566 A | 7/1999 | Wang et al. |
| 5,953,541 A | 9/1999 | King et al. |
| 5,991,441 A | 11/1999 | Jourjine |
| 6,011,865 A | 1/2000 | Fujisaki et al. |
| 6,035,063 A | 3/2000 | Nakashima et al. |
| 6,212,298 B1 | 4/2001 | Yoshii et al. |
| 6,323,859 B1 | 11/2001 | Gantt |
| 6,438,631 B1 | 8/2002 | Kawase |
| 6,462,733 B1 | 10/2002 | Murakami |
| 6,636,163 B1 | 10/2003 | Hsieh |
| 6,707,942 B1 | 3/2004 | Cortopassi et al. |
| 6,760,580 B2 | 7/2004 | Robinson et al. |
| 6,801,190 B1 | 10/2004 | Robinson et al. |
| 6,970,599 B2 | 11/2005 | Longe et al. |
| 7,502,017 B1 | 3/2009 | Ratzlaff et al. |
| 7,634,137 B2 | 12/2009 | Simard et al. |
| 7,669,149 B2 | 2/2010 | Dietl et al. |
| 7,720,316 B2 | 5/2010 | Shilman et al. |
| 8,010,901 B1 | 8/2011 | Rogers |
| 8,074,172 B2 | 12/2011 | Kocienda et al. |
| 8,094,941 B1 | 1/2012 | Rowley et al. |
| 8,175,389 B2 | 5/2012 | Matic et al. |
| 8,310,461 B2 | 11/2012 | Morwing et al. |
| 8,370,737 B2 | 2/2013 | Zahavi et al. |
| 8,884,905 B2 | 11/2014 | Morwig et al. |
| 8,938,688 B2 | 1/2015 | Bradford et al. |
| 9,026,428 B2 | 5/2015 | Sternby et al. |
| 9,111,139 B2 | 8/2015 | Morwing et al. |
| 9,330,331 B2 | 5/2016 | Kasthuri |
| 9,355,090 B2 | 5/2016 | Goldsmith et al. |
| 9,465,985 B2 | 10/2016 | Xia et al. |
| 9,495,620 B2 | 11/2016 | Dolfing et al. |
| 9,633,191 B2 | 4/2017 | Fleizach et al. |
| 9,921,744 B2 | 3/2018 | Ha et al. |
| 9,928,651 B2 | 3/2018 | Mariappan |
| 9,998,888 B1 | 6/2018 | Chang et al. |
| 10,013,162 B2 | 7/2018 | Fleizach et al. |
| 10,133,397 B1 * | 11/2018 | Smith ................. G06F 3/04845 |
| 2002/0019731 A1 | 2/2002 | Masui et al. |
| 2002/0067854 A1 | 6/2002 | Reintjes et al. |
| 2002/0085037 A1 | 7/2002 | Leavitt et al. |
| 2002/0191029 A1 | 12/2002 | Gillespie et al. |
| 2003/0038788 A1 | 2/2003 | Demartines et al. |
| 2003/0043189 A1 | 3/2003 | Rieffel et al. |
| 2003/0086611 A1 | 5/2003 | Loudon et al. |
| 2003/0090467 A1 | 5/2003 | Hohl et al. |
| 2003/0099398 A1 | 5/2003 | Izumi |
| 2003/0149978 A1 | 8/2003 | Plotnick |
| 2003/0185444 A1 | 10/2003 | Honda |
| 2003/0193481 A1 | 10/2003 | Sokolsky |
| 2003/0197736 A1 | 10/2003 | Murphy |
| 2003/0212961 A1 | 11/2003 | Soin et al. |
| 2004/0017946 A1 | 1/2004 | Longé et al. |
| 2004/0157586 A1 | 8/2004 | Robinson et al. |
| 2004/0183833 A1 | 9/2004 | Chua |
| 2004/0196256 A1 | 10/2004 | Wobbrock et al. |
| 2004/0230912 A1 | 11/2004 | Clow et al. |
| 2004/0243389 A1 | 12/2004 | Thomas et al. |
| 2005/0024341 A1 | 2/2005 | Gillespie et al. |
| 2005/0216331 A1 | 9/2005 | Ahrens et al. |
| 2005/0222848 A1 | 10/2005 | Napper et al. |
| 2005/0237311 A1 | 10/2005 | Nakajima |
| 2005/0278647 A1 | 12/2005 | Leavitt et al. |
| 2005/0283364 A1 | 12/2005 | Longe et al. |
| 2006/0050962 A1 | 3/2006 | Geiger et al. |
| 2006/0062461 A1 | 3/2006 | Longe et al. |
| 2006/0092128 A1 | 5/2006 | Gao et al. |
| 2006/0152496 A1 | 7/2006 | Knaven |
| 2006/0246955 A1 | 11/2006 | Nirhamo et al. |
| 2006/0247915 A1 | 11/2006 | Bradford et al. |
| 2006/0265648 A1 | 11/2006 | Rainisto et al. |
| 2006/0274051 A1 | 12/2006 | Longe et al. |
| 2007/0005537 A1 | 1/2007 | Abdulkader et al. |
| 2007/0040813 A1 | 2/2007 | Kushler et al. |
| 2007/0067272 A1 | 3/2007 | Flynt et al. |
| 2007/0140561 A1 | 6/2007 | Abdulkader et al. |
| 2007/0146340 A1 | 6/2007 | Webb |
| 2008/0019591 A1 | 1/2008 | Iwayama et al. |
| 2008/0098456 A1 | 4/2008 | Alward et al. |
| 2008/0240570 A1 | 10/2008 | Shi et al. |
| 2008/0260252 A1 | 10/2008 | Borgaonkar et al. |
| 2008/0270118 A1 | 10/2008 | Kuo et al. |
| 2008/0304890 A1 * | 12/2008 | Shin .................... G06F 3/04883 400/61 |
| 2009/0041354 A1 | 2/2009 | Liu et al. |
| 2009/0109188 A1 | 4/2009 | Ohshita et al. |
| 2009/0161958 A1 | 6/2009 | Markiewicz et al. |
| 2009/0226091 A1 | 9/2009 | Goldsmith et al. |
| 2009/0228842 A1 | 9/2009 | Westerman et al. |
| 2009/0256808 A1 | 10/2009 | Kun et al. |
| 2009/0295750 A1 | 12/2009 | Yamazaki et al. |
| 2009/0326918 A1 | 12/2009 | Georgiev et al. |
| 2009/0327977 A1 | 12/2009 | Bachfischer et al. |
| 2010/0066691 A1 | 3/2010 | Li |
| 2010/0104189 A1 | 4/2010 | Aravamudhan et al. |
| 2010/0246964 A1 | 9/2010 | Matic et al. |
| 2010/0309147 A1 | 12/2010 | Fleizach et al. |
| 2010/0329562 A1 | 12/2010 | Zhu |
| 2011/0279379 A1 | 11/2011 | Morwing et al. |
| 2012/0014601 A1 | 1/2012 | Jiang et al. |
| 2012/0079373 A1 | 3/2012 | Kocienda et al. |
| 2012/0079412 A1 | 3/2012 | Kocienda et al. |
| 2012/0089632 A1 | 4/2012 | Zhou et al. |
| 2012/0095748 A1 | 4/2012 | Li et al. |
| 2012/0113007 A1 | 5/2012 | Koch et al. |
| 2012/0117506 A1 | 5/2012 | Koch et al. |
| 2012/0139859 A1 | 6/2012 | Ohira et al. |
| 2012/0216113 A1 | 8/2012 | Li |
| 2012/0216141 A1 | 8/2012 | Li |
| 2012/0308143 A1 | 12/2012 | Bellegarda et al. |
| 2013/0002553 A1 | 1/2013 | Colley |
| 2013/0034303 A1 | 2/2013 | Morwing et al. |
| 2013/0120274 A1 | 5/2013 | Ha et al. |
| 2013/0136360 A1 | 5/2013 | Maruyama et al. |
| 2013/0182956 A1 | 7/2013 | Wang et al. |
| 2013/0212511 A1 | 8/2013 | Kim et al. |
| 2013/0251247 A1 | 9/2013 | Khorsheed et al. |
| 2013/0251249 A1 | 9/2013 | Huo et al. |

(56) References Cited

U.S. PATENT DOCUMENTS

| | | |
|---|---|---|
| 2013/0314337 A1 | 11/2013 | Asano |
| 2014/0035823 A1 | 2/2014 | Khoe et al. |
| 2014/0035851 A1* | 2/2014 | Kim ............... G06F 3/0488 345/173 |
| 2014/0044357 A1 | 2/2014 | Moorthy et al. |
| 2014/0085215 A1 | 3/2014 | Och et al. |
| 2014/0093161 A1 | 4/2014 | Oda |
| 2014/0129931 A1 | 5/2014 | Hashiba |
| 2014/0143721 A1 | 5/2014 | Suzuki et al. |
| 2014/0160032 A1 | 6/2014 | Che et al. |
| 2014/0210759 A1 | 7/2014 | Toriyama |
| 2014/0214398 A1 | 7/2014 | Sanders et al. |
| 2014/0244234 A1 | 8/2014 | Huang et al. |
| 2014/0245221 A1 | 8/2014 | Dougherty et al. |
| 2014/0267072 A1 | 9/2014 | Andersson et al. |
| 2014/0270529 A1 | 9/2014 | Sugiura |
| 2014/0285460 A1 | 9/2014 | Morwing et al. |
| 2014/0340333 A1 | 11/2014 | Takasugi et al. |
| 2014/0344684 A1 | 11/2014 | Jang |
| 2014/0361983 A1 | 12/2014 | Dolfing et al. |
| 2014/0363074 A1 | 12/2014 | Dolfing et al. |
| 2014/0363082 A1 | 12/2014 | Dixon et al. |
| 2014/0363083 A1 | 12/2014 | Xia et al. |
| 2014/0365949 A1 | 12/2014 | Xia et al. |
| 2015/0040213 A1 | 2/2015 | Fleizach et al. |
| 2015/0067488 A1 | 3/2015 | Liu |
| 2015/0100537 A1 | 4/2015 | Grieves et al. |
| 2015/0139550 A1 | 5/2015 | Kuno |
| 2015/0161463 A1 | 6/2015 | Morwing et al. |
| 2015/0169948 A1 | 6/2015 | Motoi |
| 2015/0193141 A1 | 7/2015 | Goldsmith et al. |
| 2015/0234588 A1 | 8/2015 | Andersson et al. |
| 2015/0235097 A1 | 8/2015 | Wang et al. |
| 2015/0248235 A1 | 9/2015 | Offenberg et al. |
| 2015/0268768 A1* | 9/2015 | Woodhull ............ G06F 3/0418 345/168 |
| 2015/0294145 A1 | 10/2015 | Bouaziz et al. |
| 2015/0310267 A1 | 10/2015 | Nicholson et al. |
| 2015/0317069 A1 | 11/2015 | Clements et al. |
| 2015/0324011 A1 | 11/2015 | Czelnik et al. |
| 2015/0370529 A1 | 12/2015 | Zambetti et al. |
| 2015/0370779 A1 | 12/2015 | Dixon et al. |
| 2016/0019201 A1 | 1/2016 | Qian et al. |
| 2016/0139805 A1 | 5/2016 | Kocienda et al. |
| 2016/0179225 A1 | 6/2016 | Black et al. |
| 2016/0259548 A1 | 9/2016 | Ma |
| 2016/0274686 A1* | 9/2016 | Alonso Ruiz ....... G06F 3/04812 |
| 2016/0357752 A1 | 12/2016 | Jon et al. |
| 2017/0010802 A1 | 1/2017 | Xia et al. |
| 2017/0017835 A1 | 1/2017 | Dolfing et al. |
| 2017/0075878 A1 | 3/2017 | Jon et al. |
| 2017/0115875 A1 | 4/2017 | Ha et al. |
| 2017/0300559 A1 | 10/2017 | Fallah |
| 2017/0351420 A1 | 12/2017 | Rigouste |
| 2017/0357438 A1 | 12/2017 | Dixon et al. |
| 2017/0359302 A1 | 12/2017 | Van Os et al. |
| 2018/0091732 A1 | 3/2018 | Wilson et al. |
| 2018/0173415 A1 | 6/2018 | Xia et al. |
| 2019/0163359 A1 | 5/2019 | Dixon et al. |
| 2019/0332259 A1 | 10/2019 | Xia et al. |
| 2020/0174658 A1* | 6/2020 | Xia .................. G06F 3/0482 |
| 2020/0174663 A1* | 6/2020 | Kocienda ........... G06F 3/0237 |

FOREIGN PATENT DOCUMENTS

| | | |
|---|---|---|
| CN | 101894266 A | 11/2010 |
| CN | 102135838 A | 7/2011 |
| CN | 102243570 A | 11/2011 |
| CN | 102449640 A | 5/2012 |
| CN | 102455911 A | 5/2012 |
| CN | 102566933 A | 7/2012 |
| CN | 102722240 A | 10/2012 |
| CN | 103294257 A | 9/2013 |
| CN | 105247540 A | 1/2016 |
| EP | 2031485 A1 | 3/2009 |
| EP | 2336871 A1 | 6/2011 |
| EP | 2386984 A2 | 11/2011 |
| EP | 2386984 A3 | 6/2013 |
| EP | 2650766 A1 | 10/2013 |
| EP | 3065083 A1 | 9/2016 |
| HK | 1220276 A1 | 4/2017 |
| JP | 7-57053 A | 3/1995 |
| JP | 7-57053 B2 | 6/1995 |
| JP | 8-339415 A | 12/1996 |
| JP | 9-507936 A | 8/1997 |
| JP | 9-507937 A | 8/1997 |
| JP | 10-307675 A | 11/1998 |
| JP | 2002-15282 A | 1/2002 |
| JP | 2003-178257 A | 6/2003 |
| JP | 2005-341387 A | 12/2005 |
| JP | 2005-341411 A | 12/2005 |
| JP | 2009-289188 A | 12/2009 |
| JP | 2013-89131 A | 5/2013 |
| JP | 2013-206141 A | 10/2013 |
| JP | 2014-178954 A | 9/2014 |
| JP | 2015-501022 A | 1/2015 |
| JP | 2015-97103 A | 5/2015 |
| JP | 2015-148946 A | 8/2015 |
| KR | 10-2006-0135056 A | 12/2006 |
| KR | 10-1417286 B1 | 7/2014 |
| KR | 10-2016-0003112 A | 1/2016 |
| KR | 10-2016-0065174 A | 6/2016 |
| TW | I286708 B | 9/2007 |
| TW | 201142627 A | 12/2011 |
| TW | 201201113 A | 1/2012 |
| TW | 201216124 A | 4/2012 |
| TW | 201234280 A | 8/2012 |
| TW | 201237764 A | 9/2012 |
| TW | 201305925 A | 2/2013 |
| WO | 98/33111 A1 | 7/1998 |
| WO | 2005/008899 A1 | 1/2005 |
| WO | 2006/115825 A2 | 11/2006 |
| WO | 2008/005304 A2 | 1/2008 |
| WO | 2010/117505 A2 | 10/2010 |
| WO | 2010/117505 A3 | 1/2011 |
| WO | 2012/071730 A1 | 6/2012 |
| WO | 2013/048880 A1 | 4/2013 |
| WO | 2014/200736 A1 | 12/2014 |
| WO | 2014/205648 A1 | 12/2014 |
| WO | 2015/094587 A1 | 6/2015 |
| WO | 2015/122885 A1 | 8/2015 |

OTHER PUBLICATIONS

Advisory Action received for U.S. Appl. No. 14/292,138, dated May 10, 2019, 7 pages.

Advisory Action received for U.S. Appl. No. 15/003,773, dated Sep. 4, 2018, 6 pages.

Corrected Notice of Allowability received for U.S. Appl. No. 16/265,676, dated Aug. 26, 2019, 4 pages.

Corrected Notice of Allowance received for U.S. Appl. No. 14/290,935, dated Dec. 18, 2017, 6 pages.

Corrected Notice of Allowance received for U.S. Appl. No. 15/614,276, dated Dec. 10, 2018, 2 pages.

Das, et al., "A statistical-topological feature combination for recognition of handwritten numerals", Applied Soft Computing, vol. 12, 2012, pp. 2486-2495.

Decision to Grant received for Danish Patent Application No. PA201670624, dated Feb. 5, 2018, 3 pages.

Decision to Grant received for Danish Patent Application No. PA201670626, dated Mar. 21, 2018, 2 pages.

Decision to Grant received for European Patent Application No. 17173810.7, dated Apr. 4, 2019, 2 pages.

Extended European Search Report received for European Patent Application No. 17211174.2, dated Mar. 27, 2018, 13 pages.

Extended European Search Report received for European Patent Application No. 17173810.7, dated Oct. 17, 2017, 24 pages.

Final Office Action received for U.S. Appl. No. 11/620,642, dated Nov. 29, 2010, 14 pages.

(56) References Cited

OTHER PUBLICATIONS

Final Office Action received for U.S. Appl. No. 14/290,935, dated Apr. 10, 2017, 15 pages.
Final Office Action received for U.S. Appl. No. 14/290,945, dated Jan. 21, 2016, 12 pages.
Final Office Action received for U.S. Appl. No. 14/292,138, dated Jan. 10, 2019, 35 pages.
Final Office Action received for U.S. Appl. No. 14/292,138, dated Jun. 1, 2018, 31 pages.
Final Office Action received for U.S. Appl. No. 14/292,138, dated Jun. 3, 2016, 28 pages.
Final Office Action received for U.S. Appl. No. 15/003,773, dated May 10, 2018, 12 pages.
Final Office Action received for U.S. Appl. No. 15/003,773, dated May 30, 2019, 11 pages.
Ghosh, et al., "Script Recognition—A Review", IEEE Transactions on Pattern Analysis and Machine Intelligence, vol. 32, No. 12, Dec. 2010, pp. 2142-2161.
Huang, et al., "A Hybrid HMM-SVM Method for Online Handwriting Symbol Recognition", Proceedings of the Sixth International Conference on Intelligent Systems Design and Applications, Jinan, 2006, pp. 887-891.
Intention to Grant received for Danish Patent Application No. PA201670624, dated Oct. 17, 2017, 2 pages.
Intention to grant received for Danish Patent Application No. PA201670626, dated Jan. 26, 2018, 2 pages.
Intention to Grant Received for European Patent Application No. 17173810.7, dated Nov. 21, 2018, 8 pages.
Intention to Grant received for European Patent Application No. 17211174.2, dated Apr. 9, 2019, 7 pages.
International Preliminary Report on Patentability received for PCT Patent Application No. PCT/US2007/088873, dated Jul. 7, 2009, 6 pages.
International Preliminary Report on Patentability received for PCT Patent Application No. PCT/US2014/040417, dated Dec. 23, 2015, 8 pages.
International Search Report and Written Opinion received for PCT Patent Application No. PCT/US2007/088873, dated May 8, 2008, 7 pages.
International Search Report and Written Opinion received for PCT Patent Application No. PCT/US2014/040417, dated Sep. 25, 2014, 10 pages.
K.C., et al., "A Comprehensive Survey on On-Line Handwriting Recognition Technology and its Real Application to the Nepalese Natural Handwriting", Kathmandu University Journal of Science, Engineering, and Technology, vol. 5, No. 1, Jan. 2009, pp. 31-55.
Kessentini, et al., "A Multi-Stream HMM-based Approach for Off-line Multi-Script Handwritten Word Recognition", Proceedings of the ICFHR'08, Jan. 1, 2011, 6 pages.
Malaviya, et al., "Fuzzy handwriting description language: FOHDEL", Pattern Recognition, vol. 33, 2000, pp. 119-131.
Natarajan, et al., "Multilingual Machine Printed OCR", International Journal of Pattern Recognition and Artificial Intelligence, vol. 15, No. 1, 2001, pp. 43-63.
Natarajan, et al., "Multi-lingual Offline Handwriting Recognition Using Hidden Markov Models: A Script-Independent Approach", Arabic and Chinese Handwriting Recognition, Lecture Notes in Computer Science, Sep. 27, 2006, pp. 231-250.
Non-Final Office Action received for U.S. Appl. No. 14/291,865, dated Sep. 24, 2015, 27 pages.
Non-Final Office Action received for U.S. Appl. No. 14/292,138, dated Sep. 10, 2015, 29 pages.
Non-Final Office Action received for U.S. Appl. No. 14/292,138, dated Sep. 12, 2018, 33 pages.
Non-Final Office Action received for U.S. Appl. No. 90/012,892, dated Aug. 5, 2014, 54 pages.
Non-Final Office Action received for U.S. Appl. No. 90/012,892, dated Mar. 27, 2015, 102 pages.
Non-Final Office Action received for U.S. Appl. No. 11/620,642, dated Feb. 18, 2011, Feb. 18, 2011, 16 pages.
Non-Final Office Action received for U.S. Appl. No. 11/620,642, dated Mar. 30, 2010, Mar. 30, 2010, 10 pages.
Non-Final Office Action received for U.S. Appl. No. 13/310,586, dated Jul. 9, 2015, 10 pages.
Non-Final Office Action received for U.S. Appl. No. 13/310,592, dated Jun. 22, 2015, 9 pages.
Non-Final Office Action received for U.S. Appl. No. 14/290,935, dated Jun. 7, 2016, 12 pages.
Non-Final Office Action received for U.S. Appl. No. 14/290,945, dated Jul. 16, 2015, 11 pages.
Non-Final Office Action received for U.S. Appl. No. 14/291,722, dated Aug. 26, 2016, 17 pages.
Non-Final Office Action received for U.S. Appl. No. 14/292,138, dated Aug. 10, 2017, 28 pages.
Non-Final Office Action received for U.S. Appl. No. 14/292,138, dated Dec. 15, 2016, 25 pages.
Non-Final Office Action received for U.S. Appl. No. 15/003,773, dated Dec. 11, 2018, 11 pages.
Non-Final Office Action received for U.S. Appl. No. 15/003,773, dated Oct. 5, 2017, 10 pages.
Non-Final Office Action received for U.S. Appl. No. 15/275,309, dated Feb. 27, 2018, 17 pages.
Non-Final Office Action received for U.S. Appl. No. 15/280,749, dated Jan. 17, 2017, 18 pages.
Non-Final Office Action received for U.S. Appl. No. 15/614,276, dated Jul. 12, 2018, 13 pages.
Notice of Acceptance received for Australian Patent Application No. 2017203816, dated Jul. 30, 2018, 3 pages.
Notice of Allowance received for Chinese Patent Application No. 201480030897.0, dated Aug. 3, 2018, 2 pages.
Notice of Allowance Received for Japanese Patent Application No. 2016-518366, dated May 8, 2017, 3 pages.
Notice of Allowance received for Japanese Patent Application No. 2017-108227, dated Feb. 4, 2019, 4 pages.
Notice of Allowance received for Korean Patent Application No. 10-2015-7033627, dated May 28, 2018, 4 pages.
Notice of Allowance received for Korean Patent Application No. 10-2017-0068927, dated Feb. 25, 2019, 3 pages.
Notice of Allowance received for Korean Patent Application No. 10-2018-7024261, dated Apr. 24, 2019, 7 pages.
Notice of Allowance received for Taiwanese Patent Application No. 103119279, dated Nov. 29, 2018, 5 pages.
Notice of Allowance received for Taiwanese Patent Application No. 103119324, dated Sep. 30, 2016, 2 pages.
Notice of Allowance received for Taiwanese Patent Application No. 103119951, dated Aug. 23, 2016, 2 pages.
Notice of Allowance received for U.S. Appl. No. 13/310,586, dated Sep. 14, 2015, 9 pages.
Notice of Allowance received for U.S. Appl. No. 11/620,642, dated Oct. 24, 2011, Oct. 24, 2011, 8 pages.
Notice of Allowance received for U.S. Appl. No. 13/310,592, dated Jul. 15, 2015, 8 pages.
Notice of Allowance received for U.S. Appl. No. 14/290,935, dated Oct. 12, 2017, 11 pages.
Notice of Allowance received for U.S. Appl. No. 14/290,945, dated Jun. 8, 2016, 9 pages.
Notice of Allowance received for U.S. Appl. No. 14/291,865, dated Apr. 8, 2016, 9 pages.
Notice of Allowance received for U.S. Appl. No. 15/275,309, dated Sep. 27, 2018, 7 pages.
Notice of Allowance received for U.S. Appl. No. 15/280,749, dated Jul. 11, 2017, 10 pages.
Notice of Allowance received for U.S. Appl. No. 15/280,749, dated Nov. 29, 2017, 9 pages.
Notice of Allowance received for U.S. Appl. No. 15/614,276, dated Jan. 17, 2019, 4 pages.
Notice of Allowance received for U.S. Appl. No. 15/614,276, dated Oct. 31, 2018, 11 pages.
Notice of Allowance received for U.S. Appl. No. 16/265,676, dated Jul. 3, 2019, 11 pages.
Notice of Intent received for U.S. Appl. No. 90/012,892, dated Sep. 17, 2015, 10 pages.

(56) References Cited

OTHER PUBLICATIONS

Office Action received for Australian Patent Application No. 2017203816, dated Feb. 12, 2018, 3 pages.
Office Action received for Australian Patent Application No. 2018260930, dated Jun. 26, 2019, 3 pages.
Office Action received for Chinese Patent Application No. 201480030897.0, dated Mar. 12, 2018, 10 pages.
Office Action received for Danish Patent Application No. PA201670624, dated Jun. 28, 2017, 3 pages.
Office Action received for Danish Patent Application No. PA201670624, dated Oct. 20, 2016, 8 pages.
Office Action received for Danish Patent Application No. PA201670626, dated Jun. 30, 2017, 3 Pages.
Office Action received for Danish Patent Application No. PA201670626, dated Oct. 24, 2016, 8 pages.
Office Action received for Danish Patent Application No. PA201770921, dated Apr. 26, 2019, 6 pages.
Office Action received for Danish Patent Application No. PA201770921, dated Dec. 6, 2018, 6 pages.
Office Action received for Danish Patent Application No. PA201770921, dated May 3, 2018, 3 pages.
Office Action received for European Patent Application No. 07869923.8, dated May 26, 2010, May 26, 2010, 4 pages.
Office Action Received for Japanese Patent Application No. 2016-518366, dated Nov. 7, 2016, 8 pages.
Office Action received for Japanese Patent Application No. 2017-108227, dated Aug. 6, 2018, 8 pages.
Office Action received for Japanese Patent Application No. 2017-109294, dated Aug. 3, 2018, 9 pages.
Office Action received for Japanese Patent Application No. 2017-109294, dated Dec. 14, 2018, 4 pages.
Office Action received for Korean Patent Application No. 10-2015-7033627, dated Jul. 26, 2017, 5 pages.
Office Action received for Korean Patent Application No. 10-2017-0068927, dated Jun. 11, 2018, 14 pages.
Office Action received for Korean Patent Application No. 10-2018-7024261, dated Oct. 24, 2018, 5 pages.
Office Action received for Korean Patent Application No. 10-2019-0054454, dated May 20, 2019, 7 pages.
Office Action received for Taiwanese Patent Application No. 103119279, dated Aug. 1, 2018, 14 pages.
Office Action received for Taiwanese Patent Application No. 103119279, dated Dec. 21, 2016, 15 pages.
Office Action received for Taiwanese Patent Application No. 103119279, dated May 4, 2016, 13 pages.
Office Action received for Taiwanese Patent Application No. 103119279, dated Sep. 21, 2015, 21 pages.
Office Action received for Taiwanese Patent Application No. 103119324, dated Mar. 10, 2016, 23 pages.
Office Action received for Taiwanese Patent Application No. 103119816, dated Jun. 22, 2016, 9 pages.
Office Action received for Taiwanese Patent Application No. 103119951, dated Nov. 20, 2015, 6 pages.
Office Action received for Taiwanese Patent Application No. 103119952, dated Oct. 8, 2015, 16 pages.
Office Action received for Taiwanese Patent Application No. 103119952, dated Apr. 27, 2016, 2 pages.
Phạm, Dũng Việt, "Online handwriting recognition using multi convolution neural networks", In Proceedings of the 9$^{th}$ international conference on Simulated Evolution and Learning (SEAL'12). Springer-Verlag, Berlin, Heidelberg, 2012, pp. 310-319.
Rodríguez-Serrano, et al., "Handwritten word-spotting using hidden Markov models and universal vocabularies", Pattern Recognition, vol. 42, 2009, pp. 2106-2116.
Search Report received for Danish Patent Application No. PA201770921, dated Jan. 23, 2018, 7 pages.
Suresh, et al., "Fuzzy technique based recognition of handwritten characters", Image and Vision Computing, vol. 25, 2007, pp. 230-239.
Third Party Rejection received for U.S. Appl. No. 90/012,892, dated Jun. 14, 2013, 681 pages.
Warren, Tom, "Microsoft Android Wear keyboard", Online Available at: https://www.youtube.com/watch?v=_lu7bUKKrJE, Oct. 11, 2014, 4 pages.
Wikipedia, "Framebuffer" Retrieved from the Internet & URL: https://en.wikipedia.org/wiki/Framebuffer, retrieved on Dec. 7, 2015, pp. 1-7.
Advisory Action received for U.S. Appl. No. 15/003,773, dated Sep. 12, 2019, 6 pages.
Decision to Grant received for European Patent Application No. 17211174.2, dated Aug. 29, 2019, 2 pages.
Extended European Search Report received for European Patent Application No. 19171354.4, dated Sep. 23, 2019, 11 pages.
Intention to Grant received for European Patent Application No. 17211174.2, dated Aug. 20, 2019, 6 pages.
Non-Final Office Action received for U.S. Appl. No. 15/898,025, dated Jul. 11, 2019, 9 pages.
Notice of Allowance received for Japanese Patent Application No. 2017-109294, dated Jun. 24, 2019, 4 pages (1 page of English Translation and 3 pages of Official Copy).
Notice of Allowance received for Korean Patent Application No. 10-2019-0054454, dated Oct. 24, 2019, 3 pages (1 page of English Translation and 2 pages of Official Copy).
Notice of Allowance received for U.S. Appl. No. 15/898,025, dated Nov. 27, 2019, 11 pages.
Notice of Allowance received for U.S. Appl. No. 15/003,773, dated Nov. 15, 2019, 5 pages.
Office Action received for Chinese Patent Application No. 201710424212.6, dated Oct. 28, 2019, 20 pages (7 pages of English Translation and 13 pages of Official Copy).
Office Action received for Korean Patent Application No. 10-2019-7021958, dated Oct. 21, 2019, 5 pages (2 pages of English Translation and 3 pages of Official Copy).
Notice of Acceptance received for Australian Patent Application No. 2018260930, dated Nov. 11, 2019, 3 pages.
Office Action received for Japanese Patent Application No. 2019-040836, dated May 15, 2020, 5 pages (2 pages of English Translation and 3 pages of Official Copy).
Office Action received for Korean Patent Application No. 10-2020-7016098, dated Jun. 15, 2020, 5 pages (2 pages of English Translation and 3 pages of Official Copy).
Notice of Allowance received for Korean Patent Application No. 10-2019-7021958, dated Apr. 28, 2020, 4 pages (1 page of English Translation and 3 pages of Official Copy).
Office Action received for Chinese Patent Application No. 201711258408.9, dated Jun. 23, 2020, 14 pages (7 pages of English Translation and 7 pages of Official Copy).
Office Action received for Korean Patent Application No. 10-2020-0010129, dated Jul. 27, 2020, 11 pages (5 pages of English Translation and 6 pages of Official Copy).
Office Action received for Japanese Patent Application No. 2019-040836, dated Aug. 14, 2020, 4 pages (2 pages of English Translation and 2 pages of Official Copy).
Office Action received for Australian Patent Application No. 2020200191, dated Sep. 25, 2020, 3 pages.
Office Action received for Chinese Patent Application No. 201710424212.6, dated Sep. 9, 2020, 6 pages (3 pages English Translation and 3 pages of Official Copy).

* cited by examiner

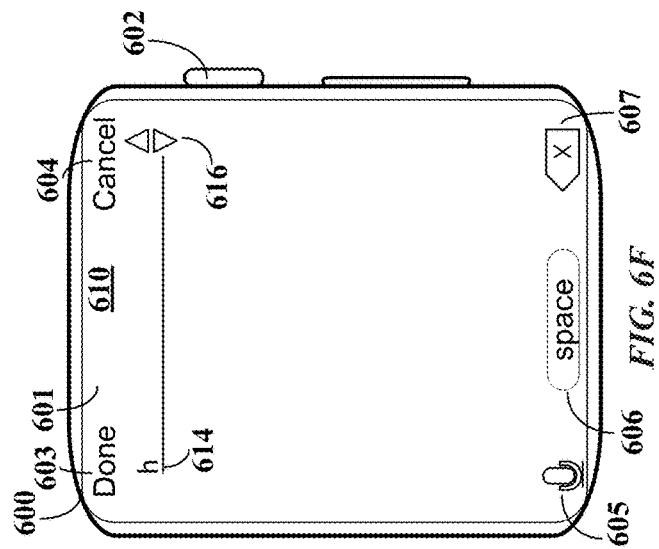
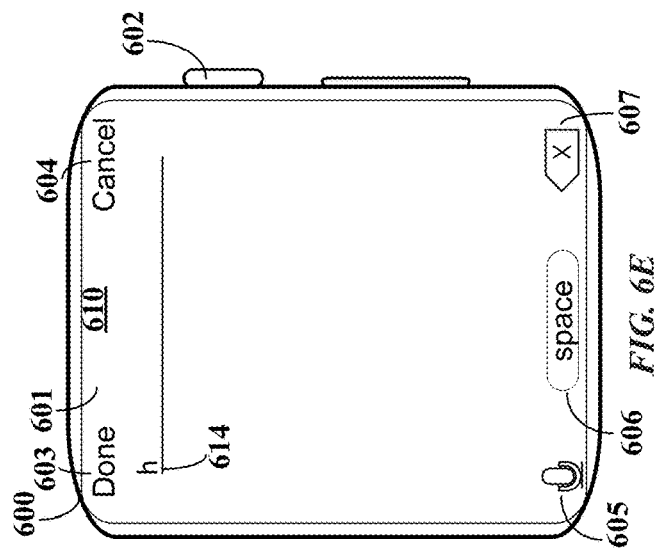
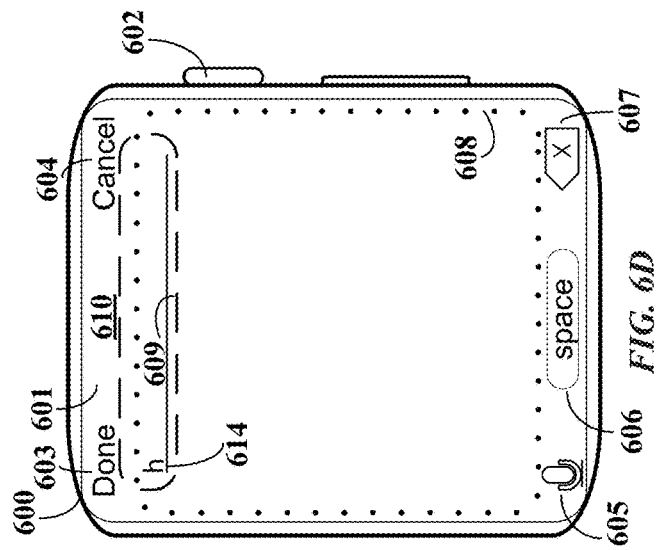

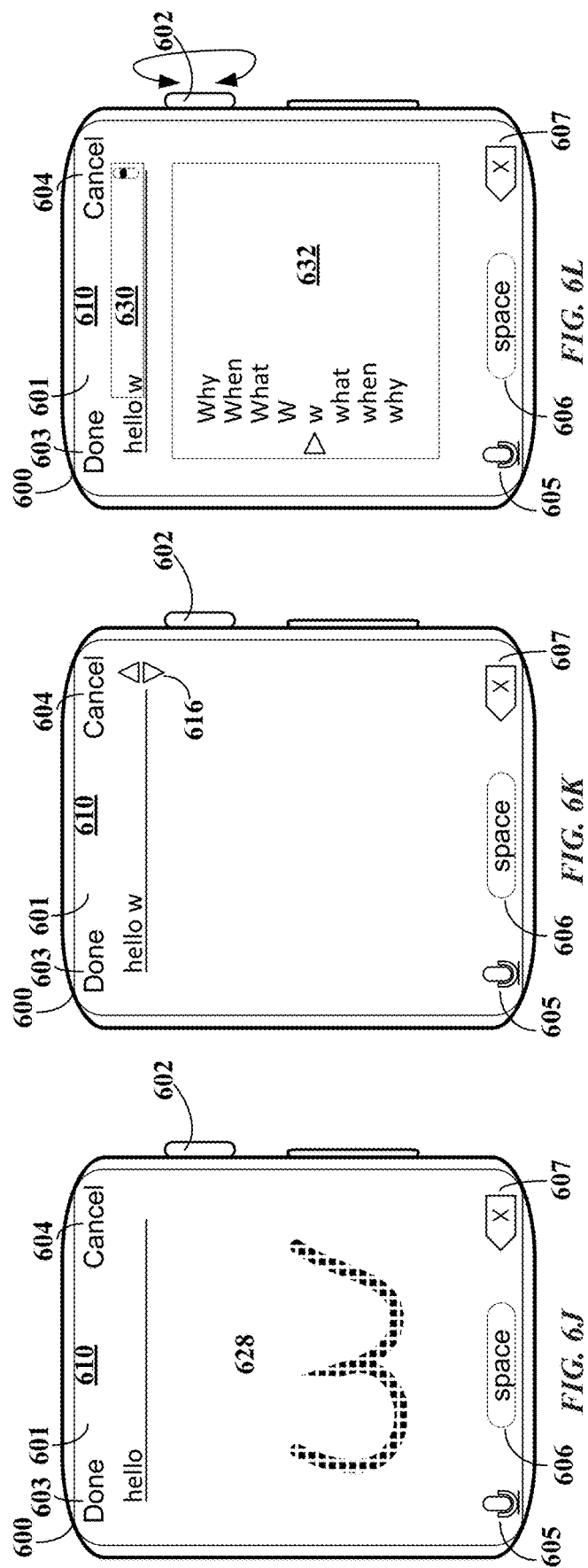

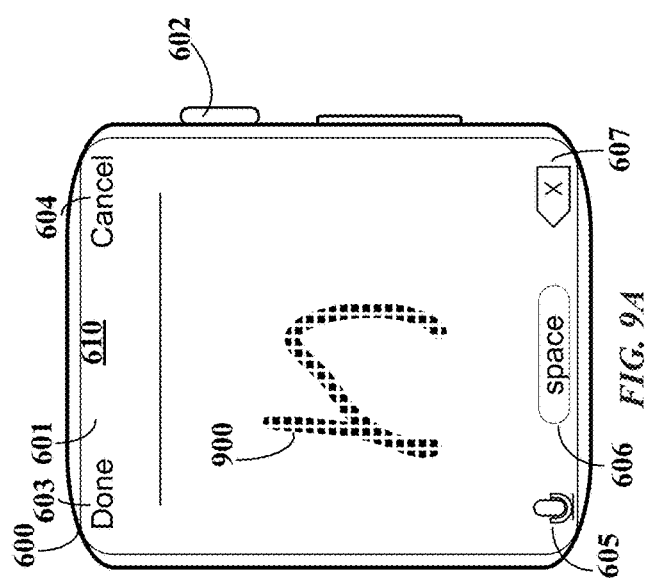
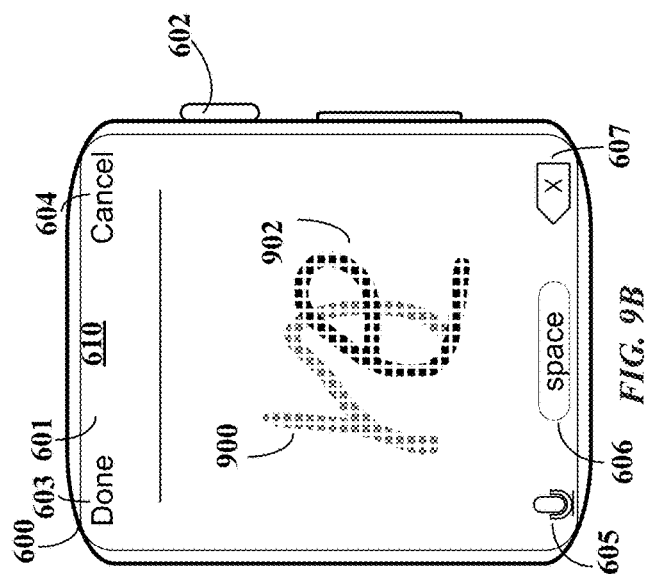
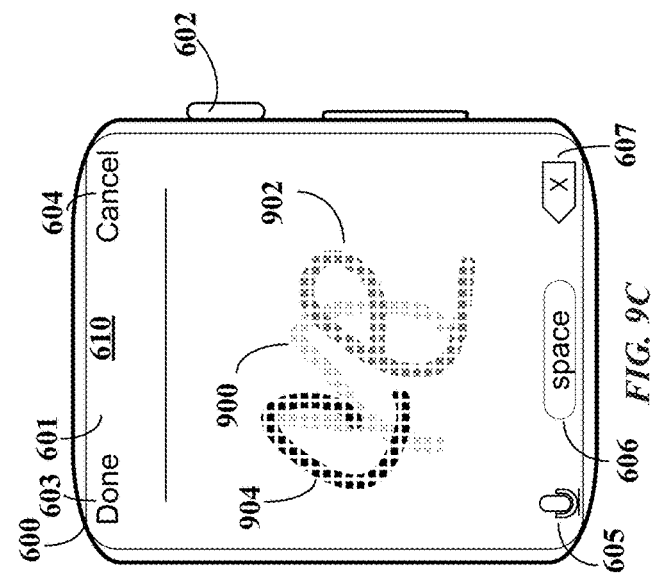

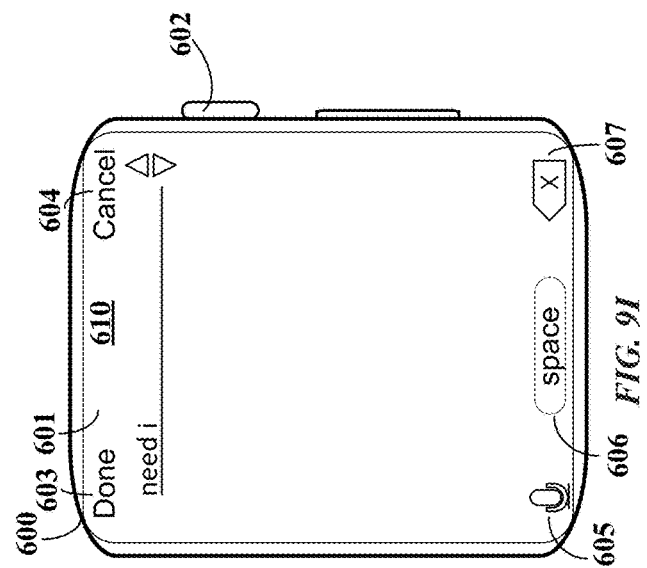
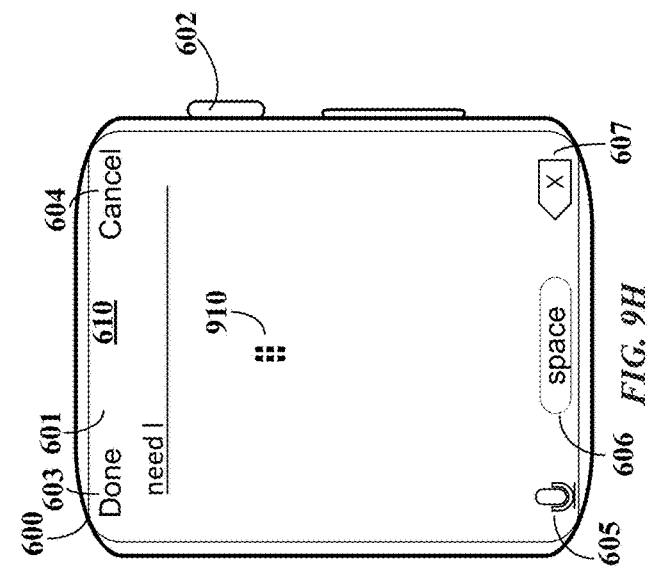
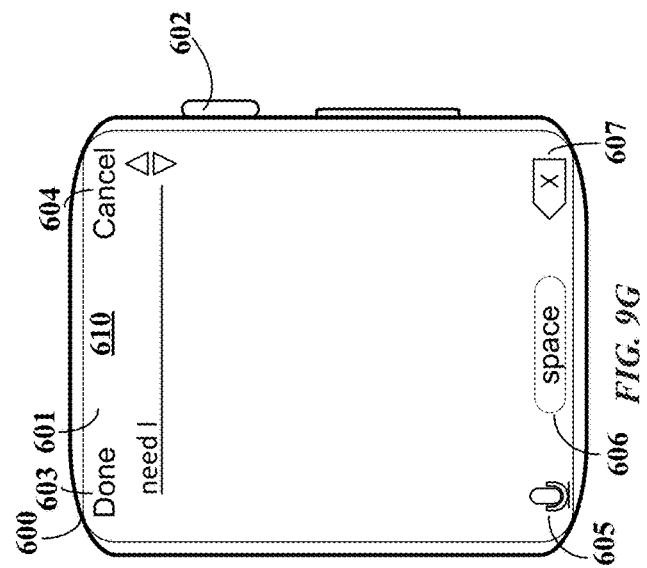

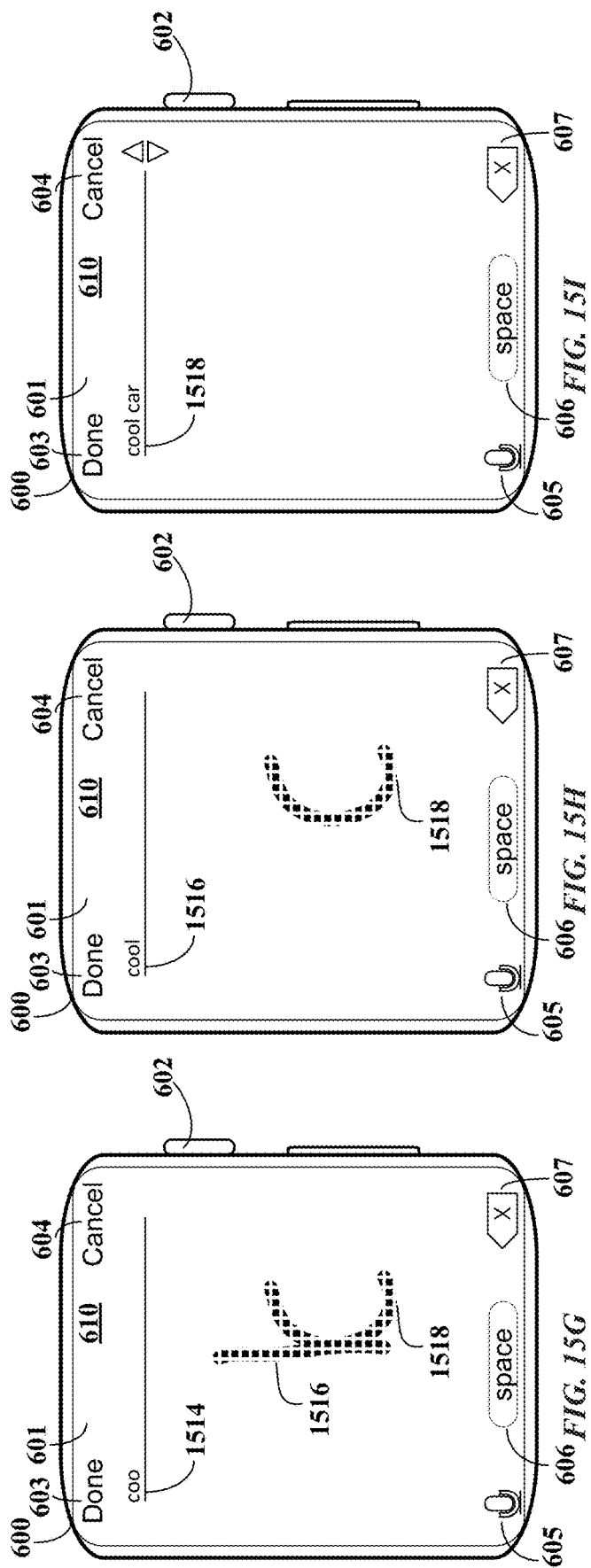

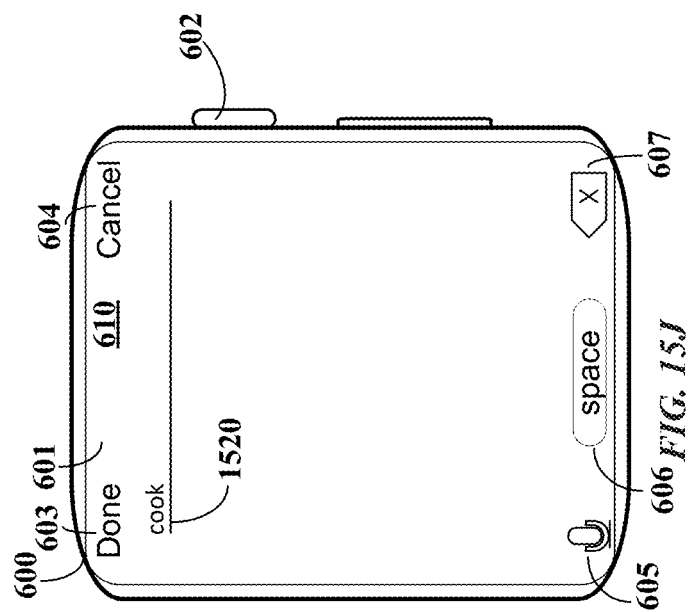

HANDWRITING KEYBOARD FOR SCREENS

This application is a continuation of U.S. patent application Ser. No. 16/265,676, entitled "HANDWRITING KEYBOARD FOR SCREENS," filed Feb. 1, 2019, which is a continuation of U.S. patent application Ser. No. 15/614,276, entitled "HANDWRITING KEYBOARD FOR SCREENS," filed Jun. 5, 2017, which claims priority to U.S. Provisional Patent Application 62/349,111, entitled "HANDWRITING KEYBOARD FOR SMALL SCREENS," filed Jun. 12, 2016, the content of which are hereby incorporated by reference in their entireties.

FIELD

The present disclosure relates generally to computer user interfaces, and more specifically to techniques for handwriting on small screens.

BACKGROUND

Wearable electronic devices often have display screens for displaying information and allowing for a minimal amount of interface with the electronic device and content stored thereon.

BRIEF SUMMARY

Some of these wearable devices include touch sensitive surfaces, but the screens are of such small size that it is difficult to enter text on the device directly. Other methods of data entry, such as dictation are possible but have downsides as well. In the case of messaging, predefined messages are of some use for are only appropriate when one of the limited number of predefined messages applies the current situation.

Some techniques for handwriting on small screens using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for handwriting on small screens. Such methods and interfaces optionally complement or replace other methods for handwriting on small screens. Such methods and interfaces reduce the cognitive burden on a user and produce a more efficient human-machine interface. For battery-operated computing devices, such methods and interfaces conserve power and increase the time between battery charges. For example, techniques described below provide for more efficient recognition of handwriting entered through a touch sensitive surface by allowing for revision of already recognized text, both manually and automatically, intelligent gathering and processing of stroke inputs, and recognition of when strokes inputs belong to a current character or a next character.

In accordance with an embodiment, at a portable electronic device having one or more processors, a touch sensitive surface, a display, and a rotatable input mechanism: displaying a user input interface on the display including a message area and a stroke input area; receiving a first set of strokes on the touch sensitive surface in the stroke input area; determining first text based on the first set of strokes; displaying the first text on the display in the message area; determining one or more suggestions based on the first text, wherein the one or more suggestions include one or more changes to the first text; after determining the one or more suggestions, receiving user input via the rotatable input mechanism; in response to the user input: displaying at least one of the one or more suggestions; and displaying a selection indicator indicating a selected suggestion of the one or more suggestions; and after displaying the at least one or the one or more suggestions and the selection indicator, replacing display of the first text with display of the selected suggestion.

An embodiment of a transitory computer-readable storage medium stores one or more programs configured to be executed by one or more processors of a portable electronic device with a touch sensitive surface, a display, and a rotatable input mechanism, the one or more programs including instructions for: displaying a user input interface on the display including a message area and a stroke input area; receiving a first set of strokes on the touch sensitive surface in the stroke input area; determining first text based on the first set of strokes; displaying the first text on the display in the message area; determining one or more suggestions based on the first text, wherein the one or more suggestions include one or more changes to the first text; after determining the one or more suggestions, receiving user input via the rotatable input mechanism; in response to the user input: displaying at least one of the one or more suggestions; and displaying a selection indicator indicating a selected suggestion of the one or more suggestions; and after displaying the at least one or the one or more suggestions and the selection indicator, replacing display of the first text with display of the selected suggestion.

In accordance with an embodiment, at an electronic device having one or more processors, a touch sensitive surface, a display, and a rotatable input mechanism: displaying a user input interface on the display including a message area and a stroke input area; receiving a first set of strokes on the touch sensitive surface in the stroke input area; determining first text based on the first set of strokes; displaying the first text in the message area; receiving a second set of strokes on the touch sensitive surface in the stroke input area after receiving the first set of strokes and displaying the first text; determining revised first text based on the first set and second set of strokes; and replacing the display of the first text with the revised first text.

An embodiment of a transitory computer-readable storage medium stores one or more programs configured to be executed by one or more processors of an electronic device with a touch sensitive surface, a display, and a rotatable input mechanism, the one or more programs including instructions for: displaying a user input interface on the display including a message area and a stroke input area; receiving a first set of strokes on the touch sensitive surface in the stroke input area; determining first text based on the first set of strokes; displaying the first text in the message area; receiving a second set of strokes on the touch sensitive surface in the stroke input area after receiving the first set of strokes and displaying the first text; determining revised first text based on the first set and second set of strokes; and replacing the display of the first text with the revised first text.

In accordance with an embodiment, at an electronic device having one or more processors, a touch sensitive surface, a display, and a rotatable input mechanism: displaying a user input interface on the display including a message area and a stroke input area; receiving a first set of strokes on the touch sensitive surface in the stroke input area; starting to determine first text based on the first set of strokes; without displaying the first text in the message area, receiving a second set of strokes on the touch sensitive surface in the stroke input area after receiving the first set of strokes; determining revised first text based on the first set and second set of strokes; and displaying the revised first text in the message area.

An embodiment of a transitory computer-readable storage medium that stores one or more programs configured to be executed by one or more processors of an electronic device with a touch sensitive surface, a display, and a rotatable input mechanism, the one or more programs including instructions for: displaying a user input interface on the display including a message area and a stroke input area; receiving a first set of strokes on the touch sensitive surface in the stroke input area; starting to determine first text based on the first set of strokes; without displaying the first text in the message area, receiving a second set of strokes on the touch sensitive surface in the stroke input area after receiving the first set of strokes; determining revised first text based on the first set and second set of strokes; and displaying the revised first text in the message area.

In accordance with an embodiment, at an electronic device having one or more processors, a touch sensitive surface, a display, and a rotatable input mechanism: displaying a user input interface on the display including a message area and a stroke input area; receiving, on the touch sensitive surface in the stroke input area, a first stroke; at a first time after receiving the first stroke, receiving on the touch sensitive surface a second stroke, wherein the second stroke is distinct from the first stroke; determining whether the first time exceeds a threshold time; in accordance with a determination that the first time exceeds the threshold time, determining a first character based on the first stroke but not the second stroke; in accordance with a determination that the first time is less than the threshold time, determining a first character based on the first stroke and the second stroke; and displaying the first character in the message area.

An embodiment of a transitory computer-readable storage medium stores one or more programs configured to be executed by one or more processors of an electronic device with a touch sensitive surface, a display, and a rotatable input mechanism, the one or more programs including instructions for: displaying a user input interface on the display including a message area and a stroke input area; receiving, on the touch sensitive surface in the stroke input area, a first stroke; at a first time after receiving the first stroke, receiving on the touch sensitive surface a second stroke, wherein the second stroke is distinct from the first stroke; determining whether the first time exceeds a threshold time; in accordance with a determination that the first time exceeds the threshold time, determining a first character based on the first stroke but not the second stroke; in accordance with a determination that the first time is less than the threshold time, determining a first character based on the first stroke and the second stroke; and displaying the first character in the message area.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for handwriting on small screens, thereby increasing the effectiveness, efficiency, and user satisfaction with such devices. Such methods and interfaces may complement or replace other methods for handwriting on small screens.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 9A-9I illustrate exemplary user interfaces for handwriting on screens.

FIGS. 15A-15J illustrate exemplary user interfaces for handwriting on screens.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for handwriting on small screens. For example, wearable devices with small touch sensitive surfaces allow for access and navigation of some content and data, but these screens are presently difficult to use when entering textual data directly. Techniques described herein provide for better handwriting entry on to touch sensitive surfaces, particularly touch sensitive surfaces with small sizes. Such techniques can reduce the cognitive burden on a user who enters handwriting on small screens, thereby enhancing productivity. Further, such techniques can reduce processor and battery power otherwise wasted on redundant user inputs.

Figure 6A:
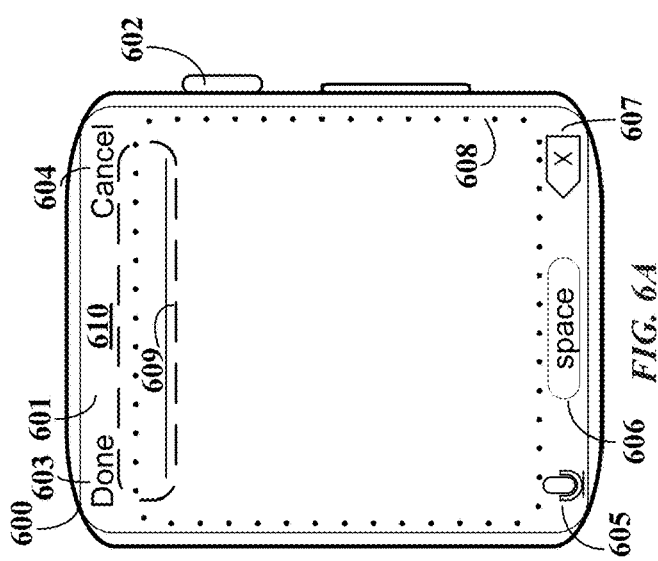
Figure 6R:
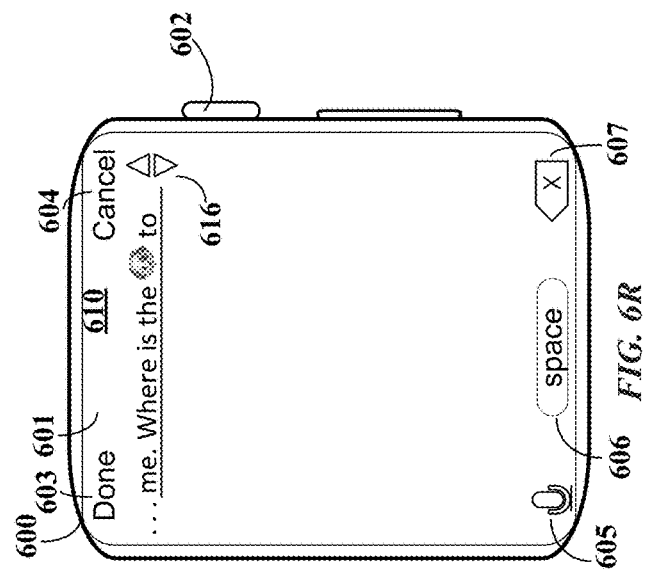
Figure 7:
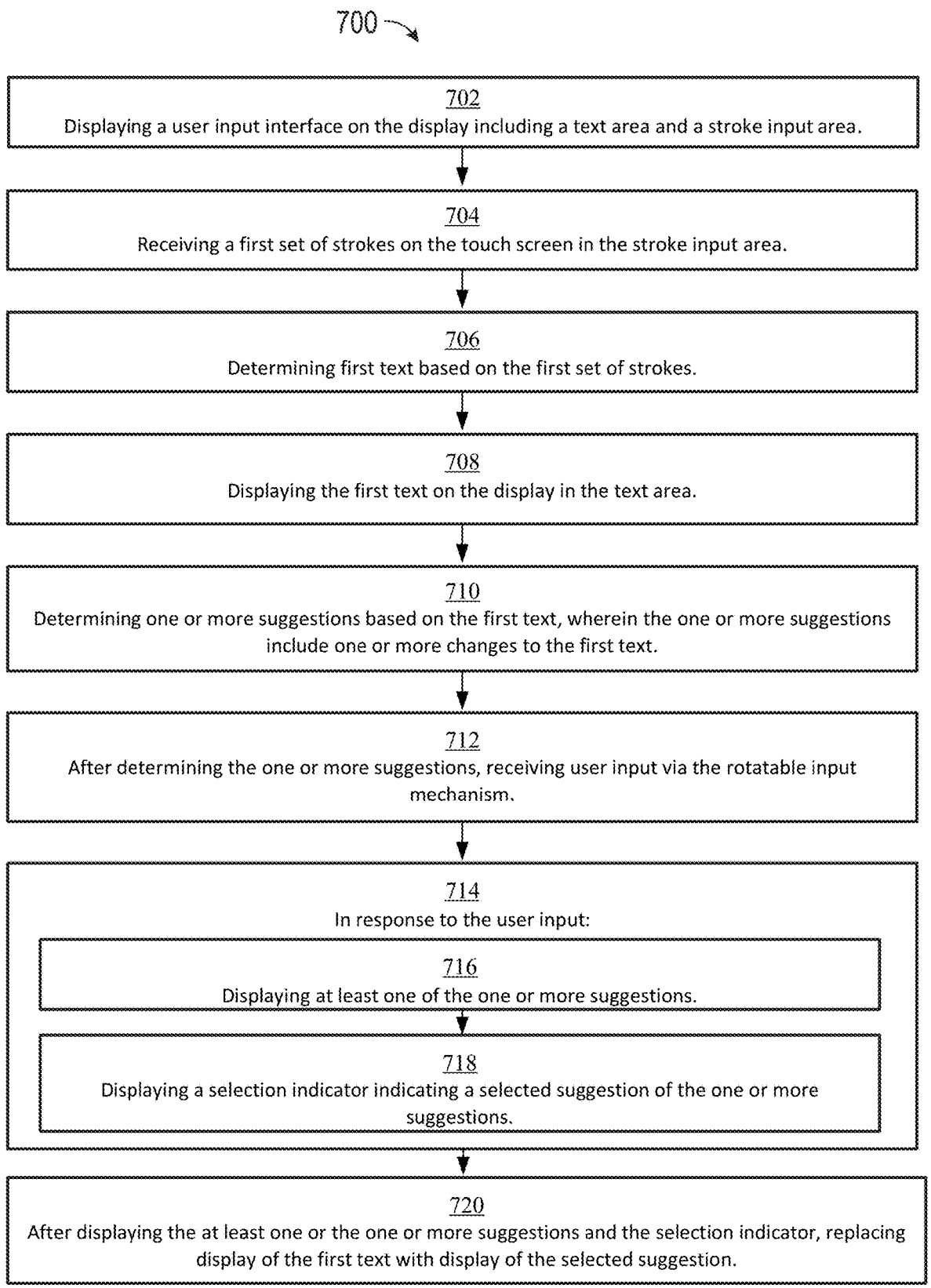
FIG. 7 is a flow diagram illustrating a method for handwriting on a touch sensitive surface.

Below, FIGS. 1A-1B, 2, 3, 4A-4B, and 5A-5H provide a description of exemplary devices for performing the techniques for managing event notifications. FIGS. 6A-6R illustrate exemplary user interfaces for managing event notifications. FIG. 7 is a flow diagram illustrating methods of managing event notifications in accordance with some embodiments. The user interfaces in FIGS. 6A-6R are used to illustrate the processes described below, including the processes in FIG. 7.

Figure 6C:
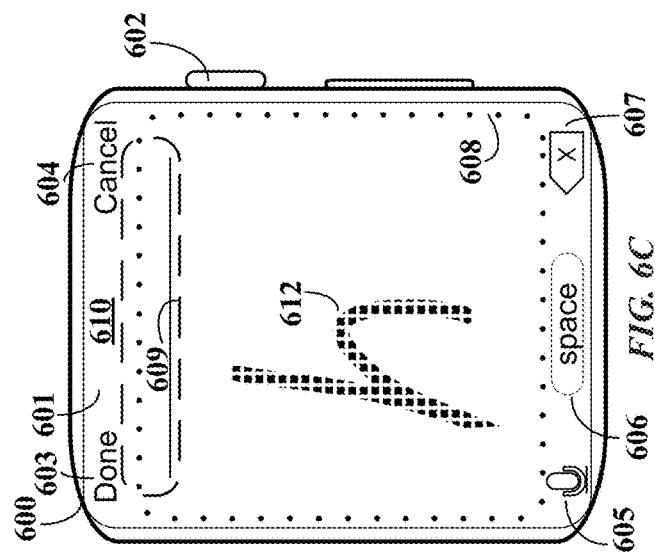
FIGS. 6A-6R illustrate exemplary user interfaces for handwriting on screens.
Figure 6B:
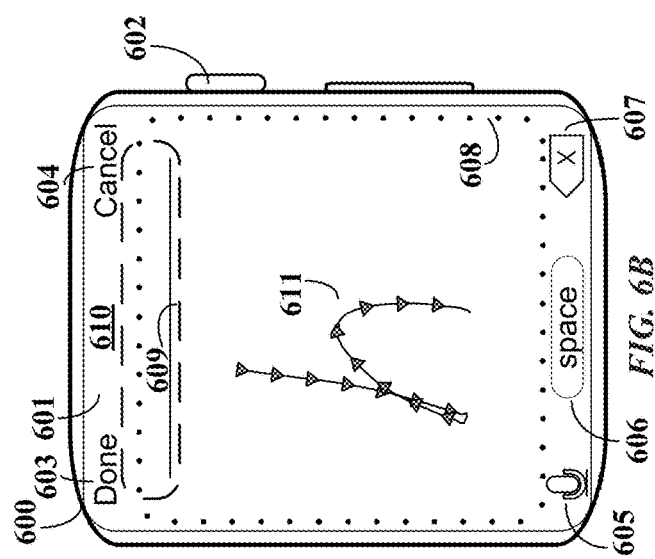
Figure 6I:
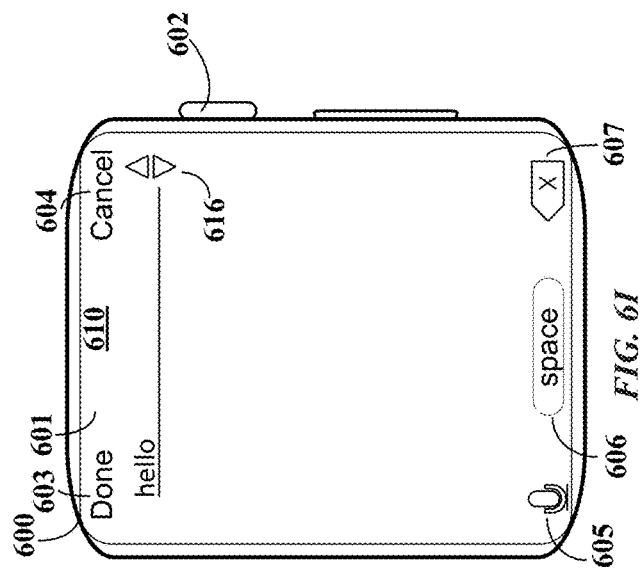
Figure 9F:
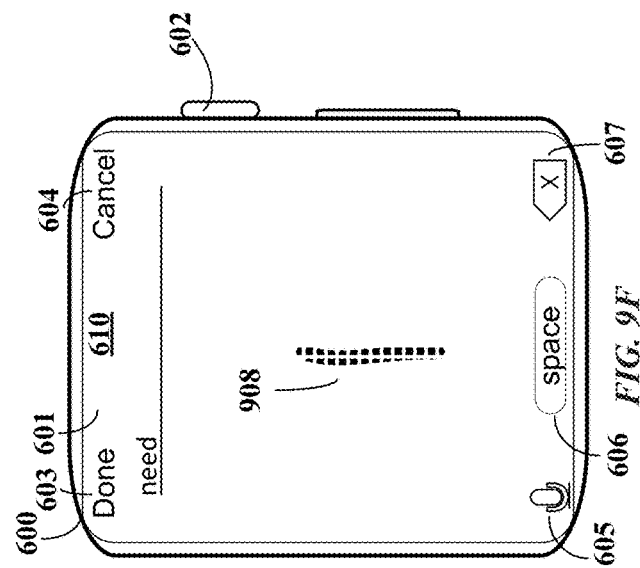
Figure 10:
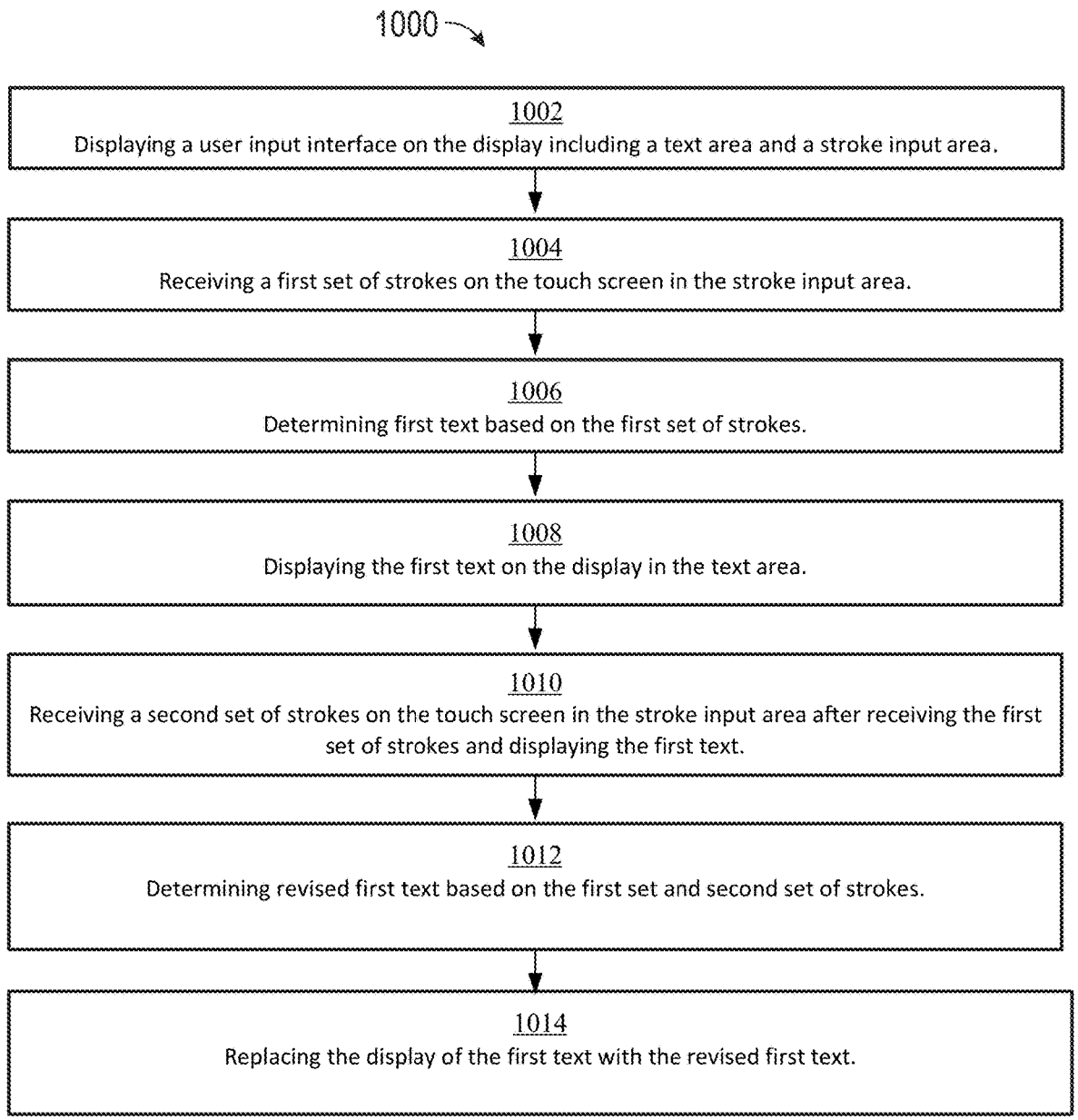
FIG. 10 is a flow diagram illustrating a method for handwriting on a touch sensitive surface.

FIGS. 9A-6I illustrate exemplary user interfaces for managing event notifications. FIG. 10 is a flow diagram illustrating methods of managing event notifications in accordance with some embodiments. The user interfaces in FIGS. 9A-6I are used to illustrate the processes described below, including the processes in FIG. 10.

Figure 12C:
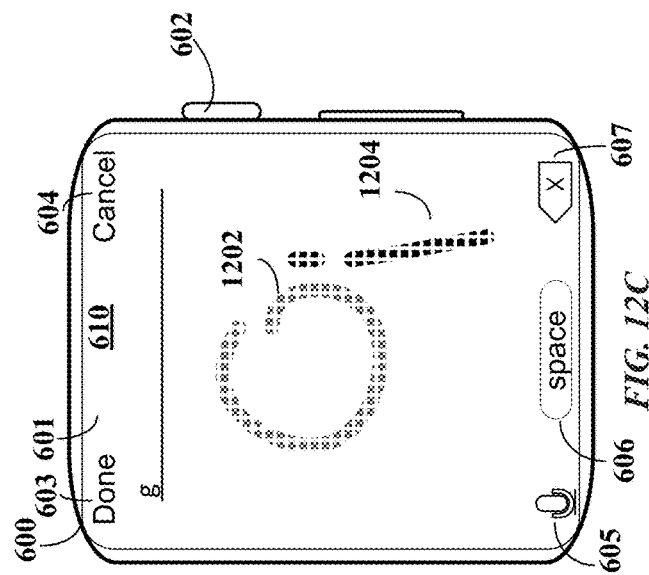
FIGS. 12A-12L illustrate exemplary user interfaces for handwriting on screens.
Figure 12B:
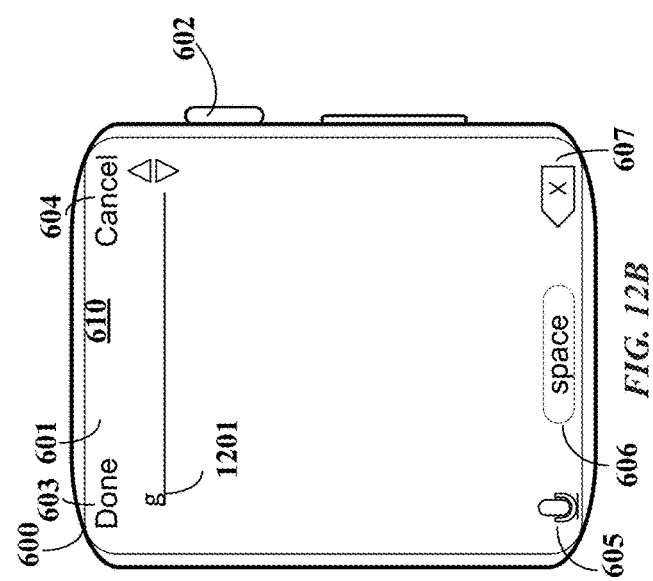

FIGS. 12A-12L illustrate exemplary user interfaces for managing event notifications. FIG. 13 is a flow diagram illustrating methods of managing event notifications in accordance with some embodiments. The user interfaces in FIGS. 12A-12L are used to illustrate the processes described below, including the processes in FIG. 13.

Figure 15C:
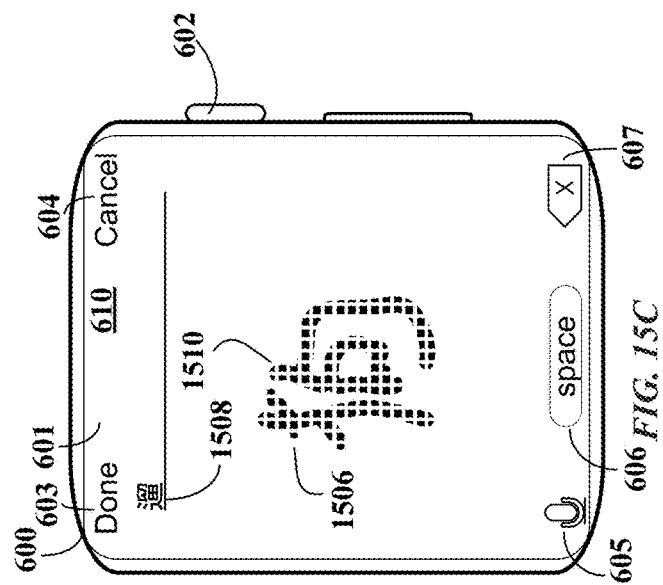
Figure 15B:
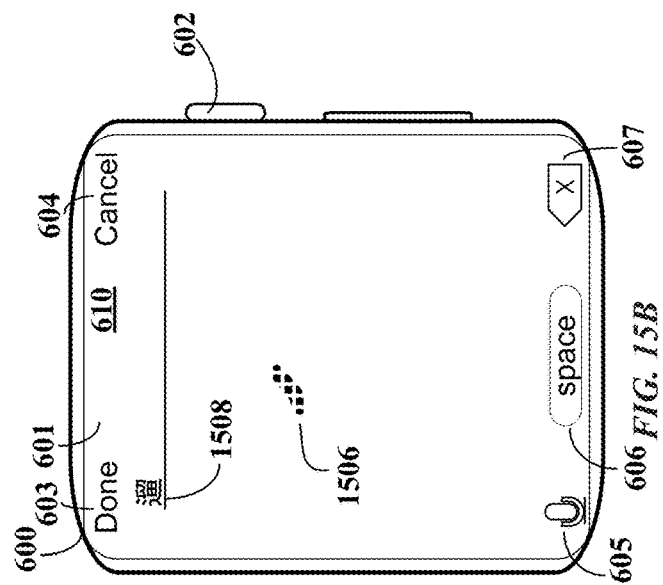

FIGS. 15A-15J illustrate exemplary user interfaces for managing event notifications. FIG. 16 is a flow diagram illustrating methods of managing event notifications in accordance with some embodiments. The user interfaces in FIGS. 15A-15J are used to illustrate the processes described below, including the processes in FIG. 16.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
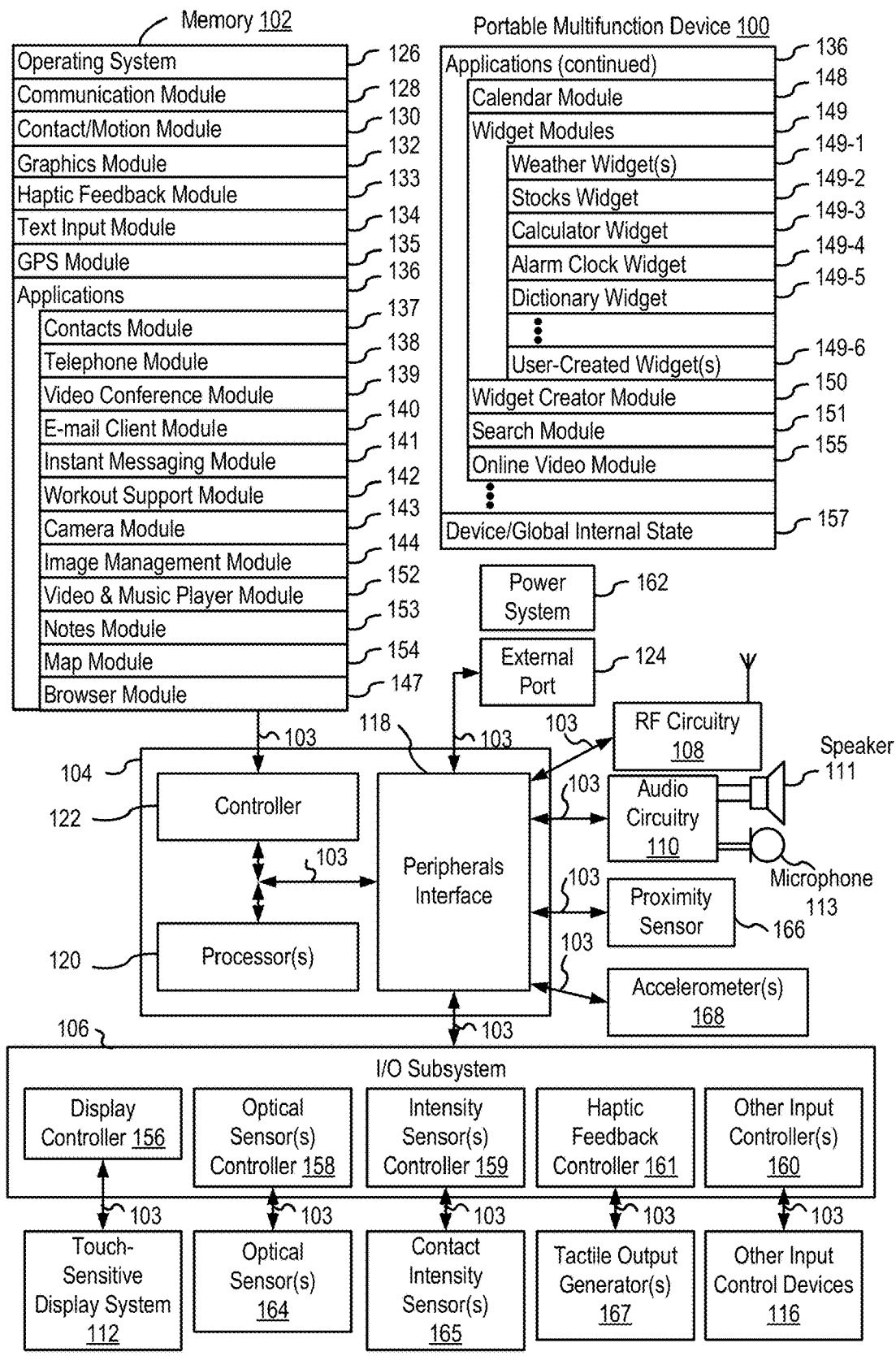
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons is, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
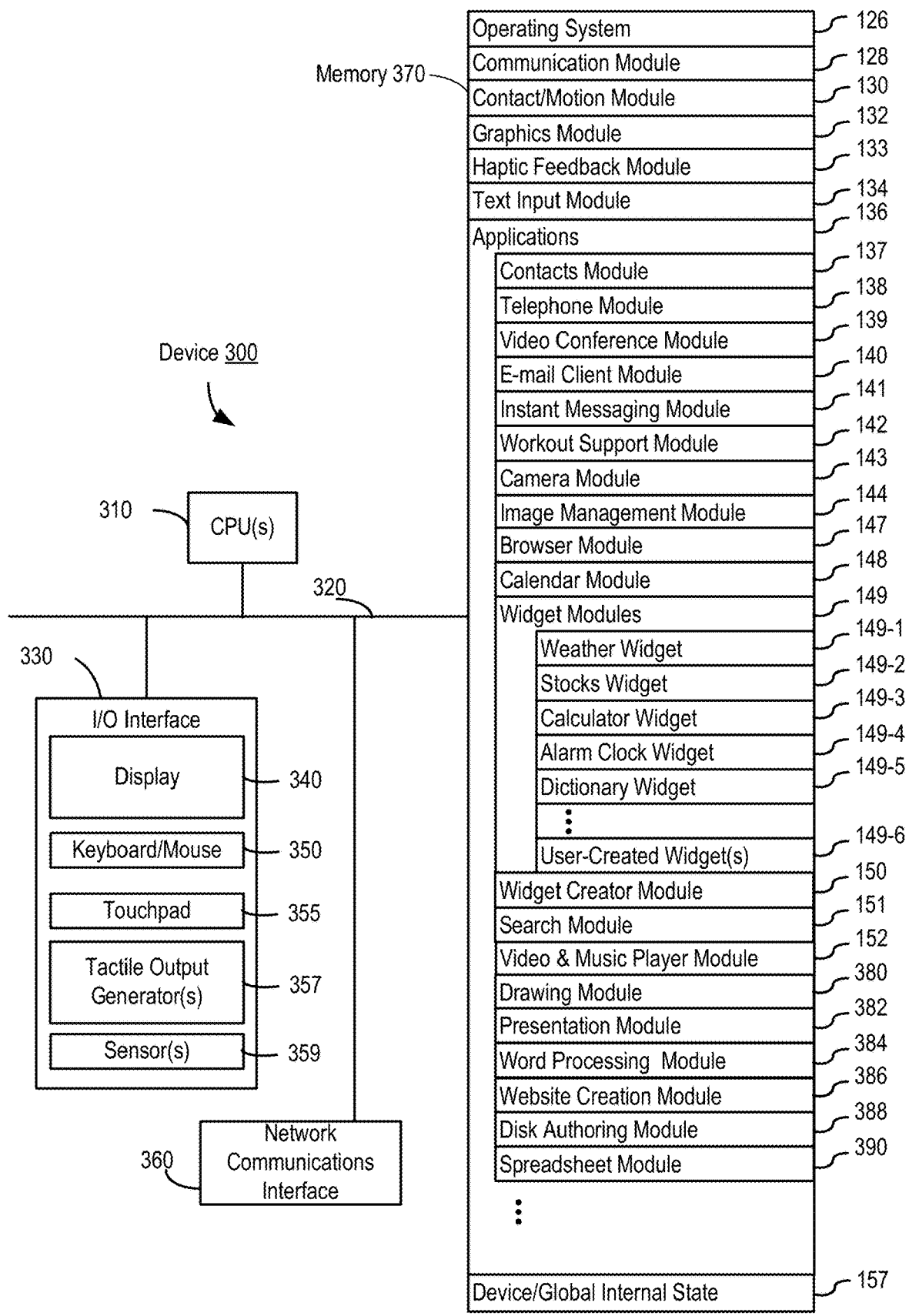
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
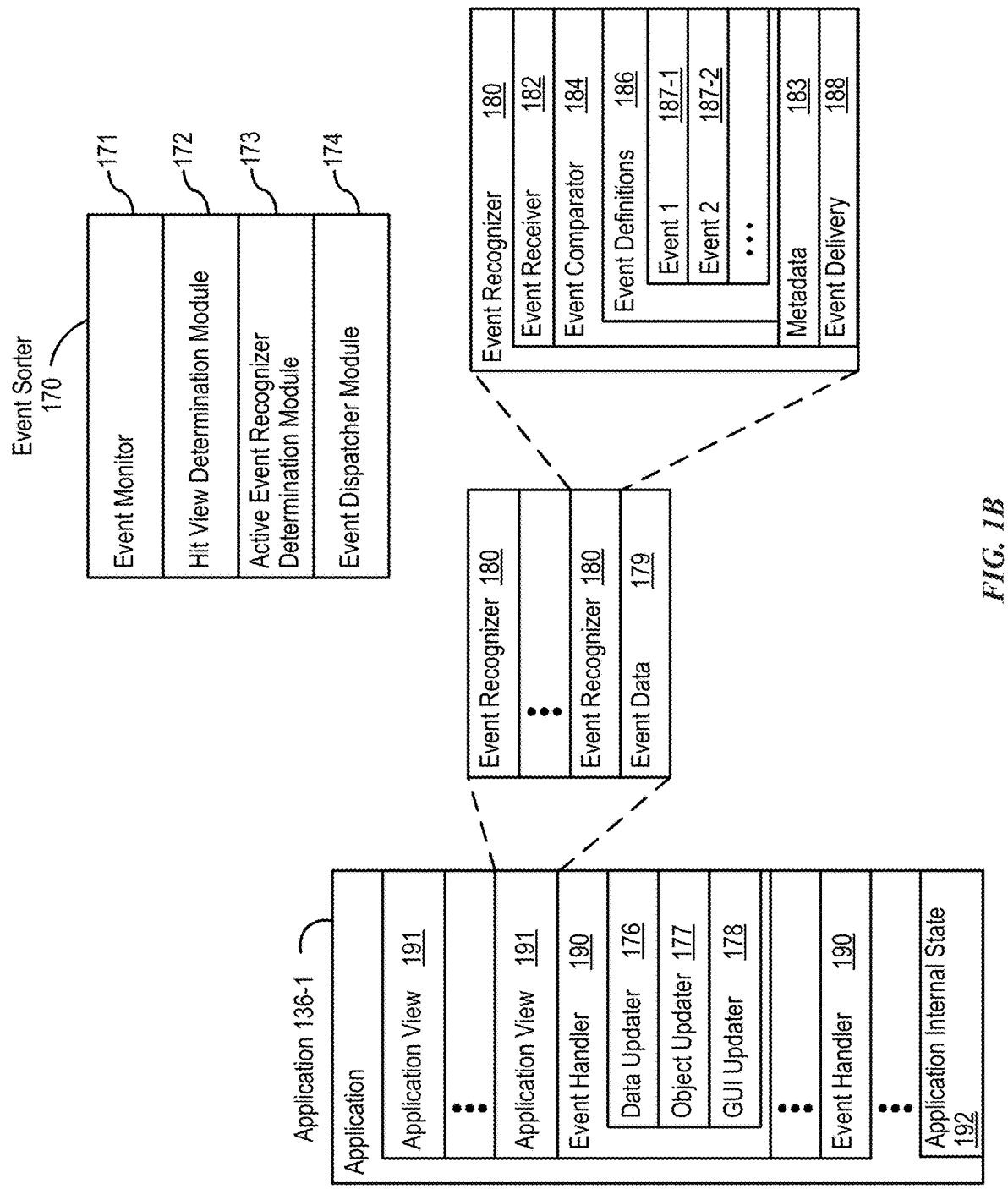
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
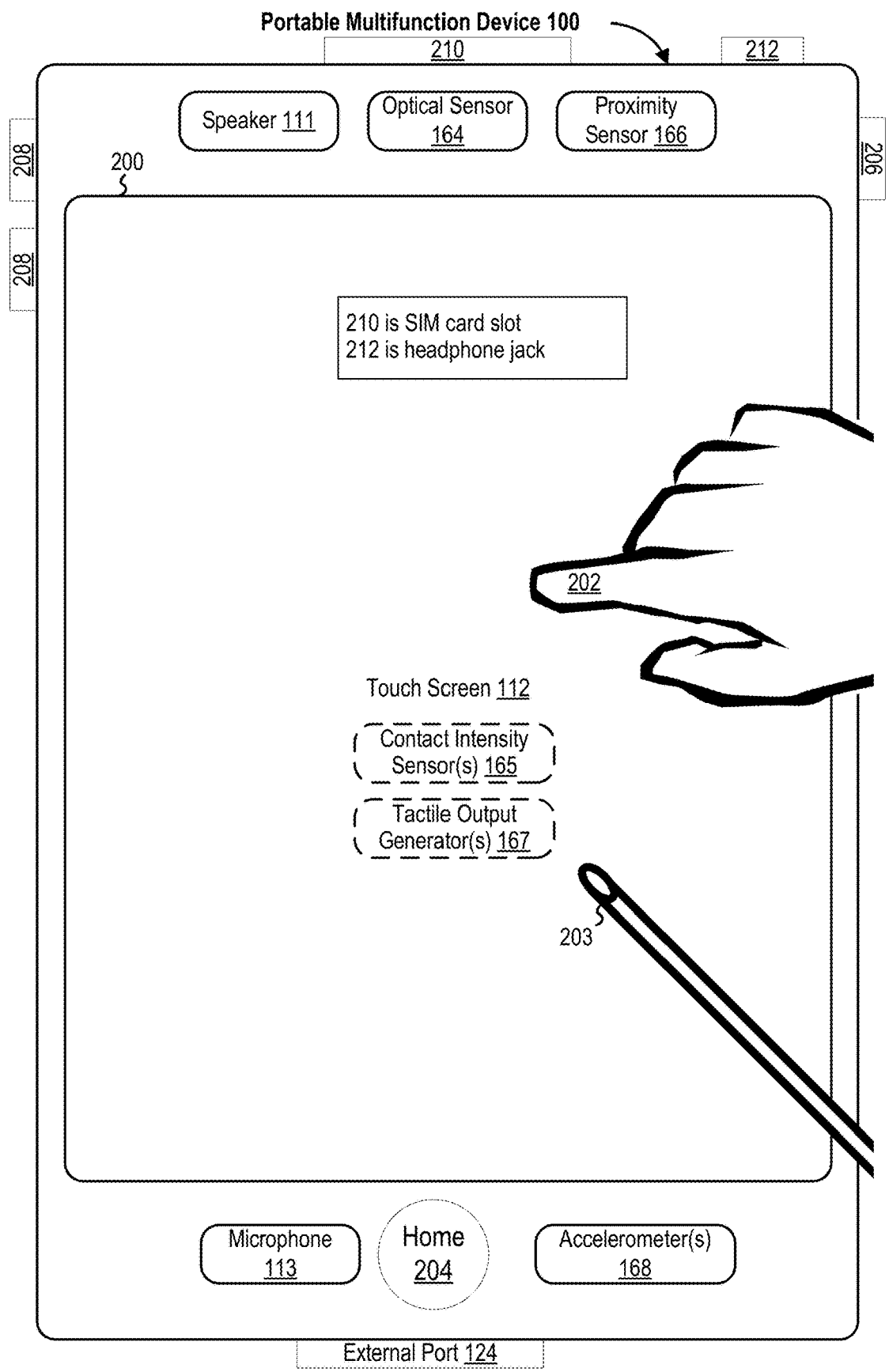
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
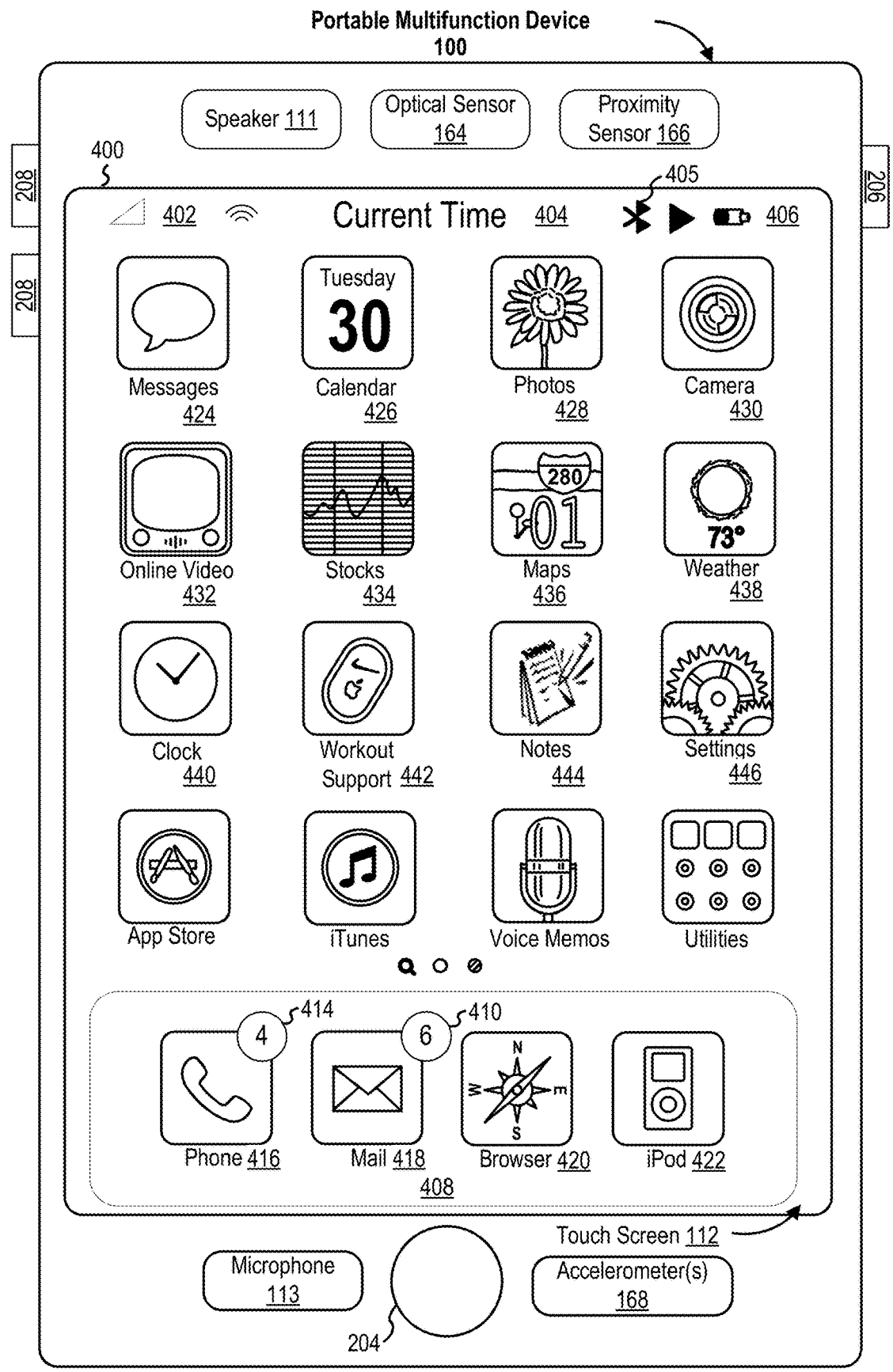
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
   Icon 416 for telephone module 138, labeled "Phone," which optionally includes an indicator 414 of the number of missed calls or voicemail messages;
   Icon 418 for e-mail client module 140, labeled "Mail," which optionally includes an indicator 410 of the number of unread e-mails;
   Icon 420 for browser module 147, labeled "Browser;" and
   Icon 422 for video and music player module 152, also referred to as iPod (trademark of Apple Inc.) module 152, labeled "iPod;" and
Icons for other applications, such as:
   Icon 424 for IM module 141, labeled "Messages;"
   Icon 426 for calendar module 148, labeled "Calendar;"
   Icon 428 for image management module 144, labeled "Photos;"
   Icon 430 for camera module 143, labeled "Camera;"
   Icon 432 for online video module 155, labeled "Online Video;"
   Icon 434 for stocks widget 149-2, labeled "Stocks;"
   Icon 436 for map module 154, labeled "Maps;"
   Icon 438 for weather widget 149-1, labeled "Weather;"
   Icon 440 for alarm clock widget 149-4, labeled "Clock;"
   Icon 442 for workout support module 142, labeled "Workout Support;"
   Icon 444 for notes module 153, labeled "Notes;" and
   Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
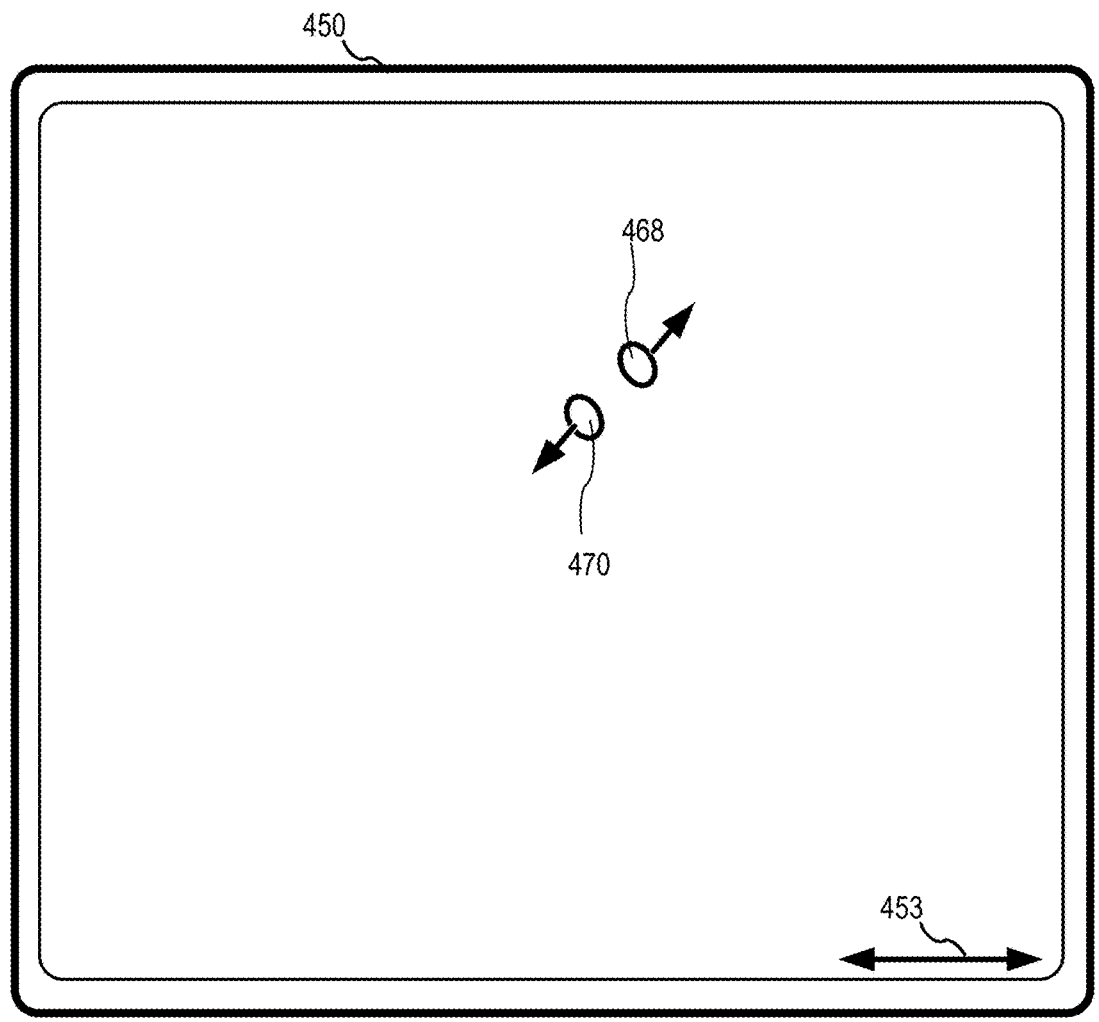
FIG. 4B illustrates an exemplary user interface for a multifunction device with a touch-sensitive surface that is separate from the display in accordance with some embodiments.
Figure 4B:
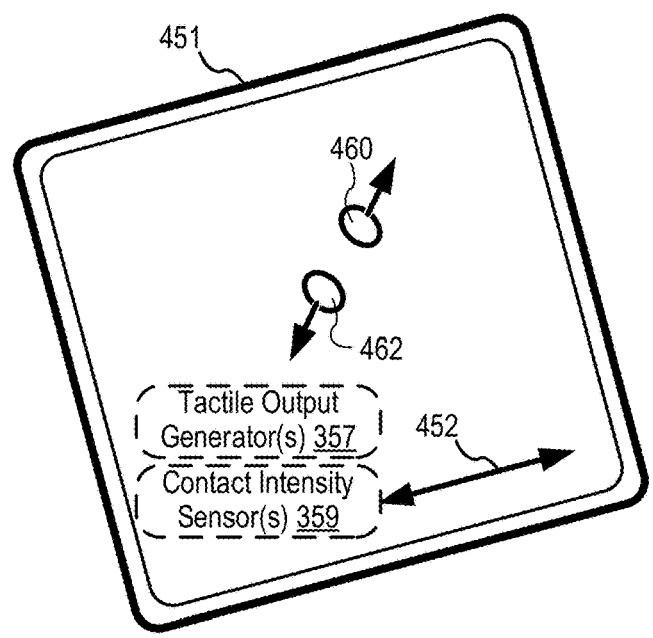

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
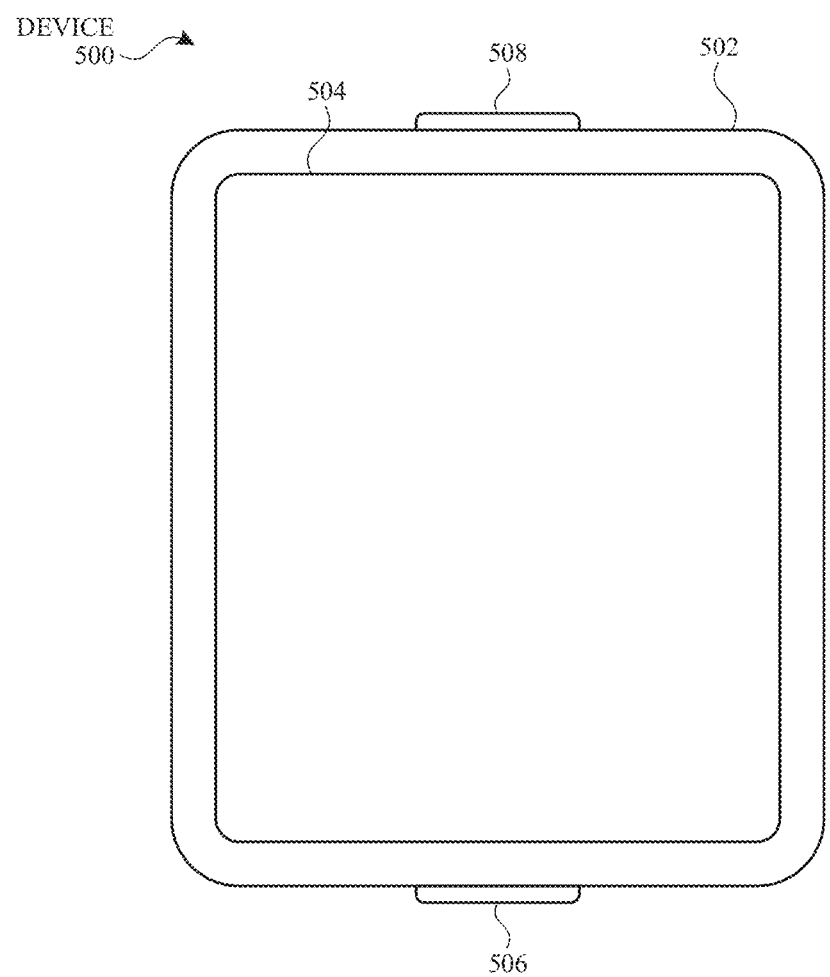
FIG. 5A illustrates a personal electronic device in accordance with some embodiments.
Figure 6H:
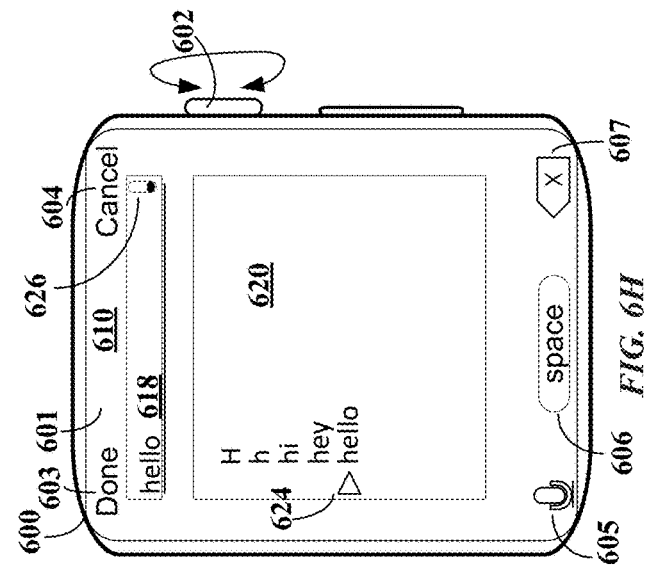

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
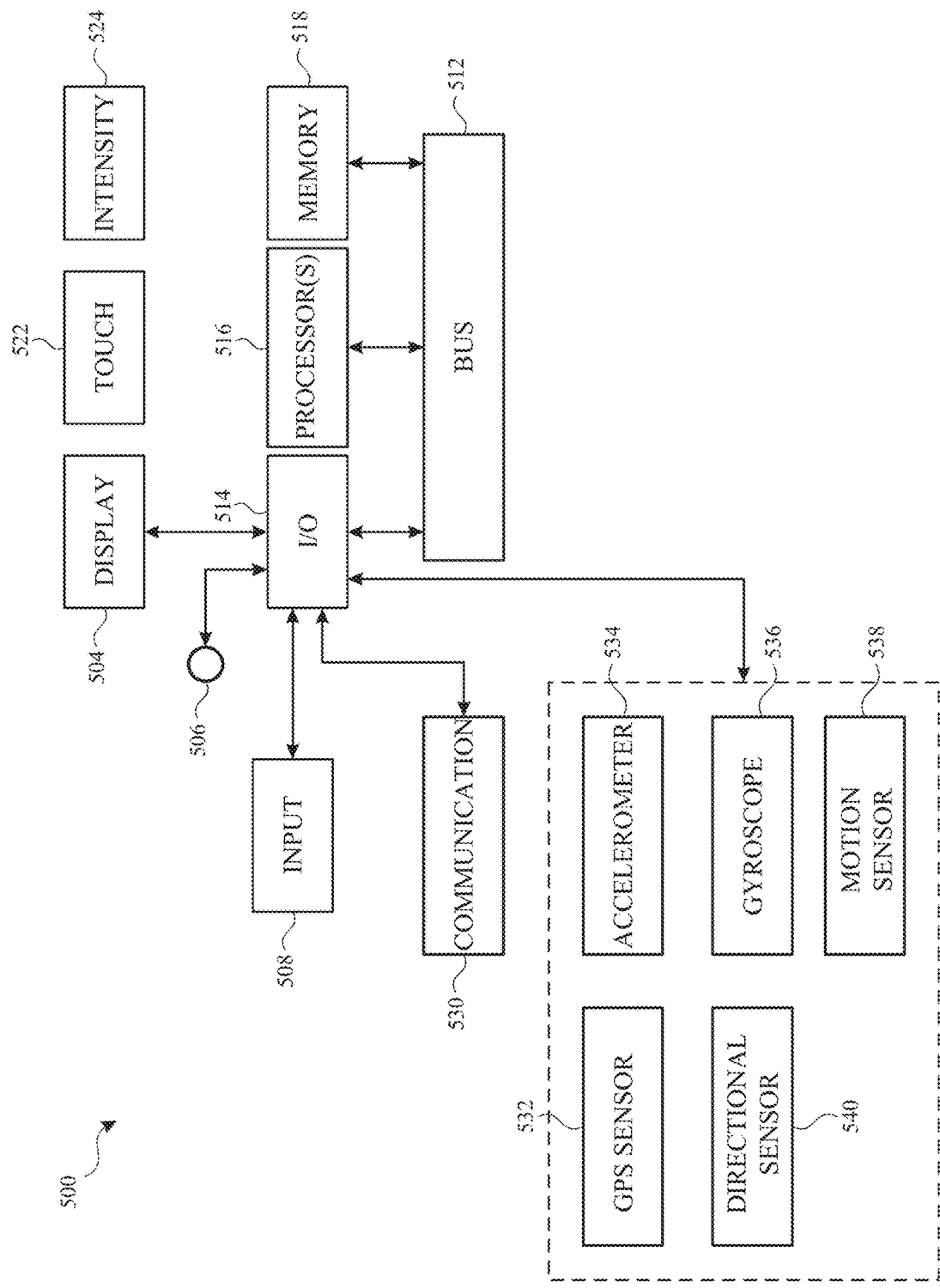
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. In some embodiments, a rotatable input device is a crown, knob, ring, or scroll wheel that is rotatable via interaction with one or multiple fingers. The rotatable input device may be mounted on the side of device 500, as depicted in FIG. 5A, or in other locations, such as integrated on or around display 504. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including methods 700 (FIG. 7), 1000 (FIG. 10), 1300 (FIG. 13), and 1600 (FIG. 16). Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1, 3, and 5). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6R illustrate exemplary user interfaces for handwriting on screens, in accordance with some embodiments. The user interfaces in these figures are used to illustrate the processes described below, including the processes in FIG. 7.

FIG. 6A depicts electronic device 600, variations of which include some or all of the components of devices 100, 300, or 500 described above. For example, electronic device 600 includes display 601, which, in some cases, corresponds to display 340 of device 300 or display 504 of device 500. In some examples, a touch sensitive surface is integrated into display 601. Electronic device 600 also includes rotatable input device 602, which in some cases, corresponds to input mechanism 506 of electronic device 500.

In FIG. 6A, electronic device 600 is displaying handwriting interface 610 on display 601. Handwriting interface 610 includes stroke input area 608 (represented by the dotted box) and message area 609 (represented by the dashed box). User strokes entered in stroke input area 608 are analyzed by one or more processors of electronic device 600 to determine text that the strokes represent. The determined text is then displayed in message area 609. FIG. 6A depicts stroke input area 608 and message area 609 as partially overlapping. In some cases, stroke input area 608 and message 609 are completely overlapping, share a common border but are not overlapping, are separated by some distance, or have some other spatial configuration.

Handwriting interface 610 also includes affordance 603 for indicating that the entered text is complete; affordance 604 for canceling further entry of text in the current instance of handwriting interface 610; affordance 605 for entering a dictation mode to receive audio input; affordance 607 for deleting text that has already been entered; and affordance 606 for entering a space into the current text. Selecting of affordance 603, in some cases, cause text from the message area to be returned to a program that initiated handwriting interface 610. For example, if a messaging application initiated handwriting interface 610, then selection of affordance 603 will return the text of the message area to the messaging application.

FIG. 6B depicts path 611, which represents the path of a user's finger touching the display and touch sensitive surface in stroke input area 608. Path 611 includes arrows indicating the direction that the user's finger followed. While FIG. 6B depicts path 611 generated from a user's finger, in other cases, other objects, such as a stylus or other object, is used.

FIG. 6C depicts display of stroke representation 612 that was generated based on the output of the touch sensitive surface's response to the user's finger touching the touch sensitive surface along path 611 of FIG. 6B. Stroke representation 612 is displayed as a series of dots and partial dots.

Other appearances for stroke representation 612 are also possible. In some cases, the intensity of display of stroke representation 612 is based on the time since it was detected.

FIG. 6D depicts the result electronic device 600 analyzing the stroke corresponding to stroke representation 612 to determine text representing the stroke. In this case, the stroke was determined to represent text 614 (the letter "h"), which now appears in message area 609. Stroke representation 612 is no longer displayed in stroke input area 608. In some cases, strokes representations appearing in stroke input area 608 are no longer displayed after they have been analyzed to determine corresponding text. In some cases, stroke representations appearing in stroke input area 608 transition to text in message area 609 via an animation, for example, as the corresponding strokes are being analyzed.

FIG. 6E is the same as FIG. 6D, except the boxes for message area 609 and stroke input area 608 have been removed for clarity. The rest of the figures of electronic device 600 (FIGS. 6E-6R, 9A-9I, 12A-12L, and 15A-15J) do not include the visual boxes marking message area 609 and stroke input area 608. Electronic device 600 as depicted in these figures, however, should still be considered to have the same message area and stroke input area of FIGS. 6A-6D.

FIG. 6F depicts handwriting interface 610 after a stroke has been recognized, text 614 has been determined based on the recognized stroke, and a set of one or more suggestions for text 614 has been determined, which is indicated by indicator 616. In some cases, the determination of the set of one or more suggestions for text 614 (or other text within the message area) is based on various factors and techniques, such as a n-gram model, context of the messages, likely auto-corrections to the text, likely auto-completes to the text, the strokes used to generate text 614, context of the device, or other factors.

Figure 6G:
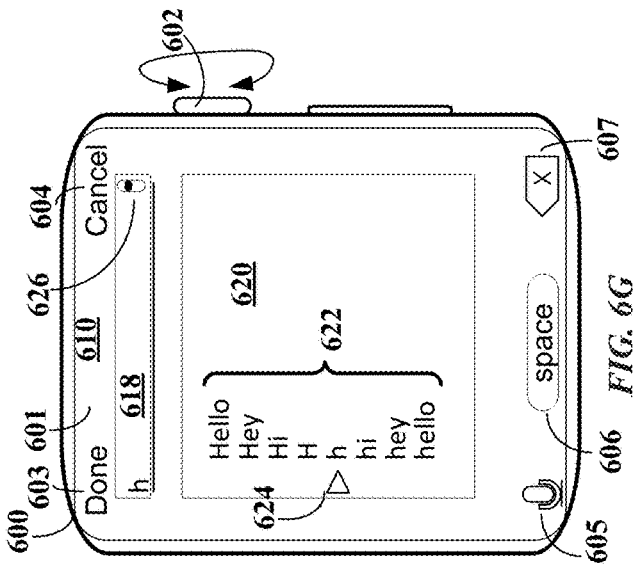
Figure 6O:
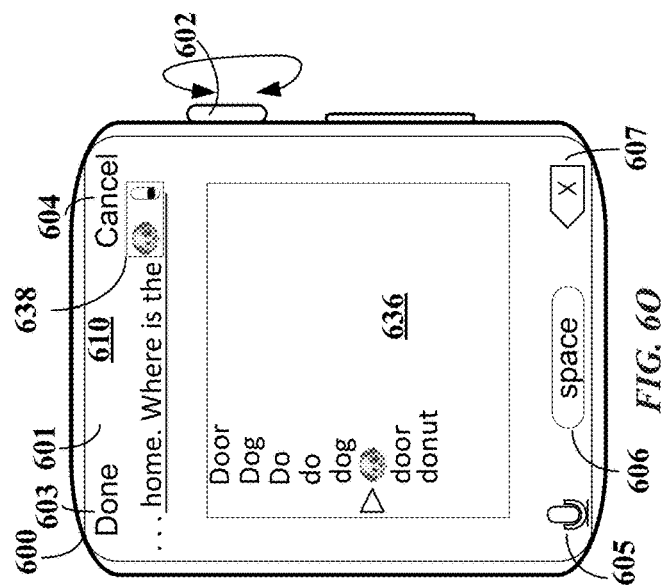
Figure 6N:
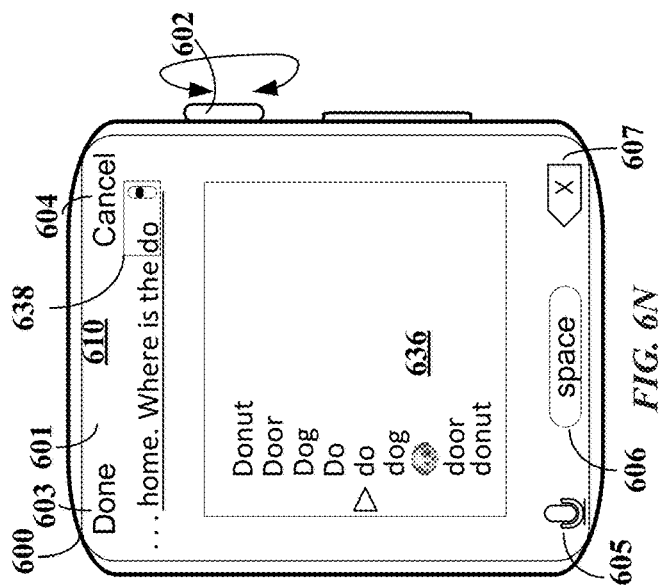

In FIG. 6G, in response to receiving input (e.g., scroll or rotational input) on input device 602, electronic device 600 displays suggestion box 620, which contains one or more suggestions 622 for text in the message area. In some cases, one or more suggestions 622 are part of (or all of) a set of suggestions for text in the message area. In this case, as indicated by text indication 618, the suggestions are for the text "h," which is the only text in the message area. In some cases, as described below, a suggestion box is displayed for only a portion of the text present in the message area. Indicator 624 indicates the currently selected suggestion, which initially is the original text for which set of one or more suggestions 622 was generated for. Status bar 626 represents the location of the currently selected suggestion (i.e., location of indicator 624) in the set of one or more suggestions and is updated as indicator 624 is moved and selects new suggestions.

FIG. 6H depicts the response of device 600 to receiving additional user input (e.g., scroll or rotational input) via input device 602. Electronic device 600 moves indicator 624 down several suggestions in response to the user input. The message area 618 is updated to indicate the currently selected suggestion "hello." Status bar 626 is also updated to reflect the location of the indicator 624 in set of one or more suggestions 622.

FIG. 6I depicts the response of electronic device 600 to selection of the suggestion "hello". Electronic device 600 updates the message area to include the selected suggestion. In some cases, the selection occurs in response to input device 602 no longer receiving user input (e.g., no longer receiving scroll or rotational input). In other cases, the selection occurs in response to other user input, such as an activation of a button, depressing of input device 602, a gesture on the touch sensitive surface, or other user input. Indicator 616 is present, indicating that a set of one or more suggestions are available for text of the message area. In response to receiving addition user input (e.g., additional scroll input), suggestion box 620 and set of one or more suggestions 622 (FIG. 6G) may be displayed again. In some embodiments, a new set of one or more suggestions based on the new text present in the message area is generated and displayed in a suggestion box.

FIG. 6J depicts handwriting interface 610 with stroke representation 628. Handwriting interface 610 is depicted after having received the input, corresponding to a stroke, that generated stroke representation 628 but prior to the stroke being analyzed to determine corresponding text and suggestions, which is indicated by the lack of a suggestions indicator (e.g., indicator 616 of FIG. 6I).

FIG. 6K depicts handwriting interface 610 after the stroke corresponding to stroke representation 628 has been analyzed and corresponding text has been determined. In this case, the corresponding text to the stroke corresponding to stroke representation 628 is the letter "w," which is displayed in the message area. A space separates the previous text ("hello") from the new text ("w"). In some cases the space is present in response to user input selectin affordance 606. In other cases, the space is present in response to electronic device 600 automatically inserting the space after, for example, determining that "hello" is a complete word. Indicator 616 indicates that a set of one or more suggestions is also available for text in the message area.

In FIG. 6L, in response to receiving input (e.g., scroll or rotation input) via input device 602, electronic device 600 displays suggestion box 632, which contains a set of one or more suggestions for text in the message area. In this case, as indicated by text indication 630, the suggestions are for the text "w," which is the portion of the text in the message area highlighted by text indication 630.

Figure 6M:
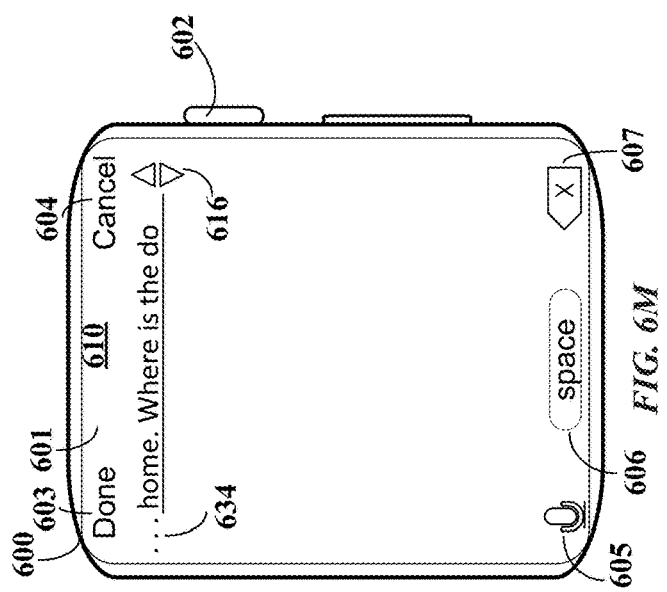

FIG. 6M depicts electronic device 600 displaying handwriting interface 610 after electronic device 600 has processed many additional strokes received on the touch sensitive surface and corresponding text has been determined and displayed in the messaging area. Indicator 634 indicates that additional text is available but is not being displayed. In some embodiments, the additional text is viewed and accessed in response to user input, such as a swipe gesture on the message area.

FIG. 6N depicts handwriting interface 610, displayed in response to electronic device 600 receiving user input (e.g., a scroll input) via input device 602. Suggestion box 636 includes a set of suggestion for the text "do," as indicated by text indication 638. In addition to words that begin with "do," the set of suggestions in suggestion box 636 include an emoji for a dog.

FIG. 6O depicts handwriting interface 610 after electronic device 600 received further user input (e.g., scroll input) via input device 602. The user input results in moving the set of suggestions in suggestion box 636 so that the dog emoji is the current selection. Handwriting interface 610 has correspondingly updated the text in box indication 638 to the dog emoji.

Figure 6Q:
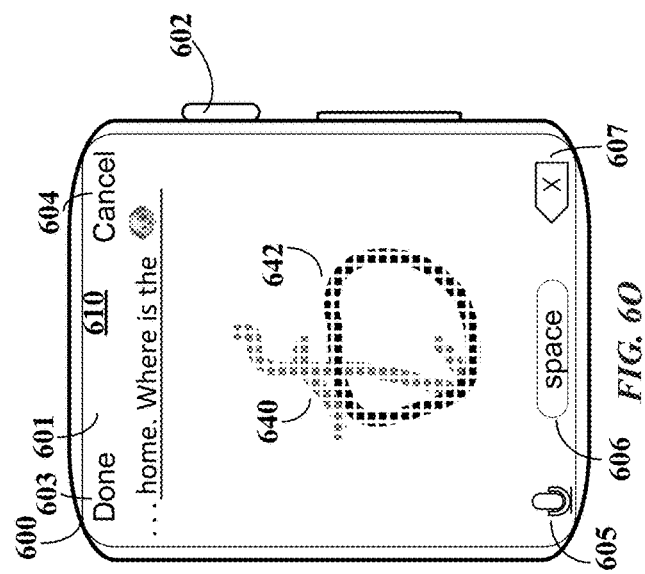
Figure 6P:
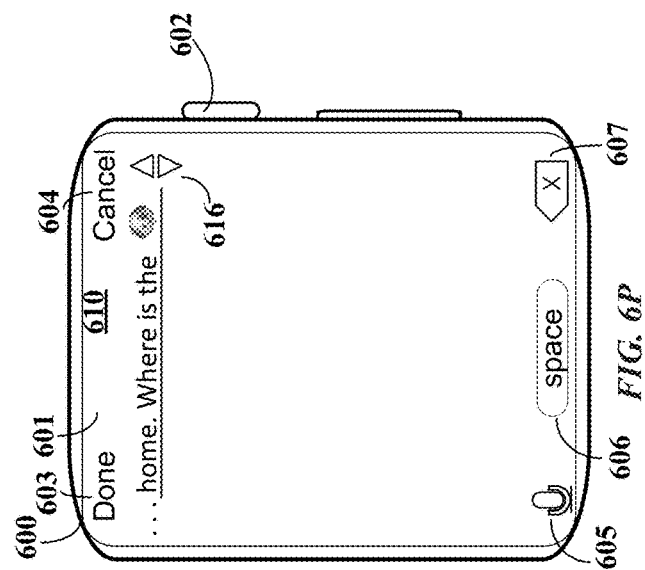

FIG. 6P depicts handwriting interface 610 after electronic device 600 has selected (e.g., in response to a user input) the dog emoji suggestion from suggestion box 636 (FIG. 6O). For example, electronic device 600 selects the dog emoji in accordance with the selection indicator of suggestion box 636 identifying the dog emoji when electronic device 600 stops receiving user input via input device 602. The message area has been updated to include the dog emoji.

FIG. 6Q depicts handwriting interface 610 after two additional strokes, corresponding to stroke representations 640 and 642, were received. T stroke corresponding to stroke representation 640 was received first as indicated by the faded appearance as compared to stroke representation 642 (corresponding to a later received stroke). If a time between the entry of the strokes corresponding to stroke representations 640 and 642 is less than a threshold time, the strokes corresponding to stroke representations 640 and 642 are optionally analyzed together as part of the same set. If, however, the strokes are separated by a certain amount of time, the strokes are each analyzed separately as part of different sets. As shown in FIG. 6Q, the strokes corresponding to stroke representations 640 and 642 were entered in the stroke input area in substantially the same location as they are overlapping.

FIG. 6R depicts handwriting interface 610 after the strokes corresponding to stroke representations 640 and 642 have been analyzed to produce the text "to." In some cases, this text will be the same regardless of whether the strokes corresponding to stroke representations 640 and 642 are analyzed together or separately. In some cases, this text depends on whether the strokes corresponding to stroke representations 640 and 642 are analyzed together or separately.

FIG. 7 is a flow diagram illustrating a method for handwriting on a touch sensitive surface using an electronic device in accordance with some embodiments. Method 700 is performed at a device (e.g., 100, 300, 500) with a display, a touch sensitive surface, and a rotatable input device. Some operations in method 700 are, optionally, combined, the order of some operations are, optionally, changed, and some operations are, optionally, omitted.

As described below, method 700 provides an intuitive way for handwriting on touch sensitive surfaces. The method reduces the cognitive burden on a user for handwriting on touch sensitive surfaces, thereby creating a more efficient human-machine interface. For battery-operated computing devices, enabling a user to enter handwriting on touch sensitive surfaces faster and more efficiently conserves power and increases the time between battery charges.

The electronic device displays (702) a user input interface (e.g. 610) on the display including a message area (e.g., 609) and a stroke input area (e.g., 608) (e.g., an area of the display and touch sensitive surface that detects and displays strokes received from the user via a finger, stylus, or other object). In some examples, the message area (e.g., 609) and the stroke input area (e.g., 608) are partially overlapping. In some examples, the message area is completely within the stroke input area (e.g., 608). In some examples, the message area and stroke input area (e.g., 608) share a boundary but do not overlap each other. In some examples, the message area and stroke input area (e.g., 608) are spaced apart. In some examples the touch sensitive surface is less than 2 in×2 in, less than 1.5 in×1.5 in, or less than 1 in×1 in.

The electronic device receives (704) a first set of strokes (e.g., corresponding to stroke representation 612) (e.g., one or more continuous strokes, where each stroke represents a letter or part of a letter) on the touch sensitive surface in the stroke input area (e.g., 608). In some examples, the first set of strokes represents one letter, multiple letters, one word, or multiple words. In some examples, the display provides feedback to the user of the location and shape of a stroke of the first set of strokes as the stroke is received (e.g., display of stroke representation 612 FIG. 6C).

The electronic device determines (706) first text (e.g., a letter, letters, a word, or words) based on the first set of strokes (e.g., corresponding to stroke representation 612). In some examples, the determination can further be based on strokes received prior to the first set of strokes, context of the electronic device (e.g., time of day, location, current activity, calendar, the person that the message is intended), or other information.

The electronic device displays (708) the first text (e.g., 614) on the display in the message area (e.g., FIG. 6E). In some examples, the electronic device displays the first set of strokes prior to displaying the first text. In some examples, the electronic device transitions the display of the first set of strokes into the display of the first text via an animation. In some examples, the animation occurs while the electronic device determines the first text based on the first set of strokes.

The electronic device determines (710) one or more suggestions (e.g., 622) based on the first text (e.g., 614), wherein the one or more suggestions (e.g., 622) include one or more changes to the first text (e.g., the changes may implement suggested completions, corrections, or predictions). In some examples, the one or more suggestions include suggested spelling corrections for the first text. In some examples, the one or more suggestions include suggested completion to the first text. In some examples, the one or more suggestions include predictions of an additional word to follow the first text.

After the electronic device determines (712) the one or more suggestions (e.g., 622), the electronic device receives user input via the rotatable input mechanism (e.g., 602). In some examples, the rotatable input mechanism is a crown, a knob, a ring, or wheel. In some examples the axis of rotation is perpendicular to the plane of the display. In some examples, the axis of rotation is parallel or contained within the plane of the display. In some examples, the rotatable input mechanism is to the side of the display. In some examples, the rotatable input mechanism is around the display.

The electronic device displays (716), in response to the user input (714) (e.g., user input received via input device 602), at least one of the one or more suggestions (e.g., suggestions 622 in suggestion box 620) and displays (718) a selection indicator (e.g., 624) indicating a selected suggestion of the one or more suggestions (e.g., 622). In some examples, the at least one suggestion of the one or more suggestions is displayed in a surrounding graphical element. In some examples, in response to the user input stopping immediately after displaying the at least one of the one or more suggestions, the electronic device ceases to display the at least one of the one or more suggestions. In some examples, the selection indicator is to the side of the selected suggestion. In some examples, the selection indicator surrounds the one or more suggestions. In some examples, the selection indicator is integrated with the selected suggestion, such as changing the color or otherwise changing the appearance of the selected suggestion.

After the electronic device displays the at least one of the one or more suggestions (e.g., 622) and the selection indicator (e.g., 624), the electronic device replaces (720) display of the first text in the message area with display of the selected suggestion (e.g., FIG. 6G versus FIG. 6H). In some examples, the replacement happens in response to the selection indicator moving to a new suggestion.

In accordance with some embodiments, in response to determining the one or more suggestions, the electronic device displays an indication (e.g., 616) that the one or more suggestions are available. In some examples, the indication is first displayed at the same time as the first display of the first text. In some examples, the indication is adjacent to the rotatable input mechanism (e.g., 602) so that a user is drawn to the rotatable input mechanism, and even drawn to rotate the rotatable input mechanism, in response to the display of the indication that is adjacent to the rotatable input mechanism (e.g., compare indicator 616 of FIG. 6F and location and orientation of rotation in FIG. 6G).

In accordance with some embodiments, further in response to receiving the user input, the electronic device determines whether a characteristic of the user input (e.g., time since the user input has stopped) meets a first criteria. In accordance with a determination that the suggestion interface cessation criteria are met, the electronic device ceases to display the graphical interface (e.g., 620) corresponding to the one or more suggestions (e.g., 622).

In accordance with some embodiments, in response to continuing to receive the user input via the rotatable input mechanism (e.g., input device 602), the electronic device moves the selection indicator (e.g., 624) from a first suggestion to a second suggestion of the one or more suggestions (e.g., FIGS. 6G and 6H).

In accordance with some embodiments, the display of the one or more suggestions includes the first text and one or more capitalized suggestions above the first text and one or more lower case suggestions below the first text (e.g., FIGS. 6G, 6L, 6N).

In accordance with some embodiments, the one or more suggestions include an auto-complete suggestion (e.g., suggesting a complete word based on the first text) or an auto-correct suggestion (e.g., a spelling or grammar correction for the first text).

In accordance with some embodiments, the one or more suggestions include an emoji identified based on the first text (e.g., FIG. 6O). In some examples, the first text is descriptive of the item that the emoji represents (e.g., first text "dog" produces a dog emoji suggestion or first text ":)" produces a happy face emoji suggestion). In some examples, the first text is more generally descriptive of a feature of the emoji (e.g., first text "happy" produces a happy face emoji suggestion).

In accordance with some embodiments, the one or more suggestions are determined using an n-gram model.

In accordance with some embodiments, prior to the electronic device receiving the first set of strokes, the electronic device receives a second set of strokes in the stroke input area (e.g., strokes from a previous word or from previous letters in the same word). The electronic device determines second text based on the second set of strokes. Determining the one or more suggestions is further based on the second text (e.g., the context of the second text is used in analyzing the first set of strokes to determine the first text).

In accordance with some embodiments, in response to receiving at least a portion of the first set of strokes, the electronic device displays, in the stroke input area, a graphical representation of the first set of strokes (e.g., FIGS. 6C and 6J).

In accordance with some embodiments, the electronic device receives a first stroke in the stroke input area. After a time period has elapsed since receiving the first stroke, the electronic device receives a second stroke in the stroke input area. In accordance with a determination that the time period exceeds a threshold value, the electronic device includes the first stroke and the second stroke in the first set of strokes. In accordance with a determination that the time period does not exceed a threshold, the electronic device includes the first stroke in the first set of strokes and excludes the second stroke from the first set of strokes (e.g., FIG. 6Q).

In accordance with some embodiments, the first text includes multiple characters (e.g. FIGS. 6Q and 6R).

In accordance with some embodiments, the first text is a single character (e.g. FIG. 6D).

In accordance with some embodiments, the electronic device receives a third stroke (e.g., 640) at a location in the stroke input area. The electronic device receives a fourth stroke (e.g., 642) in the stroke input area at substantially the same location in the stroke input area, wherein both the third stroke and the fourth stroke are included in the first set of strokes (e.g., FIG. 6Q).

In accordance with some embodiments, the first set of strokes is a single continuous stroke (e.g., 612).

In accordance with some embodiments, the first set of strokes includes a plurality of discrete strokes (e.g., 640, 642).

In accordance with some embodiments, the user input interface includes a plurality of affordances (e.g., 603-607), including an affordance corresponding to audio input (e.g., 605). In response to the electronic device receiving user input selecting the affordance (e.g., 605) corresponding to audio input, the electronic device displays an audio input interface to receive dictation input.

In accordance with some embodiments, the electronic device displays a scroll indicator (e.g., 626) with the display of the at least one of the one or more suggestions (e.g., 622) and the display of the selection indicator (e.g., 624), wherein a size of the scroll indicator is based on the number of one or more suggestions and a location of the scroll indicator is based on the position of the selection indicator within the number of one or more suggestions (e.g., FIG. 6G versus FIG. 6H).

In accordance with some embodiments, after replacing display of the first text with display of the selected suggestion, the electronic device ceases to display the at least one of the one or more suggestions (e.g., 6I). After ceasing to display the at least one of the one or more suggestions, the electronic device receives additional user input via the rotatable input mechanism (e.g., 602). In response to receiving the additional user input: the electronic device displays an at least additional one of the one or more suggestions and displays the selection indicator (e.g., the same set of suggestions are displayed if the user input is received again).

Note that details of the processes described above with respect to method 700 (e.g., FIG. 7) are also applicable in an analogous manner to the methods described below. For example, method 1000 (FIG. 10), method 1300 (FIG. 13), and method 1600 (FIG. 16) optionally include one or more of the characteristics of the various methods described above with reference to method 700. For example, methods 1000, 1300, and 1600 may include method 700 as part of the text entry and suggestion to compliment the processes of these methods. For brevity, these details are not repeated below.

Figure 8:
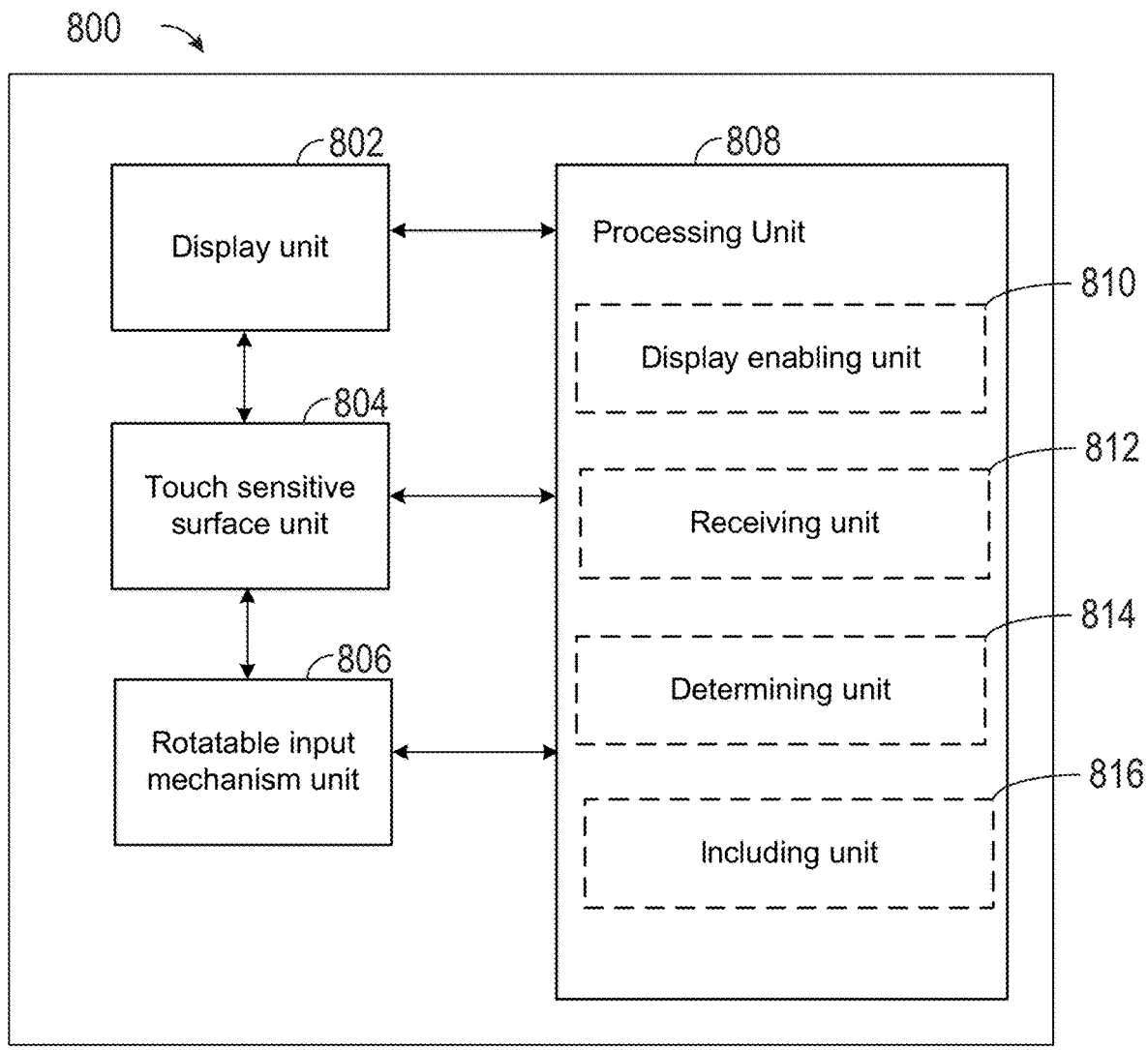
FIG. 8 shows an exemplary functional block diagram of an electronic device.

In accordance with some embodiments, FIG. 8 shows an exemplary functional block diagram of an electronic device 800 configured in accordance with the principles of the various described embodiments. In accordance with some embodiments, the functional blocks of electronic device 800 are configured to perform the techniques described above. The functional blocks of the device 800 are, optionally, implemented by hardware, software, or a combination of hardware and software to carry out the principles of the various described examples. It is understood by persons of skill in the art that the functional blocks described in FIG. 8 are, optionally, combined or separated into sub-blocks to implement the principles of the various described examples. Therefore, the description herein optionally supports any possible combination or separation or further definition of the functional blocks described herein.

As shown in FIG. 8, an electronic device 800 includes a display unit 802, a touch sensitive surface unit 804, rotatable input mechanism unit 806, and a processing unit 808 coupled to the a display unit 802, a touch sensitive surface unit 804, rotatable input mechanism unit 806. In some embodiments, the processing unit 808 includes a display enabling unit 810, a receiving unit 812, a determining unit 814, an including unit 816.

The processing unit 808 is configured to: enable display (e.g., using display enabling unit 810) of a user input interface on the display unit 802 including a message area and a stroke input area; receive (e.g., using receiving unit 812) a first set of strokes on the touch sensitive surface unit 804 in the stroke input area; determine (e.g., using determining unit 814) first text based on the first set of strokes; enable display (e.g., using display enabling unit 810) of the first text on the display unit in the message area; determine (e.g., using determining unit 814) one or more suggestions based on the first text, wherein the one or more suggestions include one or more changes to the first text; after determining the one or more suggestions, receive (e.g., using receiving unit 812) user input via the rotatable input mechanism unit 806; in response to the user input: enable display (e.g., using display enabling unit 810) of at least one of the one or more suggestions; and enable display (e.g., using display enabling unit 810) of a selection indicator indicating a selected suggestion of the one or more suggestions; and after enabling display of the at least one or the one or more suggestions and the selection indicator, replace display (e.g., using display enabling unit 810) of the first text with display of the selected suggestion.

In some embodiments, the processing unit 808 is further configured to: in response to determining the one or more suggestions, enable display (e.g., using display enabling unit 810) of an indication that the one or more suggestions are available.

In some embodiments, the processing unit 808 is further configured to: further in response to receiving the user input, determine (e.g., using determining unit 814) whether a characteristic of the user input meets first criteria; in accordance with a determination that the suggestion interface cessation criteria are met, cease enabling display (e.g., using display enabling unit 810) of the graphical interface corresponding to the one or more suggestions.

In some embodiments, the processing unit 808 is further configured to: in response to continuing to receiving the user input via the rotatable input mechanism unit 806, move (e.g., using display enabling unit 810) the selection indicator from a first suggestion to a second suggestion of the one or more suggestions.

In some embodiments, enabling display (e.g., using display enabling unit 810) of the one or more suggestions includes the first text and one or more capitalized suggestions above the first text and one or more lower case suggestions below the first text.

In some embodiments, the one or more suggestions include an auto-complete suggestion or an auto-correct suggestion.

In some embodiments, the one or more suggestions include an emoji identified based on the first text.

In some embodiments, the one or more suggestions are determined using an n-gram model.

In some embodiments, the processing unit 808 is further configured to: prior to receiving the first set of strokes, receive (e.g., using receiving unit 812) a second set of strokes in the stroke input area; determine (e.g., using determining unit 814) second text based on the second set of strokes, wherein determining the one or more suggestions is further based on the second text.

In some embodiments, the processing unit 808 is further configured to: in response to receiving at least a portion of the first set of strokes, enable display (e.g., using display enabling unit 810), in the stroke input area, of a graphical representation of the first set of strokes.

In some embodiments, the processing unit 808 is further configured to: receive (e.g., using receiving unit 812) a first stroke in the stroke input area; after a time period has elapsed since receiving the first stroke, receive (e.g., using receiving unit 812) a second stroke in the stroke input area; in accordance with a determination that the time period exceeds a threshold value, include (e.g., using including unit 816) the first stroke and the second stroke in the first set of strokes; in accordance with a determination that the time period does not exceed a threshold, include (e.g., using including unit 816) the first stroke in the first set of strokes and excluding the second stroke from the first set of strokes.

In some embodiments, the first text includes multiple characters.

In some embodiments, the first text is a single character.

In some embodiments, the processing unit 808 is further configured to: receive (e.g., using receiving unit 812) a third stroke at a location in the stroke input area; receive (e.g., using receiving unit 812) a fourth stroke in the stroke input area at substantially the same location in the stroke input area, wherein both the third stroke and the fourth stroke are included in the first set of strokes.

In some embodiments, the first set of strokes is a single continuous stroke.

In some embodiments, the first set of strokes includes a plurality of discrete strokes.

In some embodiments, the user input interface includes a plurality of affordances, including an affordance corresponding to audio input, and the processing unit 808 is further configured to: in response to receiving user input selecting the affordance corresponding to audio input, enable display (e.g., using display enabling unit 810), on the display unit 802, of an audio input interface to receive dictation input.

In some embodiments, the processing unit 808 is further configured to: enable display (e.g., using display enabling unit 810) of a scroll indicator with the display of the at least one of the one or more suggestions and the display of the selection indicator, wherein a size of the scroll indicator is based on the number of one or more suggestions and a location of the scroll indicator is based on the position of the selection indicator within the number of one or more suggestions.

In some embodiments, the processing unit 808 is further configured to: after replacing display of the first text with display of the selected suggestion: cease enabling display (e.g., using display enabling unit 810) of the at least one of the one or more suggestions; and after ceasing to enable display (e.g., using display enabling unit 810) of the at least one of the one or more suggestions, receive (e.g., using receiving unit 812) additional user input via the rotatable input mechanism unit; in response to receiving the additional user input: enable display (e.g., using display enabling unit 810), on the display unit 802, of an at least additional one of the one or more suggestions; and enable display(e.g., using display enabling unit 810), on the display unit 802, of the selection indicator.

The operations described above with reference to FIG. 7 are, optionally, implemented by components depicted in FIGS. 1A-1B or FIG. 8. For example, receiving operation 704 is, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 9A-9I illustrate exemplary user interfaces for handwriting on screens, in accordance with some embodiments. The user interfaces in these figures are used to illustrate the processes described below, including the processes in FIG. 10.

FIG. 9A depicts electronic device 600 displaying handwriting interface 610, which was described with respective to FIGS. 6A-6R. Electronic device 600 has received a stroke corresponding to stroke representation 900 in the stroke input area. The representation of the stroke is displayed on the display, but the analysis of stroke corresponding to stroke representation 900 to determine first text has not yet completed.

FIG. 9B depicts handwriting interface 610 after electronic device 600 receives the stroke corresponding to stroke representation 902 in the stroke input area. Stroke representation 900 is faded. In some cases, electronic device 600 fades representations of strokes as a function of time since the stroke was received. Accordingly, recently received stroke corresponding to stroke representation 902 is darker as compared to stroke representation 900. Strokes corresponding to stroke representations 900 and 902 were entered in substantially the same location on stroke input area.

FIG. 9C depicts handwriting interface 610 after electronic device 600 receives the stroke corresponding to stroke representation 904 in stroke input area. Stroke representation 900 is more faded as compared to its appearance in FIG. 9B. Stroke representation 902 is also faded. Stroke representation 904, corresponding to the most recently received stroke, is the darkest of the three stroke representations. The strokes corresponding to stroke representations 902 and 904 were entered in substantially the same location in stroke input area as stroke 900.

Figure 9E:
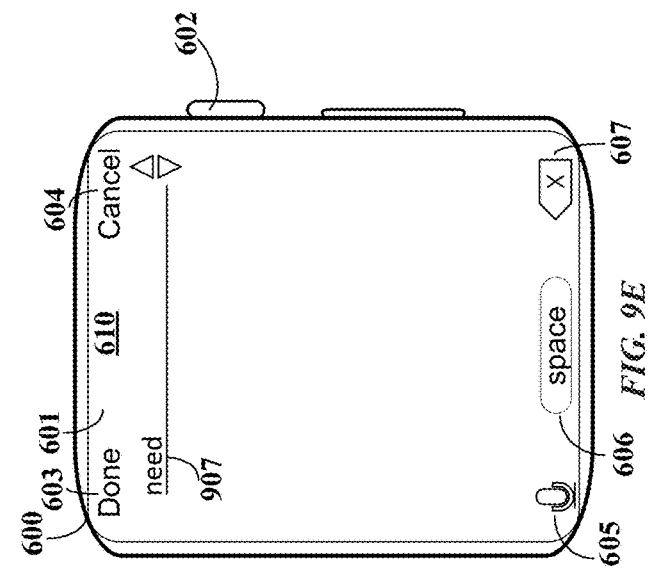
Figure 9D:
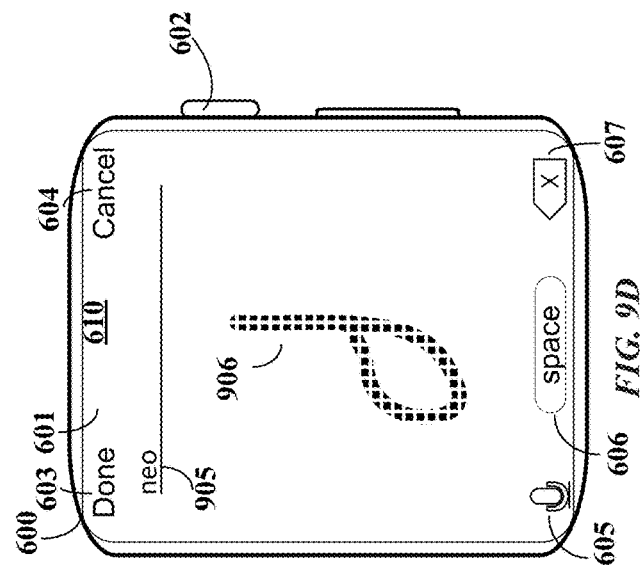

FIG. 9D depicts handwriting interface 610 after electronic device 600 has analyzed the first set of strokes (e.g., strokes corresponding to stroke representations 900, 902, and 904), determined the corresponding text is "neo," and displayed the text in the message area. Handwriting interface 610 in FIG. 9D has also received a stroke corresponding to stroke representation 906 subsequent to the display of the text in the message area. In response to receiving the new stroke, the electronic device determines revised text based on the first set of strokes and the second set of strokes (stroke corresponding to stroke representation 906).

FIG. 9E depicts handwriting interface 610 after electronic device 600 has analyzed the first set of strokes and the second set of strokes, determined that the strokes correspond to the text "need," and replaced the previously determined text in the message area with the new corresponding text in the message area. These figures (FIG. 9A-9E) depict how electronic device can re-analyze strokes that have already been analyzed in view of newly received strokes. Such processes can aid in disambiguating a set of strokes based on subsequently received strokes. The electronic device need not consider whether it has received all strokes for a particular word or whether additional strokes may help correctly analyze the strokes. FIGS. 9F-9I depict this concept as applied to revising text that is a single character based on subsequently received strokes.

FIG. 9F depicts handwriting interface 610 after electronic device 600 has received the stroke corresponding to stroke representation 908 (e.g., a substantially vertical stroke). Electronic device 600 has not yet determined corresponding text for the stroke corresponding to stroke representation 908.

FIG. 9G depicts handwriting interface 610 after electronic device 600 has determined that the set of strokes consisting of the stroke corresponding to stroke representation 908 corresponds to an "l" (a lower case "L"). The corresponding text is displayed in the message area.

FIG. 9H depicts handwriting interface 610 after electronic device 600 has received the stroke corresponding to stroke representation 910. Electronic device 600 has not yet determined corresponding text for the stroke.

FIG. 9I depict handwriting interface 610 after electronic device 600 has determined new text for the message area based on the stroke corresponding to stroke representation 908 and subsequently received the stroke corresponding to stroke representation 910. The stroke corresponding to stroke representation 910 was determined to be a dot that corresponds to (e.g., is paired with) the substantially vertical stroke corresponding to stroke representation 908 and the "l" was replaced with an "i."

The process for determining revised text depicted in FIGS. 9A-9E with respect to a word and in FIGS. 9F-9I with respect to a single letter may be based on a period of time that elapses between receiving the first set of strokes and the second set of strokes. If the period of time exceeds a threshold, the second set of strokes is analyzed independent of the first set of strokes and the text corresponding to the first set of strokes is not revised based on analysis of the first set of strokes and the second set of strokes. If the period of time does not exceed the threshold, the second of set of strokes is analyzed together with the first set of strokes and revised text for the first set of strokes may be produced.

The context of the device may also be considered in determining the revised text. For example, the location the electronic device, time of day, the mode of the electronic device, and other factors associated with the electronic device may be considered in determining the revised text.

FIG. 10 is a flow diagram illustrating a method for handwriting on a touch sensitive surface using an electronic device in accordance with some embodiments. Method 1000 is performed at a device (e.g., 100, 300, 500) with a display, a touch sensitive surface, and a rotatable input device. Some operations in method 1000 are, optionally, combined, the order of some operations are, optionally, changed, and some operations are, optionally, omitted.

As described below, method 1000 provides an intuitive way for handwriting on touch sensitive surfaces. The method reduces the cognitive burden on a user for handwriting on touch sensitive surfaces, thereby creating a more efficient human-machine interface. For battery-operated computing devices, enabling a user to enter handwriting on touch sensitive surfaces faster and more efficiently conserves power and increases the time between battery charges.

The electronic device displays (1002) a user input interface (e.g. 610) on the display including a message area (e.g., 609) and a stroke input area (e.g., 608) (e.g., an area of the display and touch sensitive surface that detects and displays strokes received from the user via a finger, stylus, or other object). In some examples, the message area and the stroke input area are partially overlapping. In some examples, the message area is completely within the stroke input area. In some examples, the message area and stroke input area share a boundary but do not overlap each other. In some examples, the message area and stroke input area are spaced apart. In some examples the touch sensitive surface is less than 2 in×2 in, less than 1.5 in×1.5 in, or less than 1 in×1 in.

The electronic device receives (1004) a first set of strokes (e.g., 900, 902, 904) (e.g., one or more continuous strokes, where each stroke represents a letter or part of a letter) on the touch sensitive surface in the stroke input area (e.g., 608). In some examples, the first set of strokes represents one letter, multiple letters, one word, or multiple words. In some examples, the display provides feedback to the user of the location and shape of a stroke of the first set of strokes as the stroke is received (e.g., display of strokes 900, 902, 904 FIG. 9C). In some examples, the display of the first set of strokes is based on the time since each stroke was received, such as fading a stroke over time (e.g., display of strokes 900, 902, 904 FIG. 9C).

The electronic device determines (1006) first text (e.g., a letter, letters, a word, or words) based on the first set of strokes (e.g., strokes 900, 902, 904). In some examples, the determination can further be based on strokes received prior to the first set of strokes. In accordance with some embodiments, the electronic device determines the revised first text based on a current context of the electronic device at the time of the determination of the revised first text (e.g., time of day, location, current activity, calendar, the person that the message is intended).

The electronic device displays (1008) the first text (e.g., 905) on the display in the message area (e.g., FIG. 9D). In some examples, the electronic device displays the first set of strokes prior to displaying the first text (e.g., FIG. 9C). In some examples, the electronic device transitions the display of the first set of strokes into the display of the first text via an animation. In some examples, the animation occurs while the electronic device determines the first text based on the first set of strokes.

The electronic device receives (1010) a second set of strokes (e.g., 906) on the touch sensitive surface in the stroke input area after receiving the first set of strokes (e.g., strokes 900, 902, 904) and displaying the first text (e.g., 905). In some examples, the second set of strokes represents a part of a letter, one letter, multiple letters, one word, or multiple words. In accordance with some embodiments, the electronic device displays the first text before the electronic device receives the second set of strokes.

The electronic device determines (1012) revised first text (e.g., 907) based on the first set (e.g., 900, 902, 904) and second set of strokes (e.g., 906). In accordance with some embodiments, the second set of strokes is received after a period of time since receiving the first set of strokes, and wherein the determination of the revised first text based on the first set and second set of strokes is in accordance with a determination that the period of time is below a threshold value.

The electronic device replaces (1014) the display of the first text (e.g., FIG. 9D) with the revised first text (e.g., FIG. 9E). In accordance with some embodiments, after the electronic device receives the second set of strokes and after the electronic device displays the revised first text, the electronic device receives a third set of strokes on the touch sensitive surface in the stroke input area. The electronic device determines second text based on the third set of strokes. The electronic device displays the second text with the revised first text.

In accordance with some embodiments, the first set of strokes is a single continuous stroke and the first text is a single character (e.g., FIG. 9F or 9G).

In accordance with some embodiments, the second set of strokes is a single continuous stroke (e.g., FIG. 9D or 9H).

In accordance with some embodiments, the revised first text differs from the first text by only a single character (e.g., compare FIGS. 9G and 9I).

In accordance with some embodiments, the revised first text differs from the first text by only the last character of the revised first text or the first text (e.g., compare FIGS. 9G and 9I).

Figure 11:
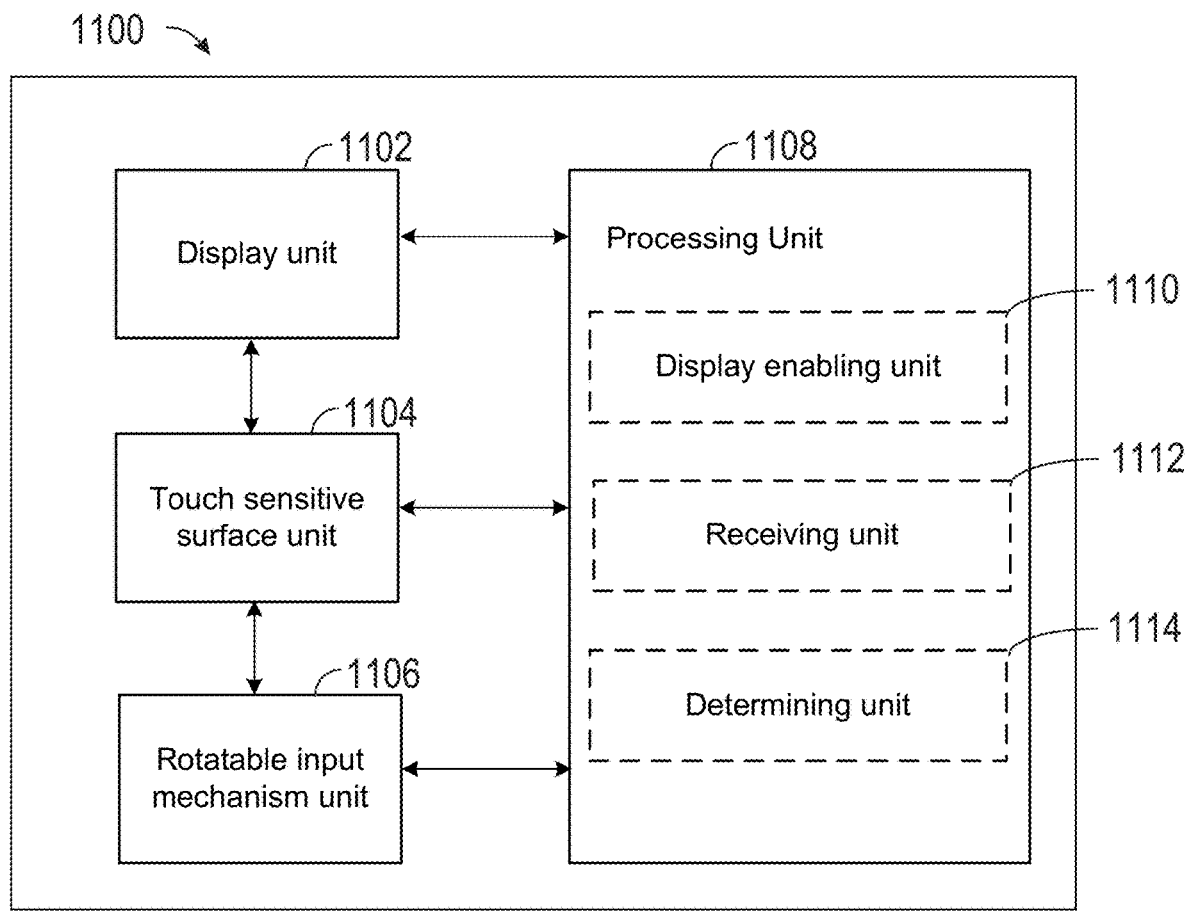
FIG. 11 shows an exemplary functional block diagram of an electronic device.

In accordance with some embodiments, FIG. 11 shows an exemplary functional block diagram of an electronic device 1100 configured in accordance with the principles of the various described embodiments. In accordance with some embodiments, the functional blocks of electronic device 1100 are configured to perform the techniques described above. The functional blocks of the device 1100 are, optionally, implemented by hardware, software, or a combination of hardware and software to carry out the principles of the various described examples. It is understood by persons of skill in the art that the functional blocks described in FIG. 11 are, optionally, combined or separated into sub-blocks to implement the principles of the various described examples. Therefore, the description herein optionally supports any possible combination or separation or further definition of the functional blocks described herein.

As shown in FIG. 11, an electronic device 1100 includes a display unit 1102, a touch sensitive surface unit 1104, rotatable input mechanism unit 1106, and a processing unit 1108 coupled to the a display unit 1102, a touch sensitive surface unit 1104, rotatable input mechanism unit 1106. In some embodiments, the processing unit 1108 includes a display enabling unit 1110, a receiving unit 1112, and a determining unit 814.

The processing unit 1108 is configured to: enable display (e.g., using display enabling) of a user input interface on the display unit 1102 including a message area and a stroke input area; receive (e.g., using receiving unit 1112) a first set of strokes on the touch sensitive surface unit in the stroke input area; determine (e.g., using determining unit 1114) first text based on the first set of strokes; enable display (e.g., using display enabling unit 1110) the first text in the message area; receive (e.g., using receiving unit 1112) a second set of strokes on the touch sensitive surface unit in the stroke input area after receiving the first set of strokes and displaying the first text; determine (e.g., using determining unit 1114) revised first text based on the first set and second set of strokes; and replace (e.g., using display enabling unit 1110) the display of the first text with the revised first text.

In some embodiments, the second set of strokes is received after a period of time since receiving the first set of strokes, and the determination of the revised first text based on the first set and second set of strokes is in accordance with a determination that the period of time is below a threshold value.

In some embodiments, enabling displaying of the first text occurs before receiving the second set of strokes.

In some embodiments, determining the revised first text is further based on a current context of the portable electronic device at the time of the determination of the revised first text.

In some embodiments, the processing unit 1108 is further configured to: after receiving the second set of strokes and after enabling display of the revised first text, receive (e.g., using receiving unit 1112) a third set of strokes on the touch sensitive surface in the stroke input area; determine (e.g., using determining unit 1114) second text based on the third set of strokes; and enable display (e.g., using display enabling unit 1110) of the second text with the revised first text.

In some embodiments, the first set of strokes is a single continuous stroke and the first text is a single character.

In some embodiments, the second set of strokes is a single continuous stroke.

In some embodiments, the revised first text differs from the first text by only a single character.

In some embodiments, the revised first text differs from the first text by only the last character of the revised first text or the first text.

The operations described above with reference to FIG. 10 are, optionally, implemented by components depicted in FIGS. 1A-1B or FIG. 11. For example, receiving operation 1004 is, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 12A-12L illustrate exemplary user interfaces for handwriting on screens, in accordance with some embodiments. The user interfaces in these figures are used to illustrate the processes described below, including the processes in FIG. 13.

FIGS. 12A-12H depict the steps of using electronic device 600 to enter the word "going" on a touch sensitive surface using multiple strokes while electronic device 600 processes the strokes completely as they are available. In contrast, FIGS. 12I-12L depict the steps of using electronic device 600 to enter the word "going" on a touch sensitive surface using multiple strokes while electronic device 600 processing strokes as they are available but interrupting analysis of previous strokes to restart the analysis with new strokes as they become available. In some cases, this latter process provides for benefits over the former process.

Figure 12A:
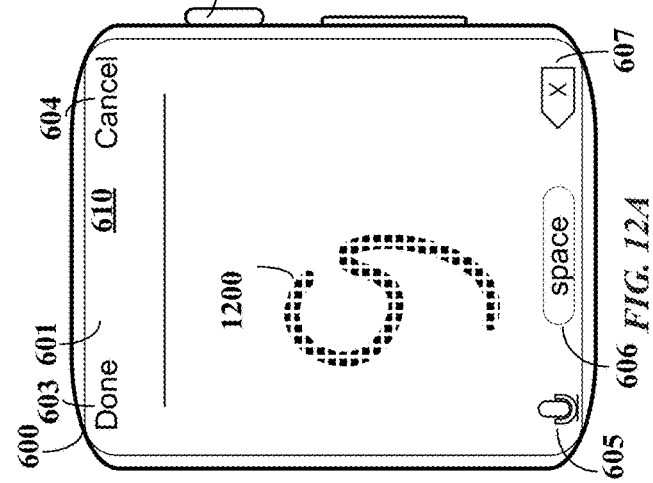
Figure 12F:
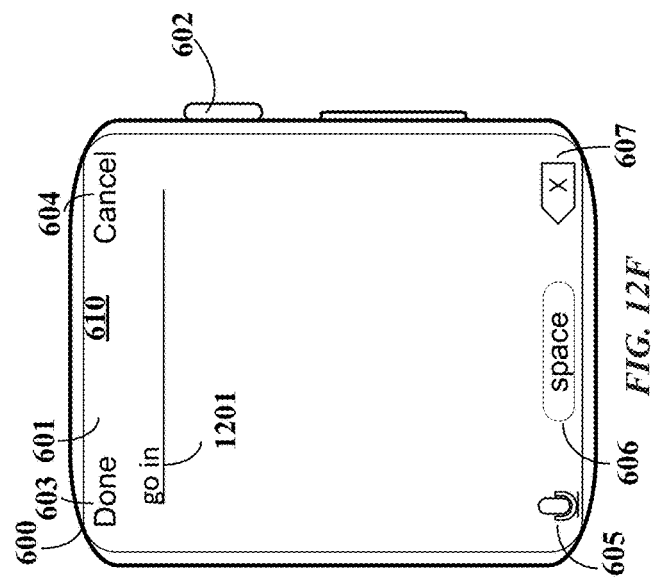
Figure 12E:
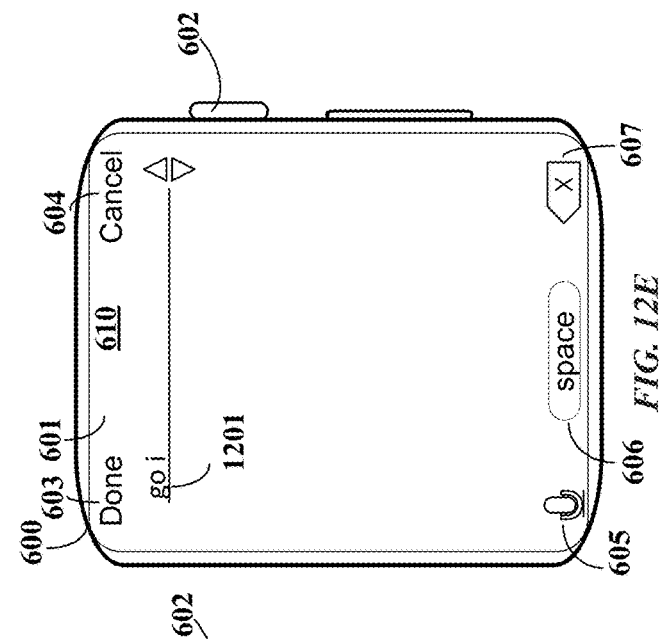
Figure 12D:
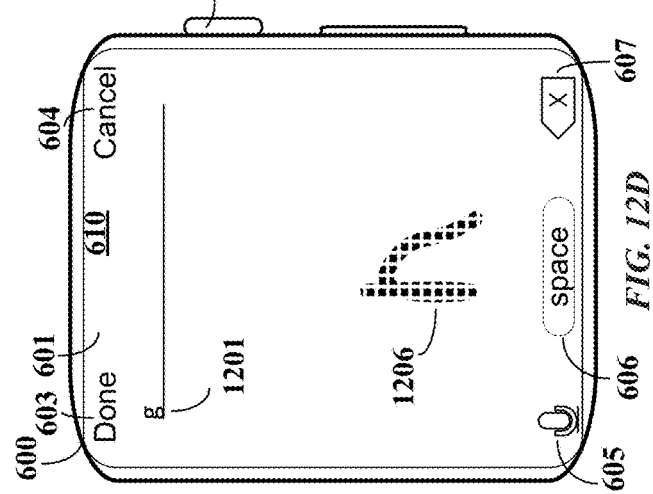
Figure 12H:
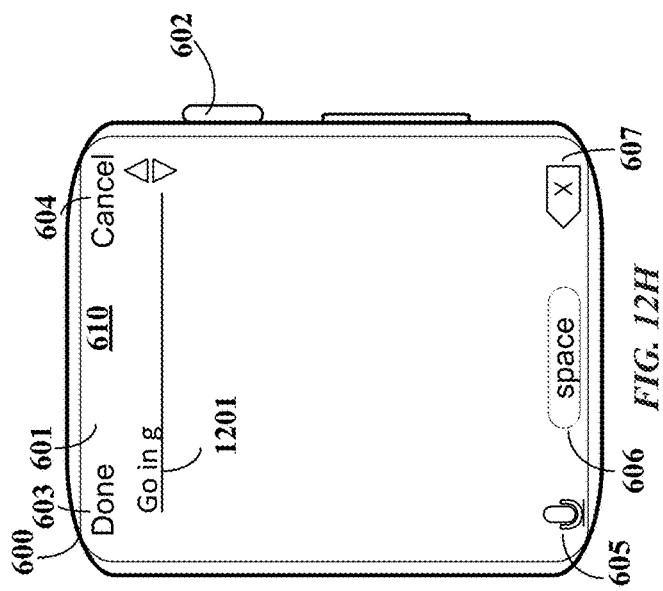
Figure 12G:
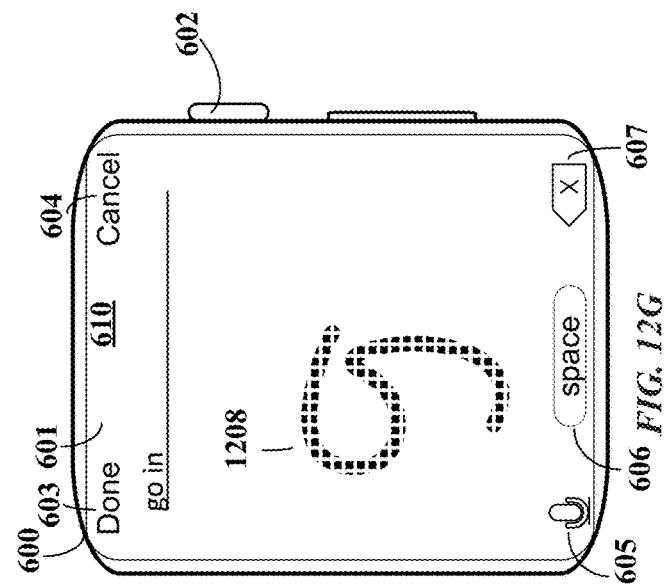
Figure 12L:
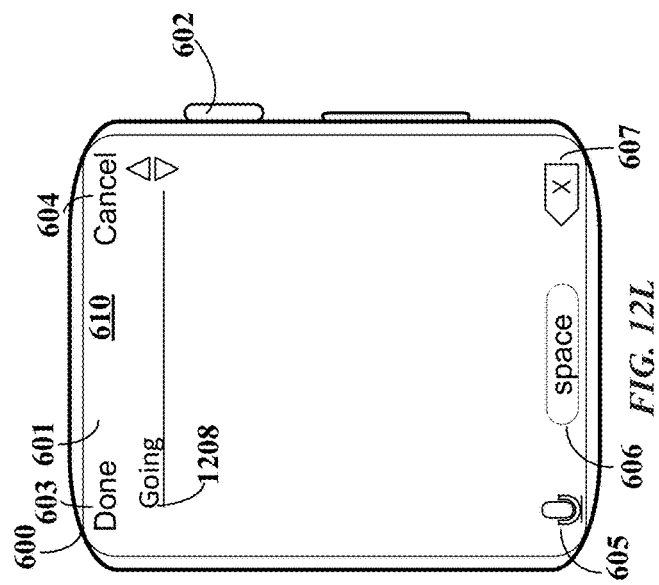
Figure 13:
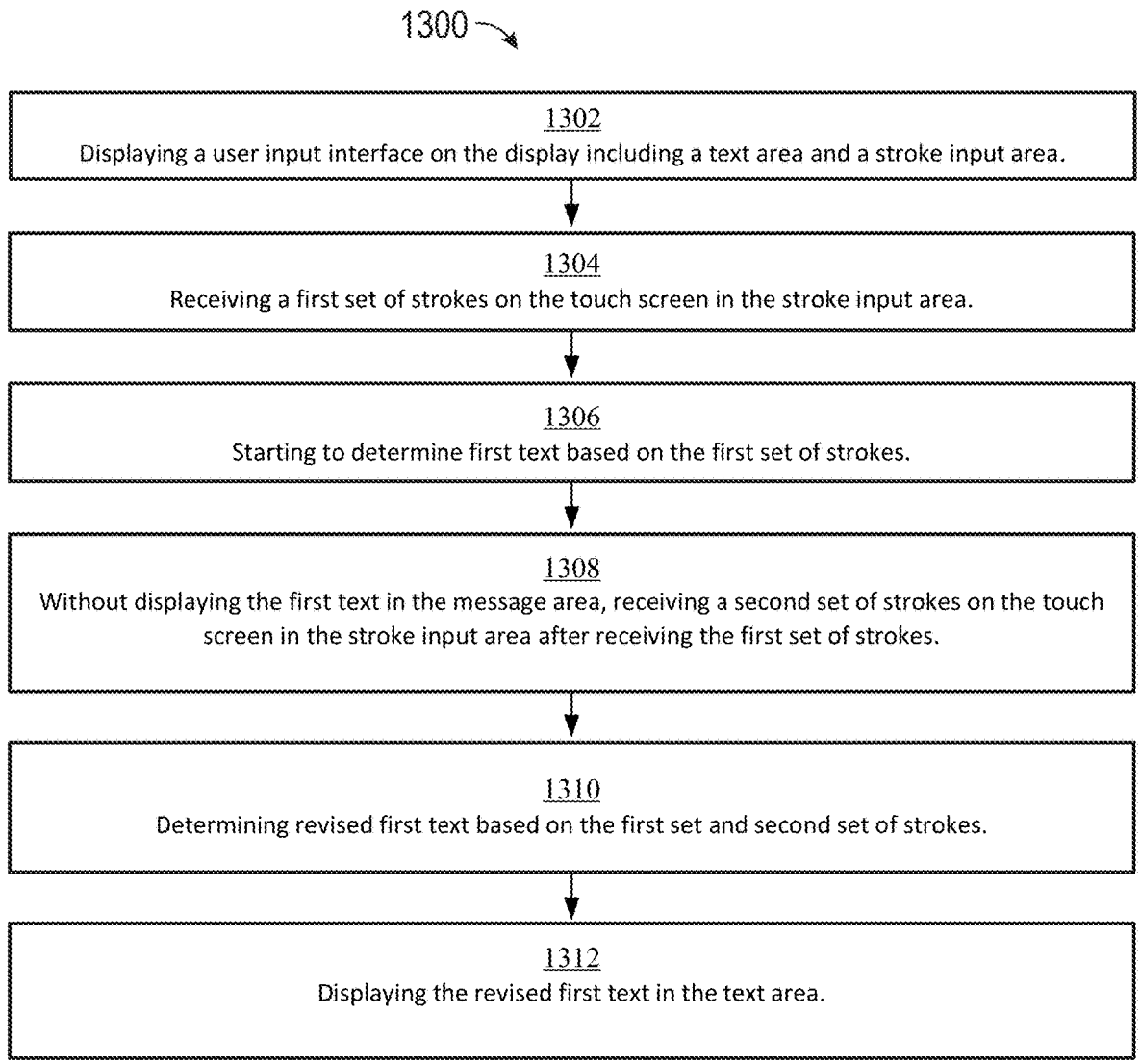
FIG. 13 is a flow diagram illustrating a method for handwriting on a touch sensitive surface.

FIG. 12A depicts handwriting interface 610 after electronic device 600 has received stroke 1200. FIG. 12B depicts the result (text 1201) of electronic device 600 analyzing the stroke corresponding to stroke representation 1200. FIG. 12C depicts handwriting interface 610 after electronic device 600 has received the stroke corresponding to stroke representation 1202 and the stroke corresponding to stroke representation 1204. FIG. 12D depicts handwriting interface 610 after electronic device 600 has started processing the strokes corresponding to stroke representations 1202 and 1204 but before electronic device 600 has determined corresponding text for the strokes. In FIG. 12D, the fact that the strokes corresponding to stroke representations 1202 and 1204 are being processed is indicated by the stroke representations no longer being displayed. This behavior, however, is exemplary and is not necessarily true in all cases. FIG. 12D depicts that electronic device 600 has also received stroke 1206. That is, electronic device 600 received the stroke corresponding to stroke representation 1206 after it started processing the strokes corresponding to stroke representations 1202 and 1204, but before electronic device 600 determines corresponding text for the strokes. FIG. 12E depicts electronic device 600 after it finished analyzing the strokes corresponding to stroke representations 1202 and 1204 and starting to analyze the stroke corresponding to stroke representation 1206, but before electronic device 600 has finished analyzing the stroke corresponding to stroke representation 1206. FIG. 12F depicts electronic device 600 after it has finished analyzing the stroke corresponding to stroke representation 1206. Finally, in FIG. 12G electronic device 600 receives the final stroke (the stroke corresponding to stroke representation 1208) and processes it. The result is depicted in FIG. 12H as text 1201. Because electronic device 600 processed strokes to completion as they became available, text 1201 is incorrect because electronic device 600 did not have the full context of all of the strokes as they were made available. Even if electronic device 600 had arrived at the correct text in FIG. 12H, it likely would have performed excessive or redundant processing as long the way because it was determining text without access to the full context of all the strokes.

Figure 12I:
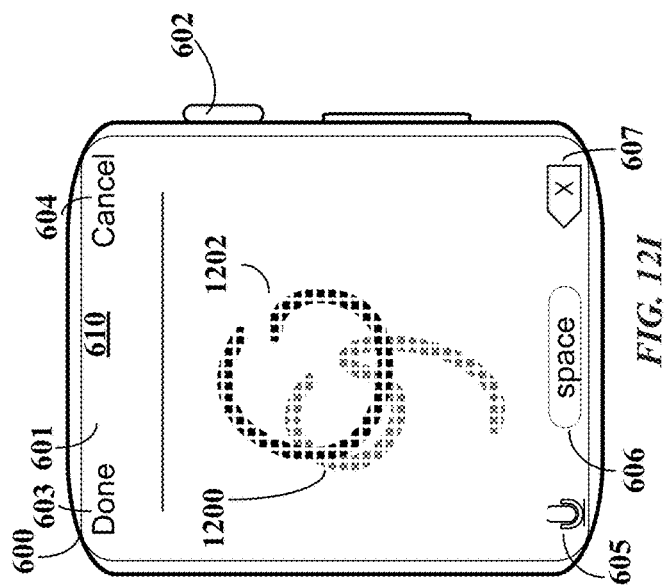
Figure 12K:
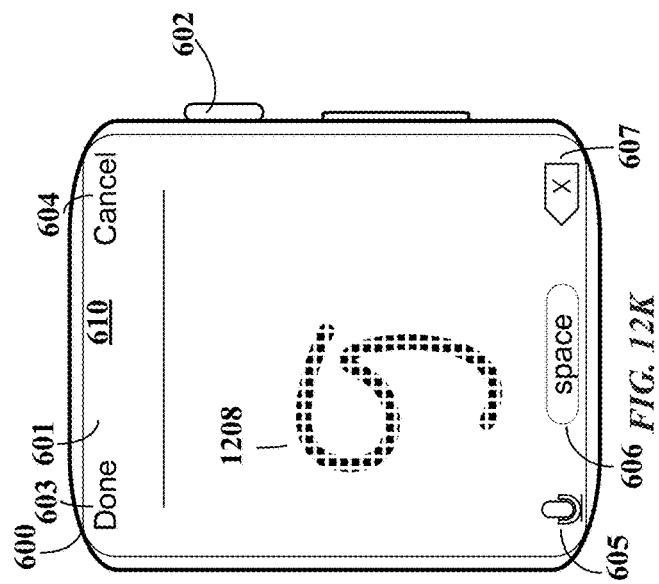
Figure 12J:
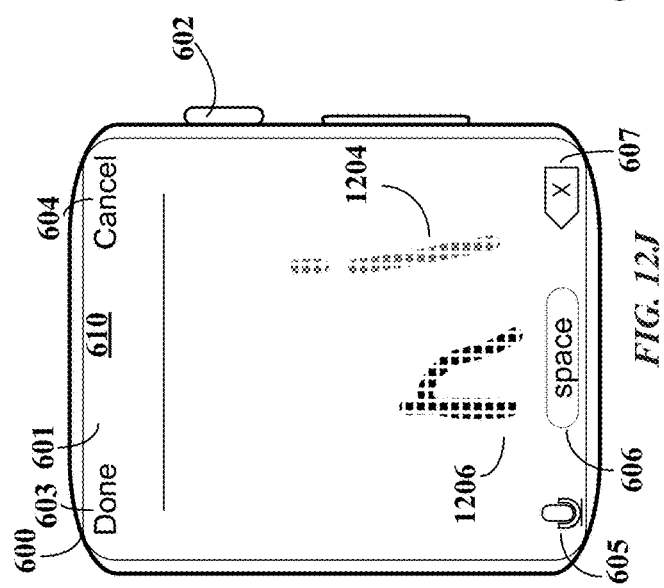

In contrast, in FIGS. 12I-12L, the same strokes are entered and processing begins as the strokes are available. Electronic device 600, however, stops processing the current set of strokes each time a new stroke is available. For example, FIG. 12I depicts that electronic device 600 has received two strokes, strokes corresponding to stroke representations 1200 and 1202. FIG. 12J depicts that electronic device 600 has started processing the strokes corresponding to stroke representations 1200 and 1202 (e.g., indicated by stroke representations 1200 and 1202 no longer being displayed, which is not necessarily true for all embodiments) but has not yet determined corresponding text when strokes corresponding to stroke representations 1204 and 1206 are received. In this case, in response to receiving strokes corresponding to stroke representations 1204 and 1206 (or even just the stroke corresponding to stroke representation 1204 that was entered first), electronic device 600 stops processing the set of strokes corresponding to stroke representations 1200 and 1202, adds strokes corresponding to stroke representations 1204 and 1206 to the set of strokes, and continues processing the set of strokes. FIG. 12K depicts that the final stroke, the stroke corresponding to stroke representation 1208, is entered. Similar to when strokes corresponding to stroke representations 1204 and 1206 were entered, because electronic device 600 is still processing the set of strokes when stroke 1208 is received, electronic device 600 stops processing, adds the stroke corresponding to stroke representation 1208 to the set of strokes, and continues processing the set of strokes. In some cases, electronic device 600 resets/restarts its analysis when new strokes are added to the set of strokes, but this is not necessarily true in all embodiments.

FIG. 13 is a flow diagram illustrating a method for handwriting on a touch sensitive surface using an electronic device in accordance with some embodiments. Method 1300 is performed at a device (e.g., 100, 300, 500) with a display, a touch sensitive surface, and a rotatable input device. Some operations in method 1300 are, optionally, combined, the order of some operations are, optionally, changed, and some operations are, optionally, omitted.

As described below, method 1300 provides an intuitive way for handwriting on touch sensitive surfaces. The method reduces the cognitive burden on a user for handwriting on touch sensitive surfaces, thereby creating a more efficient human-machine interface. For battery-operated computing devices, enabling a user to enter handwriting on touch sensitive surfaces faster and more efficiently conserves power and increases the time between battery charges.

The electronic device displays (1302) a user input interface (e.g. 610) on the display including a message area (e.g., 609) and a stroke input area (e.g., 608) (e.g., an area of the display and touch sensitive surface that detects and displays strokes received from the user via a finger, stylus, or other object). In some examples, the message area and the stroke input area are partially overlapping. In some examples, the message area is completely within the stroke input area. In some examples, the message area and stroke input area share a boundary but do not overlap each other. In some examples, the message area and stroke input area are spaced apart. In some examples the touch sensitive surface is less than 2 in×2 in, less than 1.5 in×1.5 in, or less than 1 in×1 in.

The electronic device receives (1304) a first set of strokes (e.g., 1200, 1202, 1204) (e.g., one or more continuous strokes, where each stroke represents a letter or part of a letter) on the touch sensitive surface in the stroke input area (e.g., 608). In some examples, the first set of strokes represents one letter, multiple letters, one word, or multiple words. In some examples, the display provides feedback to the user of the location and shape of a stroke of the first set of strokes as the stroke is received (e.g., display of strokes 1200, 1202, 1204).

The electronic device starts (1306) to determine first text (e.g., a letter, letters, a word, or words) based on the first set of strokes (e.g., strokes 1200, 1202, 1204). In some examples, the determination can further be based on strokes received prior to the first set of strokes, context of the electronic device (e.g., time of day, location, current activity, calendar, the person that the message is intended), or other information.

The electronic device receives (1308) a second set of strokes (e.g., 1206) (e.g., one or more continuous strokes, where each stroke represents a letter or part of a letter) on the touch sensitive surface in the stroke input area (e.g., 608) without displaying the first text in the message area (e.g., FIG. 12J). In some examples, the second set of strokes represents a part of a letter, one letter, multiple letters, one word, or multiple words. In some examples, the display provides feedback to the user of the location and shape of a stroke of the first set of strokes as the stroke is received (e.g., display of strokes 1206). In accordance with some embodiments, the electronic device determines the first text based on the first set of strokes before receiving the second set of strokes.

The electronic device determines revised first text based on the first set and second set of strokes (e.g., text 1208).

The electronic device displays the revised first text in the message area (e.g., text 1208).

In accordance with some embodiments, the revised first text includes a first character and wherein the first character is not based on the second set of strokes (e.g., the first character is "G" and is not based on stroke 1206).

In accordance with some embodiments, the revised first text includes a plurality of characters and the plurality of characters are based on the first set of strokes (e.g., the test includes "Go" that are based on the first set of strokes, 1200 and 1202).

In accordance with some embodiments, the revised first text includes a second character and wherein the second character is not based on the first set of strokes (e.g., a second character is the "i" that is not based on the first set of strokes, strokes 1200 and 1202.

In accordance with some embodiments, the revised first text is a single word (e.g., text 1208).

In accordance with some embodiments, the first set of strokes (e.g., 1200 and 1202) are entered in a location on the stroke input area substantially the same as a location in the stroke input area where the second set of strokes (e.g., 1206 or 1208) are entered.

In accordance with some embodiments, the revised first text includes a first portion based on the shape of the first set of strokes and context provided by the second set of strokes (e.g., the first set of strokes are in the shape of an "n" or an "h," but it is ambiguous based on shape along which letter is correct and the context provide the second strokes results in determining that the corresponding letter is "n" because the second set of strokes' corresponding text is "ight.").

In accordance with some embodiments, the revised first text includes a first portion based on the shape of the second set of strokes and context provided by the first set of strokes (e.g., the second set of strokes are in the shape of an "n" or an "h," but it is ambiguous based on shape along which letter is correct and the context provide the first strokes results in determining that the corresponding letter is "n" because the first set of strokes' corresponding text is "tur.").

Figure 14:
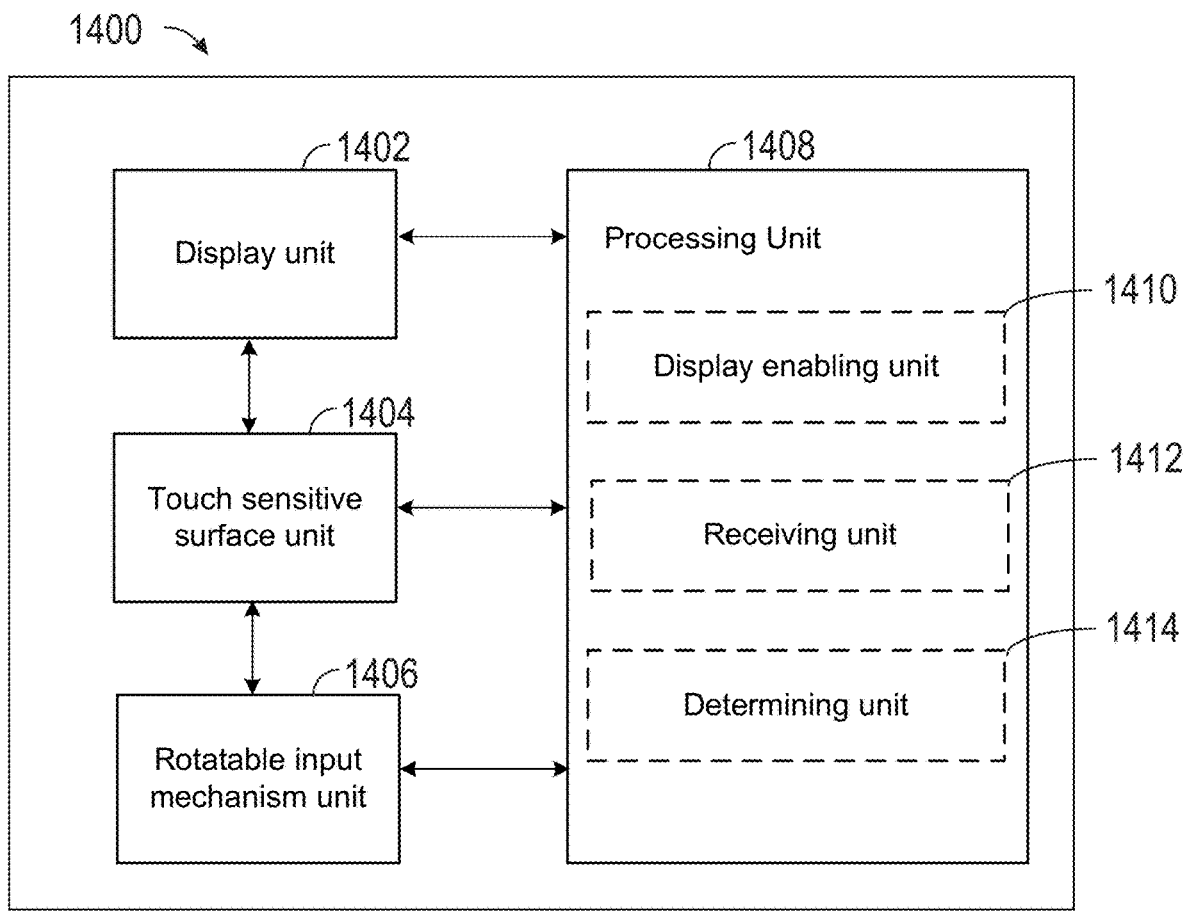
FIG. 14 shows an exemplary functional block diagram of an electronic device.

In accordance with some embodiments, FIG. 14 shows an exemplary functional block diagram of an electronic device 1400 configured in accordance with the principles of the various described embodiments. In accordance with some embodiments, the functional blocks of electronic device 1400 are configured to perform the techniques described above. The functional blocks of the device 1400 are, optionally, implemented by hardware, software, or a combination of hardware and software to carry out the principles of the various described examples. It is understood by persons of skill in the art that the functional blocks described in FIG. 14 are, optionally, combined or separated into sub-blocks to implement the principles of the various described examples. Therefore, the description herein optionally supports any possible combination or separation or further definition of the functional blocks described herein.

As shown in FIG. 14, an electronic device 1400 includes a display unit 1402, a touch sensitive surface unit 1404, rotatable input mechanism unit 1406, and a processing unit 1408 coupled to the a display unit 1402, a touch sensitive surface unit 1404, rotatable input mechanism unit 1406. In some embodiments, the processing unit 1408 includes a display enabling unit 1410, a receiving unit 1412, and a determining unit 1414.

The processing unit 1408 is configured to: enable display (e.g., using display enabling unit 1410) of a user input interface on the display 1402 including a message area and a stroke input area; receive (e.g., using receiving unit 1412) a first set of strokes on the touch sensitive surface in the stroke input area; start to determine (e.g., using determining unit 1414) first text based on the first set of strokes; without enabling display of the first text in the message area, receive (e.g., using receiving unit 1412) a second set of strokes on the touch sensitive surface in the stroke input area after receiving the first set of strokes; determine (e.g., using determining unit 1414) revised first text based on the first set and second set of strokes; and enable display (e.g., using display enabling unit 1410) of the revised first text in the message area.

In some embodiments, the revised first text includes a first character and wherein the first character is not based on the second set of strokes.

In some embodiments, the revised first text includes a plurality of characters and wherein the plurality of characters are based on the first set of strokes.

In some embodiments, the revised first text includes a second character and wherein the second character is not based on the first set of strokes.

In some embodiments, the revised first text is a single character.

In some embodiments, the revised first text is a single word.

In some embodiments, the first set of strokes are entered in a location on the stroke input area substantially the same as a location in the stroke input area where the second set of strokes are entered.

In some embodiments, the processing unit 1408 is further configured to: determine (e.g., using determining unit 1414) first text based on the first set of strokes before receiving the second set of strokes.

In some embodiments, the revised first text includes a first portion based on the shape of the first set of strokes and context provided by the second set of strokes.

In some embodiments, the revised first text includes a first portion based on the shape of the second set of strokes and context provided by the first set of strokes.

The operations described above with reference to FIG. 13 are, optionally, implemented by components depicted in FIGS. 1A-1B or FIG. 14. For example, receiving operation 1304 is, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 15A-15J illustrate exemplary user interfaces for handwriting on screens, in accordance with some embodiments. The user interfaces in these figures are used to illustrate the processes described below, including the processes in FIG. 16.

Figure 15A:
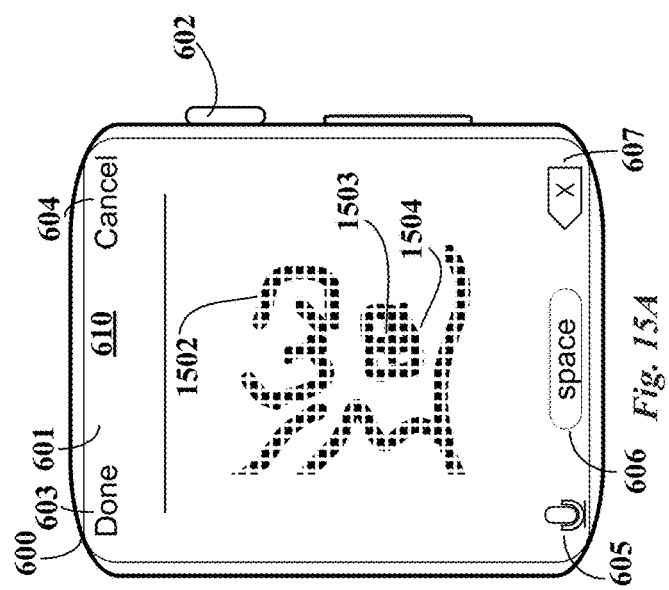
Figure 16:
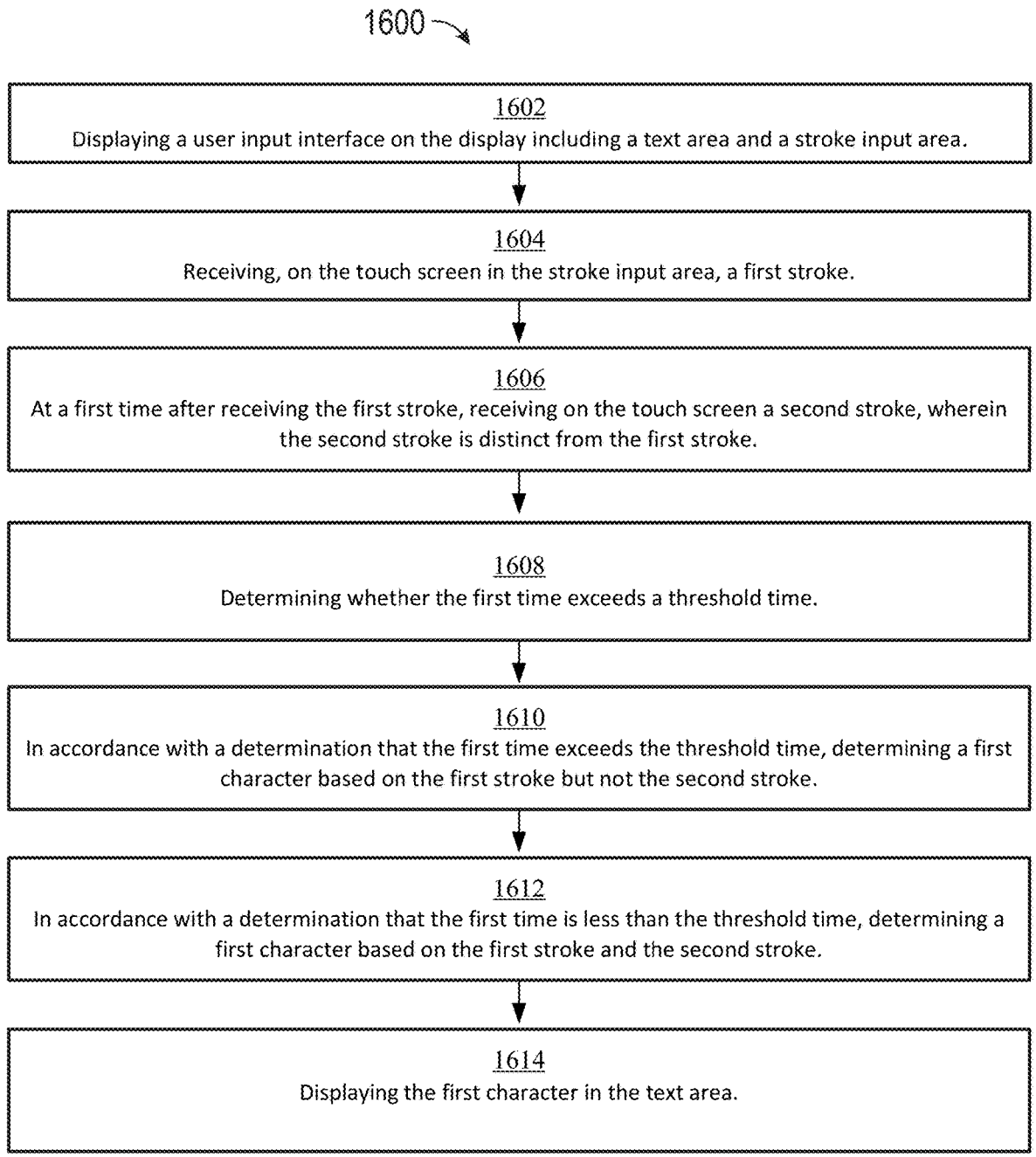
FIG. 16 is a flow diagram illustrating a method for handwriting on a touch sensitive surface.

FIG. 15A depicts handwriting interface 610 after electronic device 600 has received set of strokes corresponding to set-of-strokes representation 1502, which includes the stroke corresponding to stroke representation 1503 and the stroke corresponding to stroke representation 1504, which are the last two strokes, respectively, to be received in FIG. 15A. Set-of-strokes representation 1502 represents a logographic character (e.g., a simplified Chinese character). Because overlapping logographic characters can contain many strokes and be difficult to analyze (e.g., see FIG. 15E for an example of just two overlapping logographic characters), electronic device 600 determines the corresponding logographic character when all of the strokes for a logographic character have been received based on the time between strokes that are received.

With respect to the strokes corresponding to stroke representations 1503 and 1504, a determination is made as to whether the time between the strokes (e.g., the time when the stroke corresponding to stroke representation 1503 was completed to the time when the stroke corresponding to stroke representation 1504 was started) exceeds a threshold value. If the time does not exceed the threshold, the strokes corresponding to stroke representations 1503 and 1504 are included together in the same set, as depicted in FIG. 15A.

If the time between the next stroke (i.e., the stroke corresponding to stroke representation 1506 of FIG. 15B) and the stroke corresponding to stroke representation 1504 exceeds the threshold, then the set of strokes corresponding to set-of-strokes representation 1502 will be analyzed as a set together, without the stroke corresponding to stroke representation 1506, to determine corresponding logographic character 1508. The stroke corresponding to stroke representation 1506 will be added to the set of strokes (set of strokes corresponding to set-of-stokes representation 1510 of FIG. 15C) for the subsequent character depicted in FIG. 15C. This method, which is also described with respect to FIG. 16, enables electronic device 600 to save battery power by avoiding processing of multiple logographic characters at the same time.

Figure 15F:
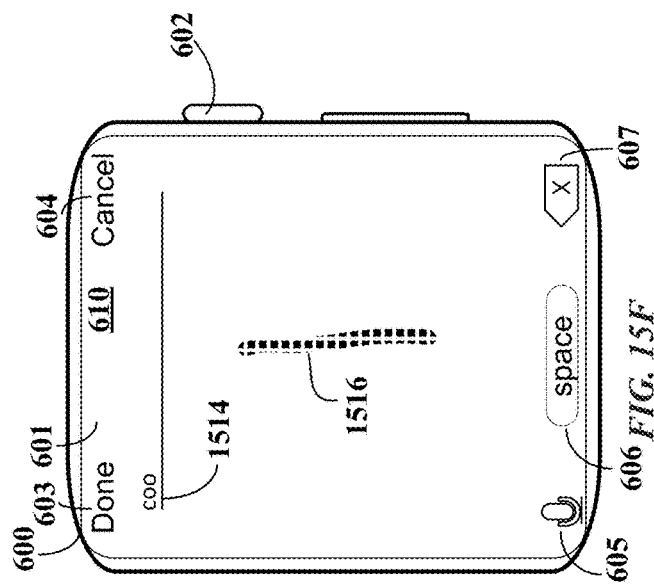
Figure 15E:
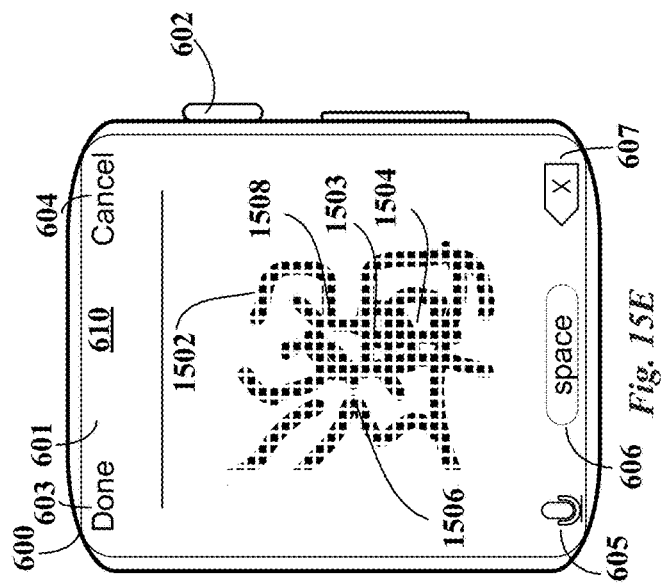
Figure 15D:
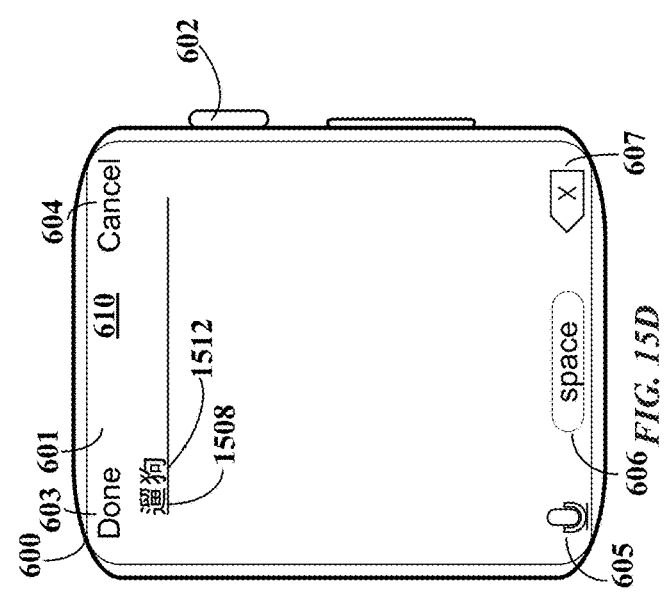

This technique can also be used to disambiguate strokes representing phonetic characters as well as logographic characters. For example, FIG. 15F depicts handwriting interface 610 after electronic device 600 has received text 1514 and the stroke corresponding to stroke representation 1516. In FIG. 15G, a subsequent stroke, the stroke corresponding to stroke representation 1518, is received. Based on the time between the stroke corresponding to stroke representation 1516 and the stroke corresponding to stroke representation 1518, electronic device 600 can determine whether the strokes corresponding to stroke representations 1516 and 1518 were intended to be the letter "k" to spell the word "cook" (text 1516 of FIG. 15H) or whether the strokes corresponding to stroke representations 1516 and 1518 are two separate characters and the intent was to spell "cool" (text 1520 of FIG. 15J).

If the time between the strokes exceeds a threshold value, electronic device 600 treats the strokes corresponding to stroke representations 1516 and 1518 as parts of different characters, as depicted in FIG. 15H. The stroke corresponding to stroke representation 1518 can then be separately analyzed to produce, for example, the letter "c" as part of the word "car" (text 1518 of FIG. 15H). If the time between strokes is does not exceed the threshold value, strokes 1516 and 1518 are treated as part of the same character, as depicted in FIG. 15J.

FIG. 16 is a flow diagram illustrating a method for handwriting on a touch sensitive surface using an electronic device in accordance with some embodiments. Method 1600 is performed at a device (e.g., 100, 300, 500) with a display, a touch sensitive surface, and a rotatable input device. Some operations in method 1600 are, optionally, combined, the order of some operations are, optionally, changed, and some operations are, optionally, omitted.

As described below, method 1600 provides an intuitive way for handwriting on touch sensitive surfaces. The method reduces the cognitive burden on a user for handwriting on touch sensitive surfaces, thereby creating a more efficient human-machine interface. For battery-operated computing devices, enabling a user to enter handwriting on touch sensitive surfaces faster and more efficiently conserves power and increases the time between battery charges.

The electronic device displays (1602) a user input interface (e.g. 610) on the display including a message area (e.g., 609) and a stroke input area (e.g., 608) (e.g., an area of the display and touch sensitive surface that detects and displays strokes received from the user via a finger, stylus, or other object). In some examples, the message area and the stroke input area are partially overlapping. In some examples, the message area is completely within the stroke input area. In some examples, the message area and stroke input area share a boundary but do not overlap each other. In some examples, the message area and stroke input area are spaced apart. In some examples the touch sensitive surface is less than 2 in×2 in, less than 1.5 in×1.5 in, or less than 1 in×1 in.

The electronic device receives (1604), on the touch sensitive surface in the stroke input area, a first stroke (e.g., stroke 1504). In some examples, the first stroke is the latest of multiple strokes.

The electronic device, at a first time after receiving the first stroke, receives (1606) on the touch sensitive surface a second stroke (e.g., 1506). The second stroke is distinct from the first stroke (e.g., the first and second strokes are not the same and are not different parts of the same stroke).

The electronic device determines (1608) whether the first time exceeds a threshold time (e.g., whether the time from the end of stroke 1504 to the start of stroke 1506 is greater than a threshold value).

In accordance with the electronic device determining that the first time exceeds the threshold time, the electronic device determines (1610) a first character (e.g., character 1508) based on the first stroke (e.g., 1504) but not the second stroke (e.g., 1506).

In accordance with the electronic device determining that the first time (e.g., using stroke 1503 as the first stroke and stroke 1504 as the second stroke) is less than the threshold time, determining (1612) a first character (e.g., character 1508) based on the first stroke (e.g., 1503) and the second stroke (e.g., 1504) (e.g., in addition to the other strokes of set of strokes 1502).

The electronic device displays (1614) the first character (e.g., character 1508) in the message area.

In accordance with some embodiments, the electronic device, further in accordance with a determination that the first time exceeds the threshold time, determines a second character (e.g., character 1512) based on the second stroke (e.g., 1506). The electronic device displays the second character (e.g., character 1512) in the message area with the first character.

In accordance with some embodiments, the display of the first character and the second character are separated by a space (e.g., FIG. 15I).

In accordance with some embodiments, the first character is a phonetic character (e.g., FIGS. 15H and 15J).

In accordance with some embodiments, the first character is a logographic character (e.g., character 1508).

Figure 17:
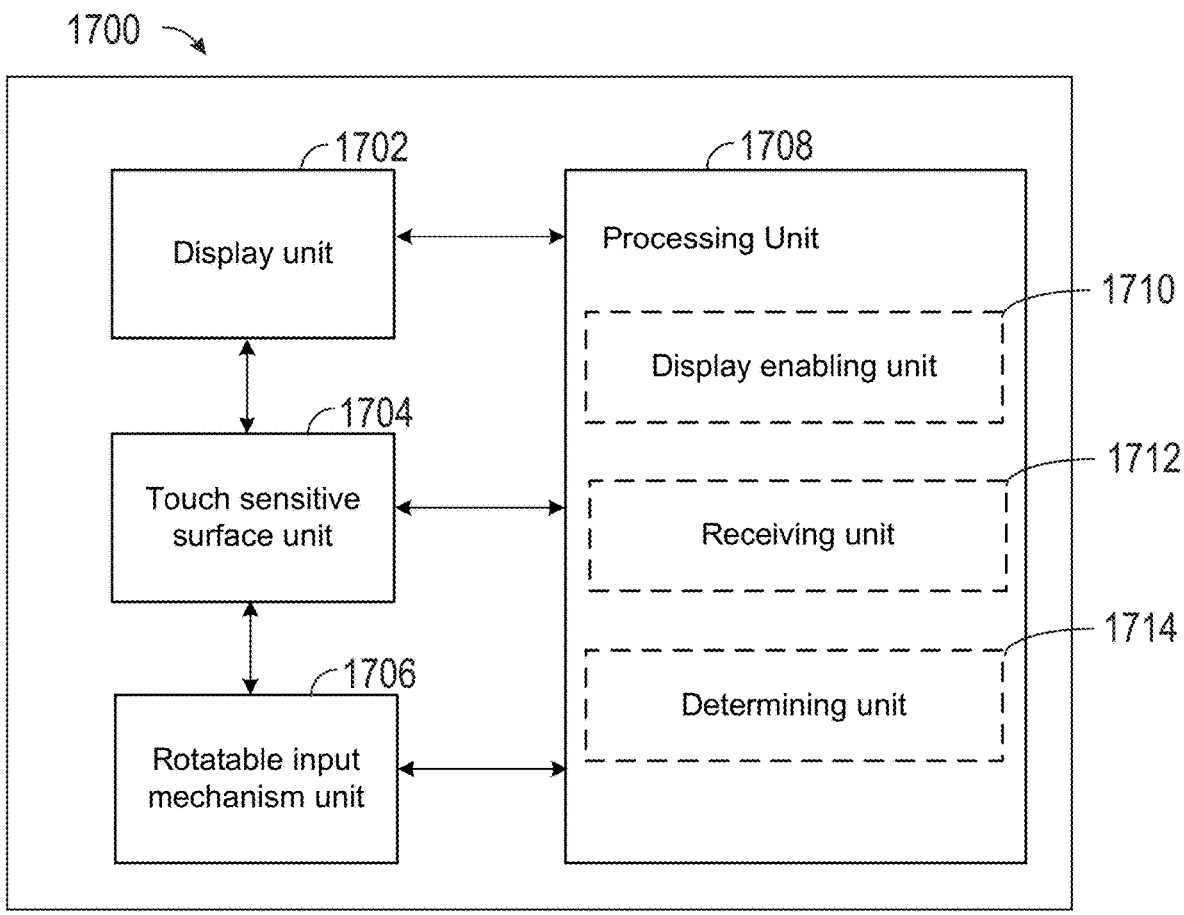
FIG. 17 shows an exemplary functional block diagram of an electronic device.

In accordance with some embodiments, FIG. 17 shows an exemplary functional block diagram of an electronic device 1700 configured in accordance with the principles of the various described embodiments. In accordance with some embodiments, the functional blocks of electronic device 1700 are configured to perform the techniques described above. The functional blocks of the device 1700 are, optionally, implemented by hardware, software, or a combination of hardware and software to carry out the principles of the various described examples. It is understood by persons of skill in the art that the functional blocks described in FIG. 17 are, optionally, combined or separated into sub-blocks to implement the principles of the various described examples. Therefore, the description herein optionally supports any possible combination or separation or further definition of the functional blocks described herein.

As shown in FIG. 17, an electronic device 1700 includes a display unit 1702, a touch sensitive surface unit 1704, rotatable input mechanism 1706, and a processing unit 1708 coupled to the a display unit 1702, a touch sensitive surface unit 1704, rotatable input mechanism 1706. In some embodiments, the processing unit 1708 includes a display enabling unit 1710, a receiving unit 1712, and a determining unit 1714.

The processing unit 1708 is configured to: enable display (e.g., using display enabling unit 1710) of a user input interface on the display unit 1702 including a message area and a stroke input area; receive (e.g., using receiving unit 1712), on the touch sensitive surface unit 1704 in the stroke input area, a first stroke; at a first time after receiving the first stroke, receiving (e.g., using receiving unit 1712) on the touch sensitive surface unit 1704 a second stroke, wherein the second stroke is distinct from the first stroke; determine (e.g., using determining unit 1714) whether the first time exceeds a threshold time; in accordance with a determination that the first time exceeds the threshold time, determine (e.g., using determining unit 1714) a first character based on the first stroke but not the second stroke; in accordance with a determination that the first time is less than the threshold time, determine (e.g., using determining unit 1714) a first character based on the first stroke and the second stroke; and enable display (e.g., using display enabling unit 1710) of the first character in the message area.

In some embodiments, the processing unit 1708 is further configured to: further in accordance with a determination that the first time exceeds the threshold time, determine (e.g., using determining unit 1714) a second character based on the second stroke; and enable display (e.g., using display enabling unit 1710) of the second character in the message area with the first character.

In some embodiments, the display of the first character and the second character are separated by a space.

In some embodiments, the processing unit 1708 is further configured to: determine (e.g., using determining unit 1714) context associated with the first character; determine (e.g., using determining unit 1714) the second character is further based on the context.

In some embodiments, the first character is a phonetic character.

In some embodiments, the first character is a logographic character.

The operations described above with reference to FIG. 16 are, optionally, implemented by components depicted in FIGS. 1A-1B or FIG. 17. For example, receiving operation 1604 is, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. An electronic device, comprising:
   a display;
   a touch sensitive surface;
   one or more processors; and
   memory storing one or more programs configured to be executed by the one or more processors, the one or more programs including instructions for:
   displaying a user input interface on the display including a text area and a stroke input area, wherein the text area does not overlap the stroke input area;
   receiving a first set of strokes on the touch screen in the stroke input area;
   determining first text based on the first set of strokes;
   displaying the first text in the text area;
   receiving a second set of strokes on the touch screen in the stroke input area after receiving the first set of strokes and displaying the first text, wherein the second set of strokes is received after a period of time since receiving the first set of strokes;
   in accordance with a determination that the period of time since receiving the first set of strokes is below a threshold value:
   determining revised first text based on the first set of strokes and the second set of strokes; and
   replacing the display of the first text with the revised first text; and
   in accordance with a determination that the period of time since receiving the first set of strokes exceeds the threshold value:
   determining second text based on the second set of strokes independent of the first set of strokes; and
   displaying the second text in the text area.

2. The electronic device of claim 1, wherein displaying the first text occurs before receiving the second set of strokes.

3. The electronic device of claim 1, wherein determining the revised first text is further based on a current context of the electronic device at the time of the determination of the revised first text.

4. The electronic device of claim 1 further comprising;
   after receiving the second set of strokes and after displaying the revised first text, receiving a third set of strokes on the touch screen in the stroke input area;
   determining second text based on the third set of strokes; and
   displaying the second text with the revised first text.

5. The electronic device of claim 1, wherein the first set of strokes is a single continuous stroke and the first text is a single character.

6. The electronic device of claim 1, wherein the second set of strokes is a single continuous stroke.

7. The electronic device of claim 1, wherein the revised first text differs from the first text by only a single character.

8. The electronic device of claim 1, wherein the revised first text differs from the first text by only a last character of the revised first text or the first text.

9. The electronic device of claim 1, wherein at least a portion of the second set of strokes overlaps the first set of strokes.

10. A non-transitory computer-readable storage medium storing one or more programs configured to be executed by one or more processors of an electronic device with a display and a touch sensitive surface, the one or more programs including instructions for:
   displaying a user input interface on the display including a text area and a stroke input area, wherein the text area does not overlap the stroke input area;
   receiving a first set of strokes on the touch screen in the stroke input area;
   determining first text based on the first set of strokes;
   displaying the first text in the text area;
   receiving a second set of strokes on the touch screen in the stroke input area after receiving the first set of strokes and displaying the first text, wherein the second set of strokes is received after a period of time since receiving the first set of strokes;
   in accordance with a determination that the period of time since receiving the first set of strokes is below a threshold value:
   determining revised first text based on the first set of strokes and the second set of strokes; and
   replacing the display of the first text with the revised first text; and
   in accordance with a determination that the period of time since receiving the first set of strokes exceeds the threshold value:

determining second text based on the second set of strokes independent of the first set of strokes; and displaying the second text in the text area.

11. The non-transitory computer-readable storage medium of claim 10, wherein displaying the first text occurs before receiving the second set of strokes.

12. The non-transitory computer-readable storage medium of claim 10, wherein determining the revised first text is further based on a current context of the electronic device at the time of the determination of the revised first text.

13. The non-transitory computer-readable storage medium of claim 10 further comprising;

after receiving the second set of strokes and after displaying the revised first text, receiving a third set of strokes on the touch screen in the stroke input area;

determining second text based on the third set of strokes; and displaying the second text with the revised first text.

14. The non-transitory computer-readable storage medium of claim 10, wherein the first set of strokes is a single continuous stroke and the first text is a single character.

15. The non-transitory computer-readable storage medium of claim 10, wherein the second set of strokes is a single continuous stroke.

16. The non-transitory computer-readable storage medium of claim 10, wherein the revised first text differs from the first text by only a single character.

17. The non-transitory computer-readable storage medium of claim 10, wherein the revised first text differs from the first text by only a last character of the revised first text or the first text.

18. The non-transitory computer-readable storage medium of claim 10, wherein at least a portion of the second set of strokes overlaps the first set of strokes.

19. A method, comprising:

at an electronic device having one or more processors, a touch screen and a display:

displaying a user input interface on the display including a text area and a stroke input area, wherein the text area does not overlap the stroke input area;

receiving a first set of strokes on the touch screen in the stroke input area;

determining first text based on the first set of strokes;

displaying the first text in the text area;

receiving a second set of strokes on the touch screen in the stroke input area after receiving the first set of strokes and displaying the first text, wherein the second set of strokes is received after a period of time since receiving the first set of strokes;

in accordance with a determination that the period of time since receiving the first set of strokes is below a threshold value:

determining revised first text based on the first set of strokes and the second set of strokes; and replacing the display of the first text with the revised first text; and in accordance with a determination that the period of time since receiving the first set of strokes exceeds the threshold value:

determining second text based on the second set of strokes independent of the first set of strokes; and displaying the second text in the text area.

20. The method of claim 19, wherein displaying the first text occurs before receiving the second set of strokes.

21. The method of claim 19, wherein determining the revised first text is further based on a current context of the electronic device at the time of the determination of the revised first text.

22. The method of claim 19 further comprising;

after receiving the second set of strokes and after displaying the revised first text, receiving a third set of strokes on the touch screen in the stroke input area;

determining second text based on the third set of strokes; and displaying the second text with the revised first text.

23. The method of claim 19, wherein the first set of strokes is a single continuous stroke and the first text is a single character.

24. The method of claim 19, wherein the second set of strokes is a single continuous stroke.

25. The method of claim 19, wherein the revised first text differs from the first text by only a single character.

26. The method of claim 19, wherein the revised first text differs from the first text by only a last character of the revised first text or the first text.

27. The method of claim 19, wherein at least a portion of the second set of strokes overlaps the first set of strokes.

* * * * *

UNITED STATES PATENT AND TRADEMARK OFFICE
CERTIFICATE OF CORRECTION

PATENT NO. : 10,884,617 B2
APPLICATION NO. : 16/663070
DATED : January 5, 2021
INVENTOR(S) : Ryan S. Dixon et al.

It is certified that error appears in the above-identified patent and that said Letters Patent is hereby corrected as shown below:

On the Title Page

Column 2 (Abstract), Line 9: After "based" insert -- on --.

Signed and Sealed this
First Day of October, 2024

Katherine Kelly Vidal
*Director of the United States Patent and Trademark Office*